(12) United States Patent
Lee et al.

(10) Patent No.: US 11,218,953 B2
(45) Date of Patent: Jan. 4, 2022

(54) SCANNING METHOD IN WIRELESS LAN SYSTEM AND SUPPORTING DEVICE THEREFOR

(71) Applicant: ELECTRONICS AND TELECOMMUNICATIONS RESEARCH INSTITUTE, Daejeon (KR)

(72) Inventors: Jae Seung Lee, Daejeon (KR); Min Ho Cheong, Daejeon (KR); Hyoung Jin Kwon, Cheongju (KR); Hee Jung Yu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 58 days.

(21) Appl. No.: 16/878,495

(22) Filed: May 19, 2020

(65) Prior Publication Data

US 2020/0280910 A1 Sep. 3, 2020

Related U.S. Application Data

(63) Continuation of application No. 16/245,097, filed on Jan. 10, 2019, now Pat. No. 10,716,055, which is a
(Continued)

(30) Foreign Application Priority Data

May 8, 2012 (KR) .......................... 10-2012-0048335
Jun. 27, 2012 (KR) .......................... 10-2012-0069418
(Continued)

(51) Int. Cl.
*H04W 48/16* (2009.01)
*H04W 48/14* (2009.01)
(Continued)

(52) U.S. Cl.
CPC ............. *H04W 48/16* (2013.01); *H04L 12/12* (2013.01); *H04L 61/1541* (2013.01);
(Continued)

(58) Field of Classification Search
CPC ..... H04W 48/02; H04W 48/04; H04W 48/06; H04W 48/08; H04W 48/10; H04W 48/12;
(Continued)

(56) References Cited

U.S. PATENT DOCUMENTS 7,406,319 B2 7/2008 Kostic et al.
8,041,319 B2 * 10/2011 He .................. H04W 48/16
455/144

(Continued)

FOREIGN PATENT DOCUMENTS

CN  1659909 A  8/2005
CN  1723656 A  1/2006
(Continued)

OTHER PUBLICATIONS

Steve Grau, "Efficient Probe Filtering," IEEE802.11-12/775r0, Jul. 5, 2012, pp. 2-10, IEEE.
(Continued)

*Primary Examiner* — Kevin D Mew

(57) ABSTRACT

A scanning method performed by a station (STA) in a wireless LAN system is provided. The method comprises: transmitting a probe request frame; and receiving a short probe response frame from an access point (AP) as a response to the probe request frame. The short probe
(Continued)

response frame includes service set ID (SSID) information or compressed SSID information of the AP.

20 Claims, 42 Drawing Sheets

Related U.S. Application Data continuation of application No. 15/482,477, filed on Apr. 7, 2017, now Pat. No. 10,225,792, which is a continuation of application No. 14/396,031, filed as application No. PCT/KR2013/004045 on May 8, 2013, now Pat. No. 9,749,936.

(30) Foreign Application Priority Data

| Jul. 9, 2012 | (KR) | .................. 10-2012-0074714 |
|---|---|---|
| Sep. 7, 2012 | (KR) | .................. 10-2012-0099343 |
| Sep. 11, 2012 | (KR) | .................. 10-2012-0100717 |
| Jan. 23, 2013 | (KR) | .................. 10-2013-0007708 |
| Feb. 5, 2013 | (KR) | .................. 10-2013-0012646 |
| Mar. 11, 2013 | (KR) | .................. 10-2013-0025862 |
| Apr. 16, 2013 | (KR) | .................. 10-2013-0041908 |
| May 3, 2013 | (KR) | .................. 10-2013-0049951 |
| May 8, 2013 | (KR) | .................. 10-2013-0052183 |

(51) Int. Cl.

| H04W 4/80 | (2018.01) |
|---|---|
| H04L 12/12 | (2006.01) |
| H04L 29/12 | (2006.01) |
| H04L 29/08 | (2006.01) |
| H04W 8/00 | (2009.01) |
| H04W 28/06 | (2009.01) |
| H04W 84/12 | (2009.01) |
| H04W 92/20 | (2009.01) |

(52) U.S. Cl.
CPC .............. *H04L 67/16* (2013.01); *H04W 4/80* (2018.02); *H04W 8/005* (2013.01); *H04W 28/065* (2013.01); *H04W 48/14* (2013.01); *H04W 84/12* (2013.01); *H04W 92/20* (2013.01)

(58) Field of Classification Search
CPC ....... H04W 48/14; H04W 48/16; H04W 4/80; H04W 8/005; H04W 28/065; H04W 84/12; H04W 92/20; H04L 12/12; H04L 61/1541; H04L 67/16
See application file for complete search history.

(56) References Cited

U.S. PATENT DOCUMENTS

| 9,986,491 | B2* | 5/2018 | Jeong | ............... H04W 48/16 |
|---|---|---|---|---|
| 2003/0134642 | A1 | 7/2003 | Kostic et al. | |
| 2006/0009246 | A1 | 1/2006 | Marinier et al. | |
| 2006/0057964 | A1 | 3/2006 | Roy et al. | |
| 2006/0092888 | A1 | 5/2006 | Jeong et al. | |
| 2007/0243888 | A1 | 10/2007 | Faccin | |
| 2007/0298742 | A1 | 12/2007 | Ketchum et al. | |
| 2009/0310692 | A1 | 12/2009 | Kafle et al. | |
| 2010/0061326 | A1 | 3/2010 | Chi-Chen et al. | |
| 2011/0090887 | A1* | 4/2011 | Kim | ............... H04W 16/14 |
| | | | | 370/338 |
| 2011/0090890 | A1* | 4/2011 | Seok | ............... H04W 72/0453 |
| | | | | 370/338 |
| 2011/0149850 | A1* | 6/2011 | Sashihara | ............... H04W 48/16 |
| | | | | 370/328 |
| 2013/0294354 | A1* | 11/2013 | Zhang | ............... H04W 48/10 |
| | | | | 370/329 |
| 2014/0376392 | A1* | 12/2014 | Hegde | ............... H04W 48/08 |
| | | | | 370/252 |
| 2015/0139207 | A1* | 5/2015 | Seok | ............... H04W 48/16 |
| | | | | 370/338 |
| 2015/0195710 | A1* | 7/2015 | Bar-Niv | ............... H04W 12/02 |
| | | | | 726/23 |
| 2015/0222447 | A1* | 8/2015 | Park | ............... H04W 48/16 |
| | | | | 370/312 |
| 2015/0304940 | A1* | 10/2015 | Ryu | ............... H04W 8/005 |
| | | | | 370/338 |

FOREIGN PATENT DOCUMENTS

| CN | 1823501 | A | 8/2006 |
|---|---|---|---|
| CN | 101136822 | A | 3/2008 |
| CN | 101361323 | A | 2/2009 |
| CN | 101479958 | A | 7/2009 |
| CN | 101491144 | A | 7/2009 |
| CN | 101557618 | A | 10/2009 |
| CN | 101682539 | A | 3/2010 |
| CN | 102158975 | A | 8/2011 |
| CN | 102421202 | A | 4/2012 |
| EP | 1788750 | A1 | 5/2007 |
| KR | 1020040111457 | A | 12/2004 |
| KR | 1020060031867 | A | 4/2006 |
| KR | 1020090065070 | A | 6/2009 |
| KR | 1020090132650 | A | 12/2009 |
| KR | 101421732 | B1 | 7/2014 |
| WO | WO2004098214 | A1 | 11/2004 |
| WO | WO2007080495 | A2 | 7/2007 |
| WO | WO2008147130 | A2 | 12/2008 |
| WO | WO2011030956 | A1 | 3/2011 |
| WO | WO2011130344 | A1 | 10/2011 |
| WO | WO2012170864 | A2 | 12/2012 |
| WO | WO2013062586 | A1 | 5/2013 |

OTHER PUBLICATIONS

Abhijit Sarma et al., "A Zone Based Interleaved Scanning Technique for Fast Handoff in IEEE 802.11 Wireless Networks" 2009 10th International Symposium on Pervasive Systems, Algorithms, and Networks, Dec. 14-16, 2009, pp. 232-237, IEEE.

Extended European Search Report for EP Application No. 13787375.8, dated Dec. 14, 2015.

International Search Report for PCT/KR2013/004045 filed May 8, 2013.

Jae Seung Lee et al., "IEEE P802 11 Wireless LANs LB 200 MAC Comment Resolution on Short Probe Response Option Element (Clause 8.4.2.170t)", IEEE 802.11-14/0540r0, Apr. 28, 2014, pp. 1-11, IEEE.

Jae Seung Lee et al., "Active Scanning for 11ah", IEEE 802.11-12/0869r0, Jul. 13, 2012, pp. 1-15, IEEE.

Jarkko Kneckt et al., "Active Scanning related requirements for Specification Frame Work Document",IEEE 802.11-12/0207r1,Mar. 9, 2012, pp. 2-6E, IEEE.

Jonathan Segev,"Aggregated Probe Response",IEEE 802.11-12/0538r0,May 2, 2012, pp. 2-16E, IEEE.

Minyoung Park, "IEEE P802.11 Wireless LANs Proposed Specification Framework for TGah D9.x" Jul. 18, 2012, pp. 1-32, IEEE.

Yongho Seok et al., "SIG Field of NDP Probe Request", IEEE 802.11-12/1080r0, Sep. 17, 2012, pp. 1-9, IEEE.

Santosh Abraham et al., Short Beaco, IEEE 802.11-12/0129r1, Jan. 2012, pp. 1-14, IEEE.

Stephen McCann et al., "LB-142 CID 5350 update to Emergency Alert functionality",IEEE 802.11-09/0311r0,Mar. 11, 2009, pp. 2-11E, IEEE.

Yongho Seok et al., "NDP Probing", IEEE 802.11-12/0830r0, Jul. 12, 2012, pp. 1-14, IEEE.

* cited by examiner

FIG. 24

| full SSID request | full beacon time request | country request | power constraint request | RSN request | interworking request | roaming consortium request | TPC report request |
|---|---|---|---|---|---|---|---|
| 1 | 1 | 1 | 1 | 1 | 1 | 1 | 1 |

Bits:

| extended supported rate request | BSS load request | EDCA parameter request | average access delay request | BSS available permission capability request | BSS AC access delay request | supported operation class request | QoS traffic capability request |
|---|---|---|---|---|---|---|---|
| 1 | 1 | 1 | 1 | 1 | 1 | 1 | 1 |

Bits:

| channel usage request | time broadcast request | TimeZone request | advertisement protocol request | emergency alert identifier request | reserved | reserved | reserved |
|---|---|---|---|---|---|---|---|
| 1 | 1 | 1 | 1 | 1 | 1 | 1 | 1 |

Bits:

FIG. 26

- group 0 : default group

| full SSID request | full beacon time request | access network option request | capability information request | supported rate request | RSN request | EDCA parameter request | reserved |
|---|---|---|---|---|---|---|---|
| Bits: 1 | 1 | 1 | 1 | 1 | 1 | 1 | 1 |

- group 1 : 11u(mutual operation-related information)

| interworking request | roaming consortium request | advertisement protocol request | emergency alert identifier request | reserved | reserved | reserved | reserved |
|---|---|---|---|---|---|---|---|
| Bits: 1 | 1 | 1 | 1 | 1 | 1 | 1 | 1 |

- group 2 : 11k-related information

| multiple SSIDs request | AP channel report request | BSS average access delay request | BSS available permission capability request | BSS AC access delay request | TPC report request | channel usage request | reserved |
|---|---|---|---|---|---|---|---|
| Bits: 1 | 1 | 1 | 1 | 1 | 1 | 1 | 1 |

- group 3 : channel switch, regulation related information

| channel switch notification request | supported operation class request | extended channel switch notification request | country request | power constraint request | reserved | reserved | reserved |
|---|---|---|---|---|---|---|---|
| Bits: 1 | 1 | 1 | 1 | 1 | 1 | 1 | 1 |

FIG. 27

- group 4 : 11v-related information

| QoS traffic capability request | channel usage request | time advertisement request | TimeZone request | reserved | reserved | reserved |
|---|---|---|---|---|---|---|
| 1 | 1 | 1 | 1 | 1 | 1 | 1 |

Bits:

- group 5 : VHT capability-related

| HT capability request | HT operation request | extended capability request | VHT capability request | VHT capability request | reserved | reserved |
|---|---|---|---|---|---|---|
| 1 | 1 | 1 | 1 | 1 | 1 | 1 |

Bits:

- group 6 : mesh-related information

| mesh ID request | mesh configuration request | mesh awake window request | mesh channel switch parameter | MCCAOP advertisement overview request | MCCAOP advertisement request | reserved | reserved |
|---|---|---|---|---|---|---|---|
| 1 | 1 | 1 | 1 | 1 | 1 | 1 | 1 |

Bits:

group 7 : other information

| mobility domain request | reserved | reserved | reserved | reserved | reserved | reserved |
|---|---|---|---|---|---|---|
| 1 | 1 | 1 | 1 | 1 | 1 | 1 |

Bits:

FIG. 28

- group 0(default group) : expressing frequently used options

| full SSID request | full beacon time request | access network option request | full probe response completion IE request | supported rate request | S1G capability request | extended capability request | reserved |
|---|---|---|---|---|---|---|---|
| Bits: 1 | 1 | 1 | 1 | 1 | 1 | 1 | 1 |

- group 1 : including options for characteristics related to next-generation wireless LAN

| RPS request | segment count request | TSF timer accuracy request | relay discovery request | RootAP BSSID request | reserved | reserved | reserved |
|---|---|---|---|---|---|---|---|
| Bits: 1 | 1 | 1 | 1 | 1 | 1 | 1 | 1 |

- group 2 : including options used most frequently but next to those of groups 0 and 1

| country request | power constraint request | TPC report request | extended supported rate request | RSN request | BSS load request | EDCA parameter request | supported operation classes request |
|---|---|---|---|---|---|---|---|
| Bits: 1 | 1 | 1 | 1 | 1 | 1 | 1 | 1 |

- group 3 : including 11k-related options

| measurement pilot transmission request | multiple BSSIDs request | RM-capable capability request | AP channel report request | BSS average access delay request | antenna request | BSS available permission capability request | BSS AC access delay request |
|---|---|---|---|---|---|---|---|
| Bits: 1 | 1 | 1 | 1 | 1 | 1 | 1 | 1 |

FIG. 29

- Bitmap group 4: including 11r, 11v and various options

| Mobility domain request | DSE registration location request | CF parameter set request | QoS traffic capability request | Channel usage request | Time advertisement request | TimeZone request | Reserved |
|---|---|---|---|---|---|---|---|

Bits: 1 | 1 | 1 | 1 | 1 | 1 | 1 | 1

- Bitmap group 5: including 11u-related options

| Interworking request | Advertisement protocol request | Roaming consortium request | Emergency alert identifier request | Reserved | Reserved | Reserved | Reserved |
|---|---|---|---|---|---|---|---|

Bits: 1 | 1 | 1 | 1 | 1 | 1 | 1 | 1

- Bitmap group 6: other additional options (11ae, 11aa, 11ai etc.)

| QMF policy request (11ae) | QLoad report request (11aa) | GAS configuration sequence number request (11ai) | Reduced neighbor report (11ai) | AP configuration change count request (11ai) | FILS indication request (11ai) | Differentiated initial link setup request (11ai) | Reserved |
|---|---|---|---|---|---|---|---|

Bits: 1 | 1 | 1 | 1 | 1 | 1 | 1 | 1

- Bitmap group 7: future additional options

| reserved | reserved | reserved | reserved | reserved | reserved | reserved | reserved |
|---|---|---|---|---|---|---|---|

Bits: 1 | 1 | 1 | 1 | 1 | 1 | 1 | 1

FIG. 32

| Element ID | Length | Probe response group bitmap 0 | Probe response group bitmap 1 | ... | Probe response group bitmap k | Probe response group bitmap 0 | ... | Probe response group bitmap n |
|---|---|---|---|---|---|---|---|---|
| 1 | 1 | 1 | 1 | | 1 | 1 | | 1 |

Octets:

FIG. 33

| Element ID | Length | Probe response group bitmap (ex: 11bits) | Probe response group bitmap 0 (ex: 5bits) | Probe response option bitmap 1 | ... | Probe response option bitmap k |
|---|---|---|---|---|---|---|
| 1 | 1 | 1 or more | 1 or less | 1 | ... | 1 |

Octets:

FIG. 34

| Element ID | Length | Always indication option bitmap | Probe response page bitmap | Probe response page bitmap 0 (page 0) | ... | Probe response group bitmap x (page x) | Probe response option bitmap 0 (page 0) | ... | Probe response option bitmap n (page 0) | Probe response option bitmap 0 (page x) | ... | Probe response option bitmap n (page x) |
|---|---|---|---|---|---|---|---|---|---|---|---|---|
| Octets: 1 | 1 | 1 or less | 1 or less | 1 | | 1 | 1 | | 1 | 1 | | 1 |

FIG. 36

| Element ID | Length | Always indication option bitmap (11000) | Probe response page bitmap (101) | Probe response group bitmap 0 (11000000) | Probe response group bitmap 2 (00000001) | Probe response option bitmap 0 (page0, group 0) (11111000) | Probe response option bitmap 1 (page0, group 1) (11000000) | Probe response option bitmap 7 (page2, group 7) (00011000) |
|---|---|---|---|---|---|---|---|---|
| 1 | 1 | 1 or less | 1 or less | 1 | 1 | 1 | 1 | 1 |

Octets:

FIG. 38

(a) For 1MHz

| NDP MAC Frame type | SSID/Interworking present | Compressed SSID/ access network option | Reserved |
|---|---|---|---|
| 3 | 1 | 16 | 5 | bits:

(b) For 2MHz

| NDP MAC Frame type | SSID/Interworking present | Compressed SSID/ access network option | Reserved |
|---|---|---|---|
| 3 | 1 | 32 | 1 | bits:

SCANNING METHOD IN WIRELESS LAN SYSTEM AND SUPPORTING DEVICE THEREFOR

CROSS REFERENCE PARAGRAPH

The present application is a continuation of and claims priority to U.S. application Ser. No. 16/245,097 filed Jan. 10, 2019, which is a continuation of and claims priority to U.S. application Ser. No. 15/482,477 filed Apr. 7, 2017, now U.S. Pat. No. 10,225,792 issued Mar. 5, 2019, which is a continuation of U.S. application Ser. No. 14/396,031 filed Oct. 21, 2014, now U.S. Pat. No. 9,749,936 issued Aug. 29, 2017, which is a U.S. National Stage of PCT/KR2013/004045, filed May 8, 2013, which claims the priority of Korean Application Nos. 10-2013-0052183 filed May 8, 2013, 10-2013-0049951 filed May 3, 2013, 10-2013-0041908 filed Apr. 16, 2013, 10-2013-0025862 filed Mar. 11, 2013, 10-2013-0012646 filed Feb. 5, 2013, 10-2013-0007708 filed Jan. 23, 2013, 10-2012-0100717 filed Sep. 11, 2012, 10-2012-0099343 filed Sep. 7, 2012, 10-2012-0074714 filed Jul. 9, 2012, 10-2012-0069418 filed Jun. 27, 2012, and 10-2012-0048335 filed May 8, 2012, in the Korean Intellectual Property Office, the disclosures of which are incorporated herein by reference.

TECHNICAL FIELD

The present invention concerns wireless communications, and more specifically, to a method of performing scanning in a wireless LAN (Local Area Network) system and an apparatus for supporting the method.

BACKGROUND ART

Recent advance in IT technology led to a development of a diversity of wireless communication technologies. Among them, wireless LAN allows users to have their portable devices, such as PDAs (Personal Digital Assistants), laptop computers, or portable multimedia players (PMPs), wirelessly access the Internet at home or workplace or in a certain service area.

In contrast to existing wireless LAN systems supporting HT (high throughput) and VHT (very high throughput), using transmission channels having a bandwidth of 20/40/80/160/80+80 MHz in a band of 2 GHz and/or 5 GHz, a wireless LAN system has been suggested of being able to operate in a band of 1 GHz or less. If a wireless LAN system operates in a band of 1 GHz or less, the wireless LAN system adopts a channel having a considerably narrow bandwidth as compared with the existing wireless LAN system. Accordingly, further expanded service coverage may be achieved.

A next-generation wireless LAN system may provide a lower data transmission speed than that provided by the existing wireless LAN systems due to the characteristics of its physical layer. In such environment, there is a need for a scanning method that may support a station so that the station may be more efficiently associated with an access point.

DISCLOSURE

Technical Problem

An object of the present invention is to provide a scanning method in a wireless LAN system and an apparatus of supporting the scanning method.

Technical Solution

In an aspect, there is provided a scanning method performed by a STA (station) in a wireless LAN system. The method comprises transmitting a probe request frame and receiving a short probe response frame from an AP (access point) in response to the probe request frame. The short probe response frame may include SSID (service set ID) information or compressed SSID information from the AP.

The short probe response frame may further include full SSID present indication information, and the full SSID present field indicates whether the short probe response frame may include the SSID information or the compressed SSID information.

The probe request frame may include a probe response option information element indicating option information requested to be included in the short probe response frame.

The probe response option information element may include at least one probe response option bitmap field, and each bit of each probe response option bitmap indicates whether a request is made to include corresponding option information.

Each probe response option bitmap may include a bit set as at least one '1' indicating that a request is made to include specific option information.

A first probe response option bitmap field of the at least one probe response option bitmap may include a first bit indicating whether a request is made to include the SSID information or the compressed SSID information in the short probe response frame and a second bit indicating whether a request is made to include information relating to a time that a next full beacon frame is transmitted in the short probe response frame.

When the first bit indicates that the SSID information is requested, the short probe response frame may include the SSID information, and when the first bit indicates that the compressed SSID information is requested, the short probe response frame may include the compressed SSID information.

When the second bit indicates that the information relating to the time that the next full beacon frame is transmitted is requested, the short probe response frame further include the information relating to the time that the next full beacon frame is transmitted.

The short probe response frame may further include next full beacon time present indication information indicating whether the next full beacon time-related information is included.

When at least one probe response option bitmap field different from the first probe response option bitmap field is included in the probe response option information element, the probe response option information element may further include a probe response group bitmap field. The probe response group bitmap field indicates which probe response option bitmap field of the at least one probe response option bitmap field is included in the probe response option information element.

When the probe request frame may include a probe response option information element indicating option information requested to be included in the short probe response frame, the short probe response frame is transmitted, and when the probe response option information element is not included in the probe request frame, the method further comprises receiving an existing probe response frame including the SSID information in response to the probe request frame.

The probe request frame and the short probe response frame are transmitted and received through a band of 1 Ghz or less.

In another aspect, there is provided a station operating in a wireless LAN system, the station comprising a transceiver transmitting and receiving a wireless signal and a processor operatively connected with the transceiver. The process is configured to transmit a probe request frame and to receive a short probe response frame from an AP (access point) in response to the probe request frame, and the short probe response frame may include SSID (service set ID) information or compressed SSID information of the AP.

In still another aspect, there is provided a scanning method performed by an AP (access point) in a wireless LAN system, the method comprising receiving a probe request frame from a STA (station), generating a short probe response frame based on the probe request frame, and transmitting the short probe response frame to the STA. Generating the short probe response frame may include SSID (service set ID) information or compressed SSID information of the AP in the short probe response frame.

Generating the short probe response frame may further include including full SSID present indication information in the short probe response frame. The full SSID present field indicates whether the short probe response frame may include the SSID information or the compressed SSID information.

The probe request frame may include a probe response option information element indicating option information requested to be included in the short probe response frame.

The probe response option information element may include at least one probe response option bitmap field, and each bit of each probe response option bitmap indicates whether a request is made to include corresponding option information.

Each probe response option bitmap may include a bit set as at least one '1' indicating that a request is made to include specific option information.

A first probe response option bitmap field of the at least one probe response option bitmap may include a first bit indicating whether a request is made to include the SSID information or the compressed SSID information in the short probe response frame and a second bit indicating whether a request is made to include information relating to a time that a next full beacon frame is transmitted in the short probe response frame.

When the first bit indicates that the SSID information is requested, the short probe response frame may include the SSID information, and when the first bit indicates that the compressed SSID information is requested, the short probe response frame may include the compressed SSID information.

When the second bit indicates that the information relating to the time that the next full beacon frame is transmitted is requested, the short probe response frame further include the information relating to the time that the next full beacon frame is transmitted.

The short probe response frame may further include next full beacon time present indication information indicating whether the next full beacon time-related information is included.

When at least one probe response option bitmap field different from the first probe response option bitmap field is included in the probe response option information element, the probe response option information element may further include a probe response group bitmap field. The probe response group bitmap field indicates which probe response option bitmap field of the at least one probe response option bitmap field is included in the probe response option information element.

When the probe request frame may include a probe response option information element indicating option information requested to be included in the short probe response frame, the short probe response frame is transmitted, and when the probe response option information element is not included in the probe request frame, the method further comprises receiving an existing probe response frame including the SSID information in response to the probe request frame.

The probe request frame and the short probe response frame are transmitted and received through a band of 1 Ghz or less.

In yet still another aspect, there is provided an access point (AP) operating in a wireless LAN system, the AP comprising a transceiver transmitting and receiving a wireless signal and a processor operatively connected with the transceiver. The process is configured to receive a probe request frame from a STA (station), to generate a short probe response frame based on the probe request frame, and to transmit the short probe response frame to the STA, and generating the short probe response frame may include including SSID (service set ID) information or compressed SSID information of the AP in the short probe response frame.

Advantageous Effects

Active scanning, in contrast to being advantageous in that a station (STA) may transmit a probe request frame via each channel and finds out a desired AP more quickly than passive scanning does, may suffer from overhead that occurs due to a probe response frame. Such overhead, when being associated with the characteristics of the physical layer in a next-generation wireless LAN system, may worsen.

A scanning method is suggested herein of using a shorter probe response frame in such a wireless LAN environment. The suggested short probe response frame allows a STA to have its necessary information selectively included in the short probe response frame, so that the short probe response frame, despite its reduced length, may provide all the information necessary for attempting association/authentication to the STA. By doing so, overhead that, upon active scanning, may occur due to the probe response, may be reduced, providing a more efficient scanning method.

The STA as described herein, upon a probe request, may selectively indicate which necessary information to be included in the short probe response frame and may obtain it by receiving a short probe response frame. Therefore, the STA may give it a try for association right after receiving a short probe response frame including the information it has selectively requested without the need of waiting for a full beacon frame being transmitted in order to obtain the necessary information, providing for a more efficient operation.

DESCRIPTION OF DRAWINGS

FIG. 24 is a block diagram illustrating a sixth example of a probe response option field format according to an embodiment of the present invention.

FIGS. 26 and 27 are views illustrating an example of grouping according to an embodiment of the present invention.

FIGS. 28 and 29 are views illustrating another example of grouping according to an embodiment of the present invention.

FIG. 32 is a block diagram illustrating a third example of a probe response option IE format according to an embodiment of the present invention.

FIG. 33 is a block diagram illustrating a fourth example of a probe response option IE format according to an embodiment of the present invention.

FIG. 34 is a block diagram illustrating a fifth example of a probe response option IE format according to an embodiment of the present invention.

FIG. 36 is a view illustrating an example of a probe response option IE format according to an embodiment of the present invention.

FIG. 38 is a block diagram illustrating an example of an SIG field format of an NDP-type short probe response frame according to an embodiment of the present invention.

MODE FOR INVENTION

Figure 1:
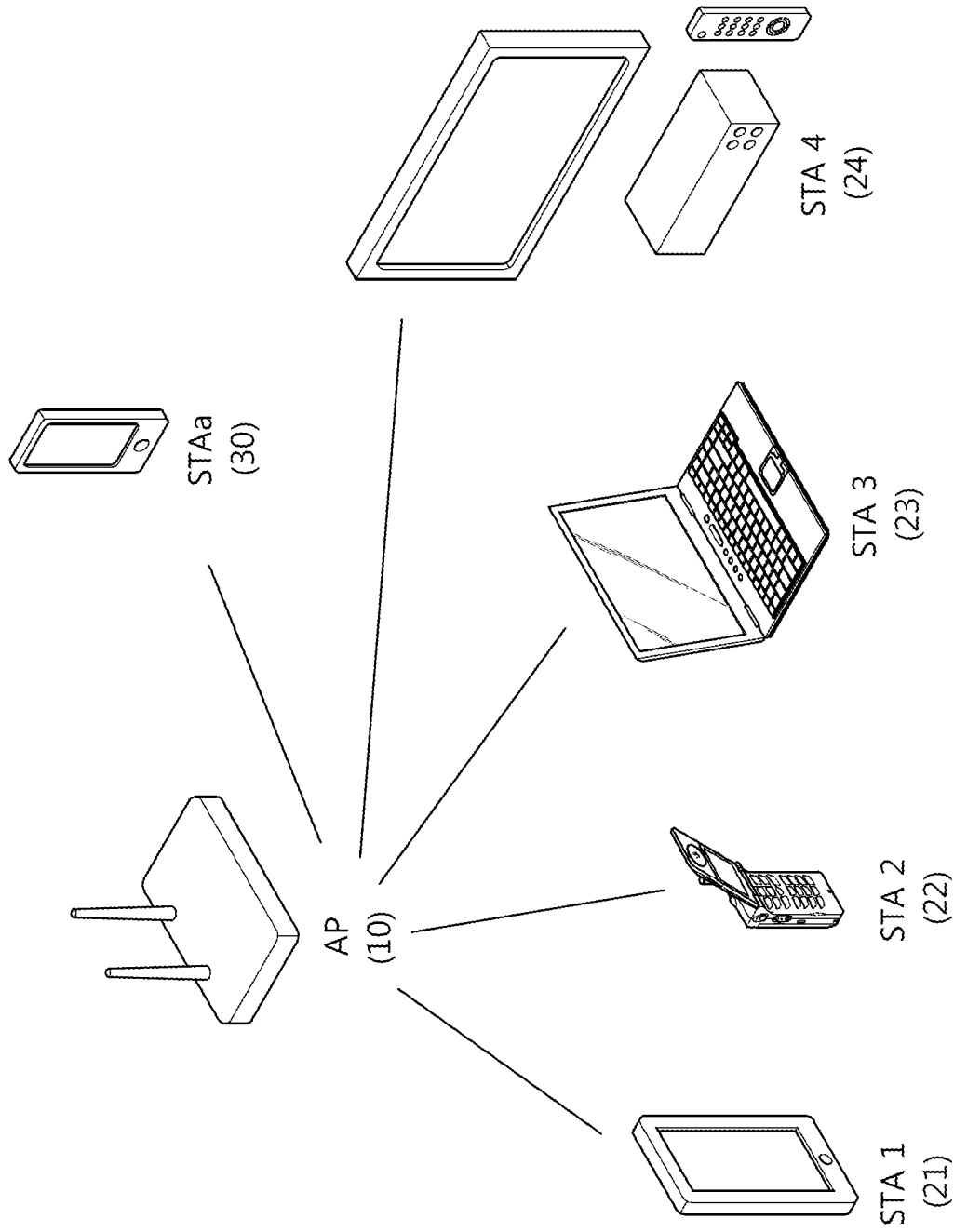
FIG. 1 is a view illustrating a configuration of a conventional wireless LAN (Local Area Network: WLAN) system to which an embodiment of the present invention may apply.

FIG. 1 is a view illustrating a configuration of a conventional wireless LAN (Local Area Network: WLAN) system to which an embodiment of the present invention may apply.

Referring to FIG. 1, the WLAN system includes one or more basic service sets (BSSs). The BSS is a set of stations (STAs) that may be successfully synchronized with each other and may communicate with each other and is not a concept that indicates a specific area.

The infrastructure BSS includes one or more non-AP stations (non-AP STA1(21), non-AP STA2(22), non-AP STA3(23), non-AP STA4(24), non-AP STAa(30)), an AP (Access Point, 10) that provides a distribution service, and a DS (Distribution System) that distributes multiple APs. In the infrastructure BSS, the AP manages the non-AP STAs of the BSS.

In contrast, the independent BSS (IBSS) is a BSS operating in an ad-hoc mode. Since the IBSS does not include an AP, there is no centralized management entity that performs a central management function. That is, in the IBSS, the non-AP STAs are managed in a distributed manner. In the IBSS, all the STAs may be configured as mobile STAs and none of the STAs are allowed to access the DS, so that the STAs form a self-contained network.

The STA is a functional medium that includes a medium access control (MAC) following the IEEE (Institute of Electrical and Electronics Engineers) 802.11 standards and a physical layer interface for a wireless medium and in a wide sense includes both an AP and a non-AP station.

The non-AP STA is not an AP but an STA. The non-AP STA may also be referred to as a mobile terminal, wireless device, wireless transmit/receive unit (WTRU), user equipment (UE), mobile station (MS), mobile subscriber unit or simply as a user. Hereinafter, for ease of description, the non-AP STA is referred to as STA.

The AP is a functional entity that provides access to the DS via a wireless medium for an STA associated with the AP. In the infrastructure BSS including the AP, communication between STAs is basically conducted via the AP, but in case a direct link is set up, the STAs may perform direct communication therebetween. The AP may also be referred to as a central controller, base station (BS), node-B, BTS (Base Transceiver System), site controller, or management STA.

A plurality of infrastructure BSSs including the BSS shown in FIG. 1 may be connected to each other through a distribution system (DS). The plurality of BSSs connected to each other through the DS is called an extended service set (ESS). The AP and/or STAs included in the ESS may communicate with each other, and in the same ESS, an STA may shift from a BSS to another BSS while performing seamless communication.

In a wireless LAN system following the IEEE 802.11 standard, the basic access mechanism of the MAC (Medium Access Control) is a CSMA/CA (Carrier Sense Multiple Access with Collision Avoidance) mechanism. The CSMA/CA mechanism is also referred to as a distributed coordination function (DCF) of the IEEE 802.11 MAC, and this basically adopts a "listen before talk" access mechanism. According to such type of access mechanism, the AP and/or STA, before starting transmission, senses a wireless channel or medium. If a result of the sensing shows that the medium is in an idle status, frames start to be transmitted through the corresponding medium. In contrast, if the medium is sensed to be in an occupied status, the corresponding AP and/or STA, without starting its own transmission, establishes a delay period for medium access and stands by.

The CSMA/CA mechanism includes virtual carrier sensing in addition to the physical carrier sensing in which the AP and/or STA directly senses the medium. The virtual carrier sensing is provided for addressing problems that may occur in relation to the medium access, such as a hidden node problem. The MAC of the wireless LAN system uses a network allocation vector (NAV). The NAV is a value by which an AP and/or STA currently using the medium or having a right to use the medium lets another AP and/or STA know the time left until the medium gets back to an available status. Accordingly, the value set as the NAV corresponds to a time period scheduled to use the medium by the AP and/or STA that transmits a corresponding frame.

The IEEE 802.11 MAC, together with the DCF, offers an HCF (Hybrid Coordination Function) that is based on the PCF (Point Coordination Function) that performs periodic polling so that all the receiving APs and/or STAs may receive data packets with the DCF in a polling-based synchronous access scheme. The HCF has EDCA (Enhanced Distributed Channel Access) that adopts a contention-based scheme for a provider to supply data packets to multiple users and HCCA (HCF Controlled Channel Access) that adopts a contention-free based channel access scheme using a polling mechanism. The HCF includes a medium access mechanism for enhancing the QoS (Quality of Service) of the wireless LAN and may transmit data during both a contention period CP and a contention-free period (CFP).

The wireless communication system, due to the characteristics of the wireless medium, cannot be aware of the existence of a network when the STA powers on and starts its operation. Accordingly, an STA—no matter what type it is—should undergo a network discovery process in order to access the network. When discovering a network through the network discovery process, the STA selects a network to which the STA is to subscribe through a network selecting process. Thereafter, the STA subscribes to the selected network and performs a data exchanging operation that is done at the transmission end/reception end.

In the wireless LAN system, the network discovery process is implemented as a scanning procedure. The scanning procedure is divided into passive scanning and active scanning. The passive scanning is achieved based on a beacon frame that is periodically broadcast by the AP. In general, the AP of the wireless LAN broadcasts the beacon frame at a certain interval (e.g., every 100 msec). The beacon frame includes information on a BSS managed by the AP. The STA stands by to passively receive the beacon frame through a particular channel. When obtaining the information on the network by receiving the beacon frame, the STA ends the scanning procedure through the particular channel. Since the passive scanning is achieved only when the STA receives the beacon frame without the need of transmitting a separate frame, the overall overhead may be reduced. However, the scanning time may be increased in proportion to the transmission period of the beacon frame.

In the active scanning, the STA actively broadcasts a probe request frame on a particular channel to request network information from all the APs receiving the probe request frame. When receiving the probe request frame, the AP stands by during a random time so as to prevent frame collision and then sends a probe response frame including the network information to the corresponding STA. The STA receives the probe response frame and obtains the network information, thereby ending the scanning procedure. The active scanning may terminate the scanning within relatively a short time. On the contrary, in accordance with request-response, a frame sequence is needed, thus resulting in an increase in the overall network overhead.

When terminating the scanning procedure, the STA selects a network in accordance with a specific reference for the STA and performs an authentication procedure with the AP. The authentication procedure is done in a 2-way handshake manner. When finishing the authentication procedure, the STA proceeds with an association procedure with the AP.

The association procedure is conducted in a 2-way handshake manner. First, the STA transmits an association request frame to the AP. The association request frame includes information on the capabilities of the STA. Based on this, the AP determines whether to permit association with the corresponding STA. When determining whether to permit association, the AP sends an association response frame to the corresponding STA. The association response frame includes information indicating whether to permit association and information on the reasons for success/failure of the association. The association response frame further includes information on the capabilities that may be supported by the AP. In case the association is successfully done, frame exchange is normally conducted between the AP and the STA. In case the association fails, the association procedure is re-attempted based on the information on the failure that is included in the association response frame or the STA may send a request for association to other APs.

Meanwhile, as various communication services appear such as smart grid, e-Health, or ubiquitous services, the M2M (Machine to Machine) technology that may support the services draw attention. A sensor for sensing temperature or moist, a camera, a home appliance such as TVs, a processing machine in the factory, or large-scale machine such as vehicles may be an element constituting an M2M system. The elements constituting an M2M system transmit or receive data based on the WLAN communication. Devices constituting an M2M system, which supports the WLAN and constitute a network, are hereinafter referred to as an M2M wireless LAN system.

An M2M-supportive wireless LAN system has the following features:

1) many STAs: an M2M network, unlike existing networks, assumes that a number of STAs are present in a BSS. This is why sensors provided in a home or company, as well as devices owned by an individual are all taken into allowance. Accordingly, a great number of STAs may be connected to a single AP.

2) Low traffic load per STA: since an M2M terminal has a traffic pattern in which the terminal collects information from its surroundings and reports the collected information, the terminal need not send it out often, and the amount of information is relatively small.

3) Uplink-centered communication: the M2M architecture receives a command primarily on downlink and takes action, then reports on uplink with the resultant data. Main data is generally transmitted on uplink. Accordingly, an M2M-supportive system focuses on uplink.

4) STA's power management: an M2M terminal is mainly battery-powered, and a user sometimes has a difficulty in recharging it. Accordingly, a power management scheme is required to minimize power consumption of the battery.

5) Automatic restoration: devices constituting an M2M system are difficult for a user to directly manipulate under a certain circumstance. Thus, an automatic restoration function is needed.

A next-generation wireless LAN system adopting such M2M communication is presently in discuss. A noticeable feature of the wireless LAN system is that its service coverage reaches a radius of 1 km or more within a non-licensed band of 1 GHz or less except for the TV WS band, and this means that the system may provide considerably increased service coverage as compared with the existing indoor use-centered wireless LAN. In other words, unlike the existing bands, 2.4 GHz and 5 GHz, a band of 1 GHz or less, represented by 700 to 900 MHz, is used for operating the wireless LAN, the characteristics of RF waves having the corresponding band enable the AP coverage to be expanded by approximately two or three times under the same transmission power. In such case, a number of STA may gain access to an AP. The usage taken into consideration for the next-generation wireless LAN may be as follows:

Usage 1. Sensors and Meters
1a: smart grid-meter to pole
1c: environmental/agricultural monitoring
1d: industrial process sensors
1e: healthcare
1f: healthcare
1g: home/building automation
1h: home sensors Usage 2. Backhaul Sensors and Meta Data
Backhaul aggregation of sensors
Backhaul aggregation of industrial sensors Usage 3. Extended Range Wi-Fi
Outdoor extended range hotspot
Outdoor Wi-Fi for cellular traffic offloading Usage 1 above, sensors and meters, is an example in which the above-described M2M is used. In usage 1, various types of sensor devices may be connected to an AP in a wireless LAN system to perform communication. Particularly in the case of smart grid, up to 6000 sensor devices may gain access to a single AP.

In usage 2, backhaul sensors and data meters, an AP providing broad coverage serves as a backhaul link of another communication system.

Usage 3 aims to provide an outdoor extended range of hotspot communications such as extended home service coverage, campus service coverage, or shopping mall service coverage or aims to allow the AP to distribute overloaded cellular traffic by offloading traffic for cellular mobile communication.

The next-generation wireless LAN system adopts a band of 1 GHz or less for data transmission and reception. Further, while existing wireless LAN systems use transmission channels having bandwidths of 20 MHz, 40 MHz, 80 MHz, and 160 MHz, the next-generation wireless LAN system employs transmission channels having bandwidths of 1 MHz, 2 MHz, 4 MHz, 8 MHz, and 16 MHz in order to support data transmission and reception. Because the bandwidth of the transmission channel is reduced, the next-generation wireless LAN system provides reduced speeds of data transmission/reception as compared with the existing systems. Further, since service coverage is extended due to the frequency characteristics of the next-generation wireless LAN system, a great number of STAs may attempt channel access, and accordingly, the AP comes to provide services to a large number of STAs. As such, wireless environments that occur due to physical layer characteristics of the next-generation wireless LAN system give rise to a few issues with scanning schemes.

It has been described above that active scanning and passive scanning may be provided as scanning schemes for the wireless LAN system. In the passive scanning, a STA sequentially hears the channels of a wireless medium in a one-by-one manner while waiting for reception of a beacon frame, and obtains information for association from the received beacon frame. Since an STA performing passive scanning stands by until a beacon frame is received, the STA may suffer from an excessive delay in discovering an AP as compared with a STA conducting active scanning.

In the active scanning, a STA transmits a probe request frame to each channel, and may receive a probe request frame from an AP receiving the probe request frame, thereby discovering the AP. Further, the STA may obtain information on the AP and information necessary for association by receiving the probe request frame. The probe response frame is transmitted in response to the probe request frame. Thus, the time taken for the STA to discover a desired AP may be reduced as compared with when the STA performs passive scanning. In contrast, frames exchanged between the STA and the AP for performing active scanning may result in an increase in the amount of traffic transmitted and received therebetween as compared with when passive scanning is carried out.

Meanwhile, the advantages of active scanning, i.e., swift discovery of an AP and resultantly fast acquisition of information, may fade out in the wireless LAN system. As described above, the next-generation wireless LAN system transmits and receives frames through a narrow bandwidth transmission channel due to use of a lower frequency band. Further, the characteristics of the low-frequency band allows for expansion of an AP's service coverage, so that a number of STA may co-exist, and this has been already described above. The transmission channel's bandwidth being narrow may mean that the amount of data that may be processed during a unit time is relatively small. Such nature may mean that the time required for active scanning that is conducted through exchange of probe request-response frames is increased, and this may cause overhead when processing data. Further, since a much more number of STAs co-exist, more frames are predicted to be exchanged, so that overhead may worsen a deterioration of capability.

The next-generation wireless LAN system is also characterized by introducing the short beacon frame, along with the existing beacon frame. The short beacon frame may be configured to include a further limited amount of information as compared with the AP-related information and/or information necessary for association that are included in the existing beacon frame. Hereinafter, the existing beacon frame is referred to as a full beacon frame to discern it from the short beacon frame.

Figure 2:
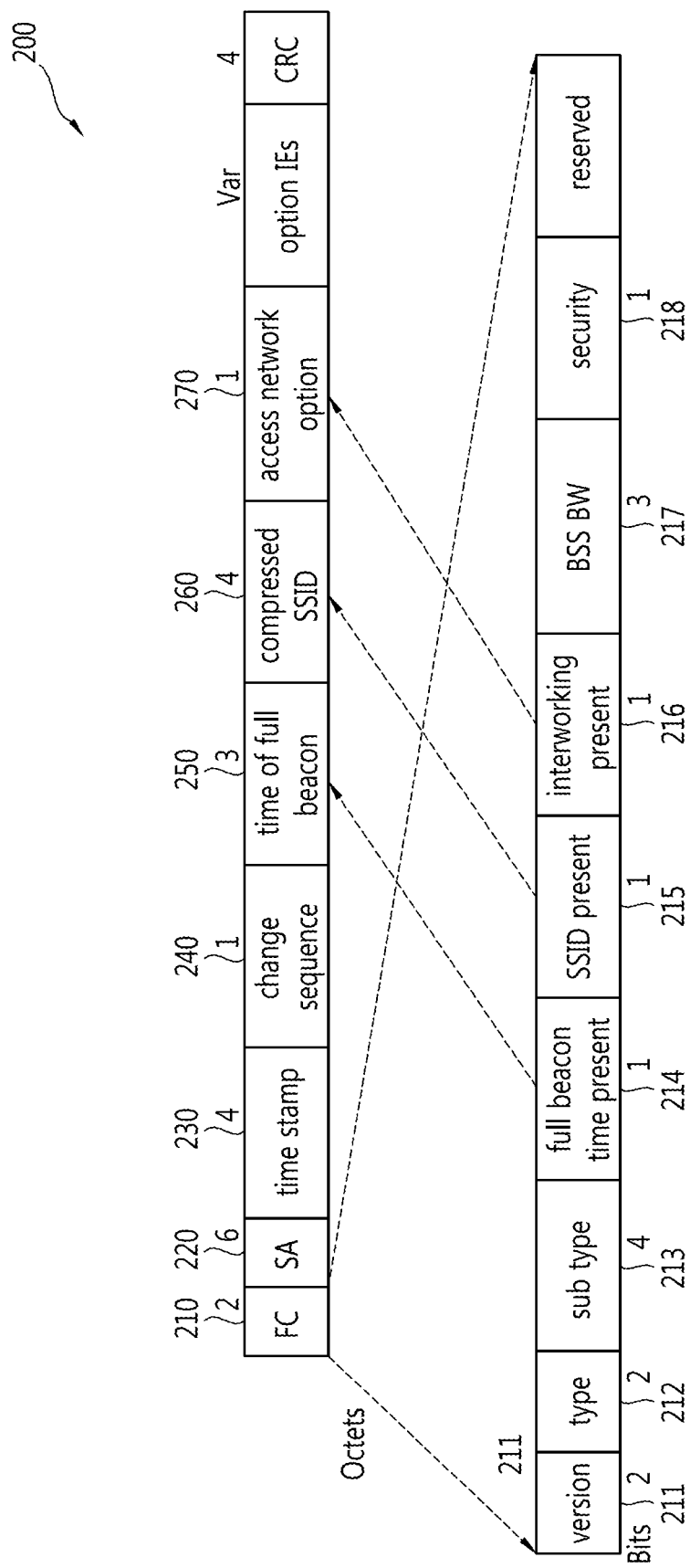
FIG. 2 is a block diagram illustrating an exemplary format of a short beacon frame.

FIG. 2 is a block diagram illustrating an exemplary format of a short beacon frame.

Referring to FIG. 2, the short beacon frame 200 may include a frame control (FC) field 210, a source address (SA) field 220, a time stamp field 230, a change sequence field 240, a time of full beacon field 250, a compressed SSID field 260, an access network option field 270, and other information elements.

The FC field 210 includes information on frame characteristics. The FC field 210 may include a version sub field 211, a type sub field 212, a sub type sub field 213, a time of full beacon present sub field 214, a SSID present sub field 215, an interworking present sub field 216, a BSS bandwidth (BW) sub field 217, and a security sub field 218.

The protocol version sub field 211 may be configured to indicate the version of a wireless LAN which is applied to the short beacon frame 200.

The type sub field 212 and the sub type sub field 213 may be configured to indicate information that identifies the function of the frame including the corresponding FC field 210, and in such case, the type sub field 212 and the sub type sub field 213 may be configured to indicate that the corresponding frame is a short beacon frame.

The time of full beacon present sub field 214 may be configured to indicate whether the short beacon frame 200 includes a next full beacon time field 250.

The SSID present sub field 215 may be configured to indicate whether the short beacon frame 200 includes a compressed SSID field 260 containing a compressed SSID.

The interworking present sub field 216 may be configured to indicate whether the access network option field 270 is included in the short beacon frame.

The BSS bandwidth (BW) sub field 217 may be configured to indicate the operating bandwidth of a BSS that has been established by an AP that has transmitted the short beacon frame 200.

The security sub field 218 may indicate whether an AP transmitting the short beacon frame 200 is an RSNA (Robust Security Network Association) AP.

The SA field 220 may be configured to indicate the address of an AP that has generated and transmitted the corresponding short beacon frame 200.

The time stamp field 230 may include information associated with the time of transmission of the short beacon frame 200, and through the information associated with the time of transmission of the short beacon frame 200, a STA may perform time synchronization with an AP. The time stamp field 230 may include 4 LSBs (Least Significant Bits) of a TSF (Timing Synchronization Function) of the AP that transmits the short beacon frame 200.

The change sequence field 240 may include information that enables identification of the update of the short beacon frame including the corresponding field. The change sequence field 240 may be updated when the information included in the short beacon frame 200 is varied or renewed, and it may be determined through such a value whether the corresponding short beacon has been updated.

The next full beacon time field 250 may include information associated with the time that the full beacon frame is transmitted. Here, the full beacon frame refers to a full beacon frame that is first transmitted after the corresponding short beacon frame 200 is received. The time-related information may be information indicating a time that a next full beacon frame is transmitted. In such case, the time-related information may be a TBTT (Target Beacon Transmission Time) for the next full beacon frame. In case the next full beacon time field 250 is included in the short beacon frame 200, a next full beacon time present sub field 214 of the FC field may be configured to indicate that the full beacon time field is included.

The compressed SSID field 260 may include a compressed SSID that is obtained by reducing the size of an SSID included in the existing beacon frame. In case the compressed SSID field 260 is included in the short beacon frame 200, the SSID present sub field 215 of the FC field may be configured to indicate that the compressed SSID field is included.

The access network option field 270 may include information associated with an interworking service capability.

The short beacon frame may be transmitted at a period that is shorter than a period at which the full beacon frame is transmitted.

The compressed SSID included in the short beacon frame may be a CRC value or hash value of the full SSID. The short beacon frame includes only the CRC portion of the SSID as the information associated with the SSID, so that the length of the short beacon frame for providing information may be reduced as compared with the full beacon frame.

Meanwhile, when attempting to perform passive scanning to associate itself with an AP, an STA, even when receiving the short beacon frame, may necessitate more information. For example, it may be impossible for the STA to associate itself with the AP only with the compressed SSID information and the STA may need additional information for the BSS that is based on the AP, as well as the full SSID.

Figure 3:
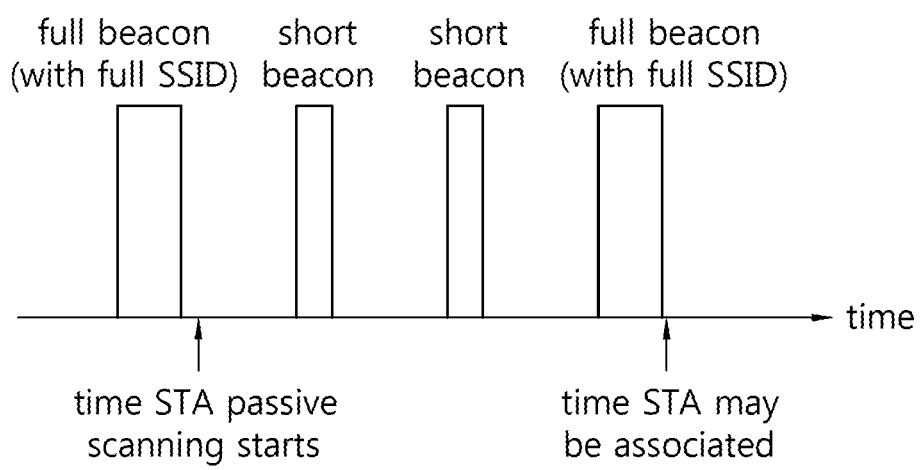
FIG. 3 is a view illustrating an exemplary passive scanning operation of an STA in a next-generation wireless LAN system.

FIG. 3 is a view illustrating an exemplary passive scanning operation of an STA in a next-generation wireless LAN system.

When previously obtaining information on a BSS (e.g., SSID), a STA may be aware of what the SSID of an AP is based on a compressed SSID, and in such case, even when receiving a short beacon frame, the STA can be associated with the AP. In contrast, in case the STA first enters into a wireless LAN environment, the STA generally lacks information on the corresponding AP, such as SSID, the STA may not be able to be associated with the AP only using the information included in the short beacon frame. Accordingly, even though receiving the short beacon frame, the STA may end up standing by until receiving a full beacon frame. Thus, in case the short beacon frame is introduced, the time taken for the STA to select the AP and associate itself with the AP through passive scanning may be further increased as compared with when the operation is performed based on the full beacon frame in which case the full beacon is transmitted each time without use of the short beacon.

Figure 4:
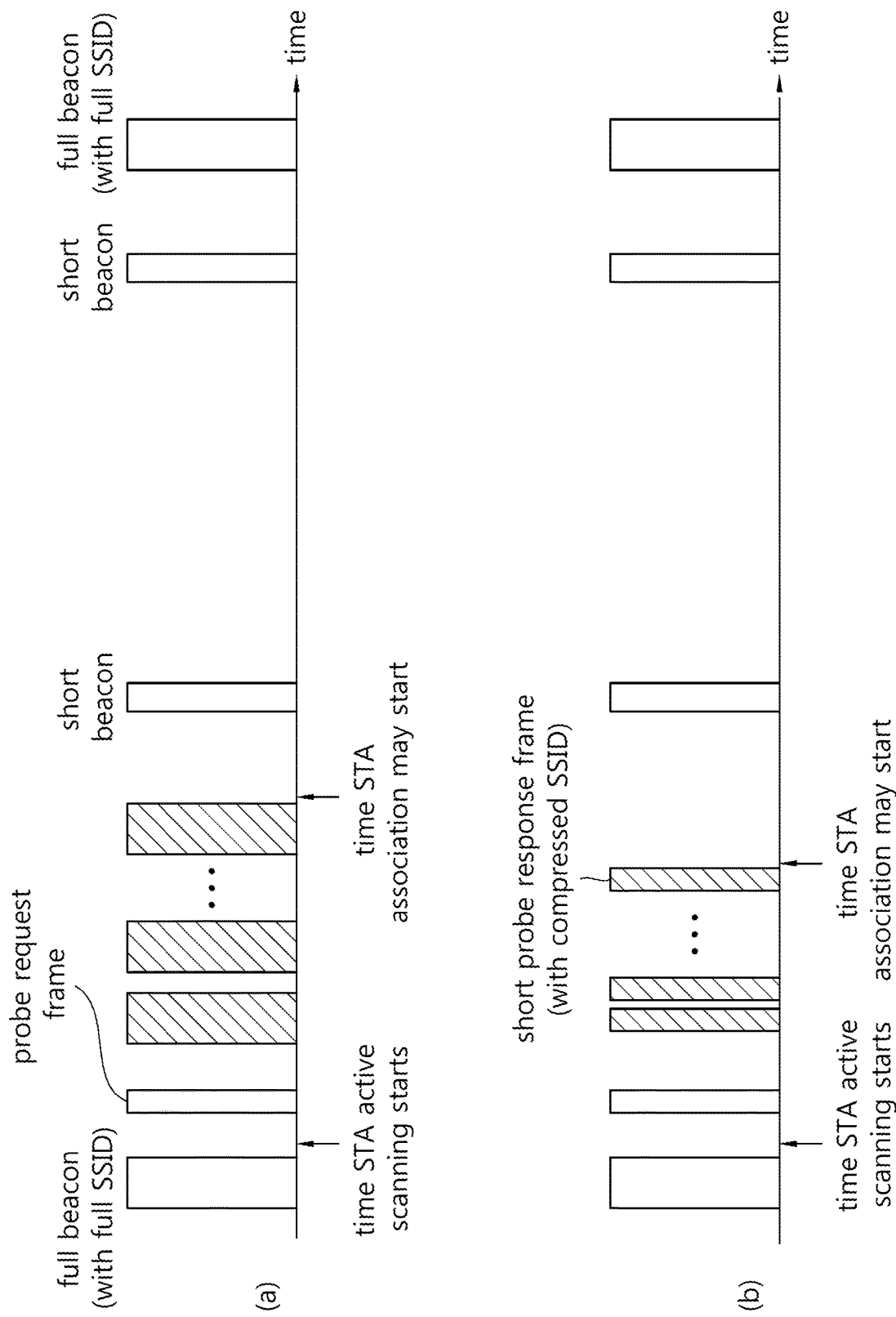
FIG. 4 is a view illustrating an exemplary active scanning operation of an STA in a next-generation wireless LAN system.

FIG. 4 is a view illustrating an exemplary active scanning operation of an STA in a next-generation wireless LAN system.

Referring to sub-figure (a) of the FIG. 4, when performing active scanning, the STA transmits a probe request frame and receives a probe response frame from each AP. The probe response frame may be received right after the probe request frame is transmitted. The probe response frame includes information on the BSS that is based on the AP and/or information on the AP, and the STA may associate itself with the AP based on the information included in the probe response frame. Meanwhile, since the probe response frame contains the overall information on the BSS and/or AP, which is required to be provided to the STA that performs scanning, the frame size may be increased. In the next-generation wireless LAN system having a relatively low data processing rate, the transmission and reception of the probe response frame may cause the medium to be excessively occupied.

For ensuring better efficiency when performing active scanning based on probe requesting and responding in the next-generation wireless LAN system environment, a short probe response frame is suggested herein. Hereinafter, the existing probe response frame used for active scanning is referred to as a full probe response frame. The short probe response frame may be implemented to include the minimum information necessary for an STA that attempts to associate itself with an AP through scanning. The sub-figure (b) of the FIG. 4 is referenced for an active scanning method based on the short probe response frame.

Referring to the sub-figure (b) of the FIG. 4, instead of the existing probe response frame (full probe response frame), a short probe response frame is used that has been optimized to include only the minimal information necessary for the STA to be associated with the AP. If the STA sends a probe request frame while performing active scanning, each AP immediately transmits a short probe response frame. The STA may attempt to associate itself with the AP using the short probe response frame. By doing so, the scanning process may be done more quickly than the passive scanning does using a short beacon frame. Further, since the active scanning uses a short probe response frame have a smaller size than the size of the existing full probe response frame, the STA may conduct fast and less-overhead scanning. A scanning method according to the present invention is now described in greater detail.

Figure 5:
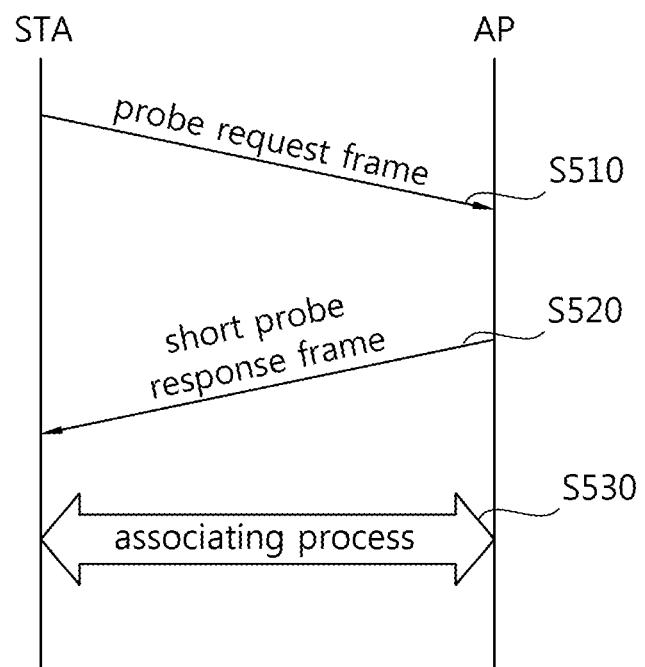
FIG. 5 is a view illustrating a scanning method according to an embodiment of the present invention.

FIG. 5 is a view illustrating a scanning method according to an embodiment of the present invention.

Referring to FIG. 5, when trying to conduct active scanning, a STA sends out a probe request frame (S510), and in response, receives a short probe response frame from an AP (S520). The STA may attempt to associate itself with the AP based on the information included in the short probe response frame (S530).

The STA, when transmitting the probe request frame, may include a probe response option indicator in the probe request frame. The probe response option indicator may be configured to indicate information that the STA desires to obtain through the active scanning. The AP may receive the probe request frame and may identify what necessary information is indicated by the probe response option indicator.

The AP, when responding to the probe request frame, may include identified necessary information in the short probe response frame and may transmit it to the STA.

For example, the STA may need SSID information of the AP for association. When previously obtaining information on the corresponding AP, the STA may identify the AP without the full SSID, but only with the compressed SSID. Accordingly, the STA may set the probe response option indicator to indicate transmission of the compressed SSID and may include it in the probe request frame when transmitting it. On the contrary, when previously not obtaining the information on the AP, the STA may set the probe response option indicator to indicate transmission of the full SSID and may include it in the probe request frame when transmitting it. In accordance with what is indicated by the probe response option indicator, the AP may transmit a short probe response frame, with the full SSID or compressed SSID included in the short probe response frame. By doing so, the short probe response frame may be optimized. The short beacon frame may selectively include the compressed SSID and the full SSID, and thus, neither the compressed SSID nor the full SSID may be included in the short beacon frame. However, the short probe response frame is used for immediate association, and thus, may be implemented to inevitably include the full SSID or the compressed SSID.

The AP may transmit the short probe response frame with information associated with the time of transmission of the full beacon frame included in the short probe response frame. The information associated with the time of transmission of the full beacon frame may be information associated with the time of transmission of a full beacon frame to be first transmitted after the short probe response frame is transmitted, or may be information associated with the time of transmission of a particular full beacon frame that is transmitted after the short probe response frame is transmitted. The time-related information may be information indicating a time that the corresponding full beacon frame is transmitted, and in such case, may be a TBTT (Target Beacon Transmission Time) of the corresponding full beacon frame. The time-related information may be information indicating the time duration that lasts from when the short probe response frame is received to when the full beacon frame is transmitted.

When configuring the information associated with the time of transmission of the full beacon frame, the AP may be implemented to indicate a transmission time of a full beacon frame that is first transmitted subsequent to transmission of the short probe response frame. However, in case the AP identifies the contention status of the corresponding BSS and determines the contention status as serious, the time-related information may be configured as the information associated with not the transmission time of a full beacon frame that is first transmitted after the short probe response frame is transmitted, but the transmission time of a particular subsequent full beacon frame is transmitted. The AP may configure time information related to the transmission of the full beacon frame in accordance with a time during which less contention is expected.

The AP may transmit the short probe response frame, with information indicating a beacon interval included in the short probe response frame. The beacon interval may mean an interval at which the full beacon frames are transmitted. The AP including the beacon interval indicating information in the short probe response frame and transmitting the short probe response frame may be done in response to a request from the STA.

The STA, when obtaining necessary information on the AP, may perform a process of associating it with the AP (S530). The association process between the STA and the AP may be conducted immediately after the STA receives the short probe response frame from the AP.

As in step S530, the STA, when all information necessary for association is included in the short probe response frame, may perform the association process right away. In contrast, when additional information is needed, the STA may stand by until the full beacon frame is received based on the full beacon frame transmission time-related information included in the short probe response frame and may obtain additional necessary information from the full beacon frame. At this time, since the STA may be aware of the time that the corresponding full beacon frame is transmitted, the STA may remain in a power saving mode while waiting for the full beacon frame, thus saving power consumption.

Although all the information necessary for the STA to perform association is included in the short probe response frame, if the current channel status is not good or if many STAs attempt to simultaneously access the channel, i.e., under the severe contention, the STA may wait until the full beacon frame is received rather than attempting to perform association/authentication processes immediately after the short probe response frame is received. The STA may identify the time of transmission of the full beacon frame through the time-related information included in the short probe response frame and may operate in a sleep status until the corresponding time arrives. Upon reaching the corresponding time, the STA may conduct the association/authentication processes.

In case the AP's beacon interval information is included in the short probe response frame, the STA may predict a time at which the STA may receive the full beacon frames continuously transmitted based on the time information associated with the transmission time of the full beacon frame and beacon interval information. By doing so, when determining that the channel status is not good or that there is severe contention due to presence of a number of STAs, the STA, rather than attempting to associate itself with the AP right after receiving the short probe response frame, may perform association at one of the times at which the full beacon frames are continuously transmitted after the short probe response frame is received. The STA may remain in a power saving mode until the time the STA attempts the association, thus saving power.

The STA receiving the short probe response frame and determining whether to perform the association process right away may be conducted based on the full beacon frame transmission time-related information and the beacon interval information that are contained in the short probe response frame. In case the full beacon frame transmission time indicated in the short probe response is after the time that the full beacon interval elapses after the short probe response frame is received, the STA may determine not to immediately attempt to conduct the association. That is, the STA may determine that the AP has instructed the association process to be delayed due to severe contention. In case the full beacon frame transmission time-related information is set as a duration time that lasts until the full beacon frame is transmitted, if the sum of the time of reception of the short probe response frame and the duration time falls after (that is, the time value is larger than) the sum of the time of reception of the short probe response frame and the beacon interval, the STA may determine not to immediately perform the association process. The STA may attempt association at the time that the full beacon frame is transmitted, which is indicated by the short probe response frame, and such operation may lead to mitigation of the contention or the STA may enable the severe contentious situation to be avoided.

The full or short beacon frame contains RAW (Restricted Access Window) allocation information of a corresponding beacon interval time section in the form of an RPS (RAW Parameter Set) IE (Information Element), and the STA, upon reception of the full or short beacon frame, may determine a time for attempting to perform the association/authentication processes based on the included RAW allocation information. That is, the RAW allocation information may include information associated with transmission times of the STAs scheduled by the AP, and the STA may identify the transmission time-related information and may attempt to conduct the association/authentication process in an unassigned, empty slot for the STA. By doing so, the STA may attempt association, avoiding contention.

The STA may request that the AP transmit the short probe response frame, with an RPS IE included in the short probe response frame. In case the RPS IE is included in the short probe response frame when the short probe response frame is transmitted, the STA may identify the transmission times of the STAs scheduled by the AP. Accordingly, the STA, without waiting for reception of the full or short beacon frame, may attempt association/authentication in accordance with the scheduling status by identifying the RPS IE included in the short probe response frame. Further, in case there is no empty slot in the current beacon interval based on the RPS IE included in the short probe response frame, the STA may wait for reception of a full beacon frame that is subsequently transmitted based on the full beacon frame transmission time-related information and the beacon interval information. The STA may identify the presence of an empty slot through the RAW allocation information included in the corresponding full beacon frame and may attempt to perform the association/authentication processes.

In a BSS including specific nodes such as sensor nodes, the full beacon frame may be rarely transmitted or no full beacon frame may be transmitted so as to reduce the overhead that adds due to the transmission of the full beacon frame. The short probe response frame, in such an environment, may also be used to obtain additional information that cannot be acquired through the short beacon frame. In other words, when failing to acquire necessary information through the short beacon frame, the STA may request necessary information by transmitting a probe request frame and may obtain the corresponding information by receiving the short probe response frame. Further, even after the association is done, in case the information of the corresponding BSS has been changed, the AP may notify the STA that the AP and/or BSS information has been changed, e.g., by changing (e.g., incrementing) the value of the change sequence in the short beacon frame, and the STA may request necessary information by transmitting a probe request frame that specifies the necessary information, and the AP may transmit a short probe response frame including the corresponding information. By doing so, the STA may obtain the changed information of the BSS as needed. This may provide the feature that in a wireless LAN environment where no full beacon frame is transmitted or the full beacon frame is rarely transmitted, the AP and/or BSS information may be provided with the minimal traffic without use of the probe response frame.

The scanning process consisting of probe requesting/responding may be used to obtain BSS-related specific information such as regulation-related additional information (e.g., maximum transmission power limit) of the corresponding BSS or EDCA parameters or to measure the channel status, as well as to carry out association. In such case, when the existing full probe response frame is used, a bulky probe response frame including unnecessary information is transmitted, thus resulting in overhead. For the purpose of measuring the channel status, a short probe response frame having little option information may be requested, or in case only particular information of the BSS is required, an explicit request may be sent to the AP for the corresponding option only to be included in the short probe response frame, thereby reducing unnecessary overhead that may be produced when the existing full probe response frame is used.

The option fields and/or option information elements of the short probe response frame as suggested herein may include one or more of the option fields and/or option information elements that may be included in the full probe response frame. Further, the short probe response frame may include all of the option fields and option information that may be included in the existing full probe response frame. Accordingly, the existing full probe response frame may also be implemented to have the format of the short probe response frame as suggested herein, and the suggested short probe response frame may perform the same functions as the full probe response frame. This is advantageous in that the same information included in the full probe response frame may be advantageously expressed in a short probe response frame with shorter length. In case the short probe response frame includes only part of the information included in the full probe response frame, the short probe response frame may be shortened in length as compared with the full probe response frame, and if the operation of the STA and/or AP is guaranteed through the implemented short probe response frame, the overhead of the wireless LAN environment may be decreased.

Hereinafter, the formats of the short probe response frame and the probe request frame that may be introduced for a scanning method according to an embodiment of the present invention are described in greater detail. It is apparent that in the examples of the frame formats suggested below, the fields included in each exemplary format may also be selectively included in a new frame format.

The short probe response frame may include a FC field, a source address field, a destination address field, a time stamp field, a change sequence field, an SSID-related field, a full beacon time field, and an access network option field. The FC field may include information on the frame characteristics of the short probe response frame, and this will be described below in more detail. The source address field may indicate the MAC address of a source STA (or AP) that has generated and transmitted the short probe response frame. The destination address field, when included in the frame, may indicate the MAC address of a target STA that is to receive the short probe response frame. The time stamp field may include time information associated with the time of transmission of the short probe response frame. The SSID-related field may include information on an SSID associated with an AP that has transmitted the short probe response frame. The SSID-related field may be configured to directly indicate the SSID or a compressed SSID. The full beacon time field may include information associated with the time that a particular full beacon frame is transmitted.

The short probe response frame may include option information such as capability information for an AP, beacon interval-related information, supported rate-related information, a country element for power and regulation-related information, power constraint, RSN (Robust Security Network)-related information, interworking-related information, roaming consortium-related information, mesh-related information, channel switch-related information, channel quiet-related information, extended supported rate-related information, EDCA parameter-related information, AP channel report-related information, and etc., as used in an existing full probe response frame. Such option information may be implemented as a specific field or an information element in the short probe response frame. The short probe response frame may include option fields and option IEs, and may selectively include the option fields and option IEs included in the existing full probe response frame.

Whether the option information is included in the short probe response frame may be basically based on a request sent from an STA by a probe request frame. However, when determined by the AP to be needed for the STA, the corresponding necessary information may be included in the short probe response frame even without an explicit request from the STA. For example, information for informing the operational circumstance of the AP (BSS load information, BSS average access delay information, or BSS AC (Access Category) delay information) may be included in the short probe response frame even when the STA does not sent out an explicit request. However, in an implementation, all the information included in the short probe response frame may be sent to be included in the short probe response frame only when it is requested by the STA. In such case, the amount of information included in the short probe response frame may be minimized, thereby reducing the frame to the smallest possible size. Further, when requiring additional information on the BSS after receiving the short beacon frame or after association, the STA may efficiently obtain necessary information using short probe response by selectively requesting only necessary information to the AP.

If the option information implemented as a field and/or IE in the existing full probe response frame is included in the short probe response frame, the short probe response frame may provide all the information that is provided by the full probe response frame to the STA during a scanning process.

Hereinafter, the format of a short probe response frame is described in further detail.

Figure 6:
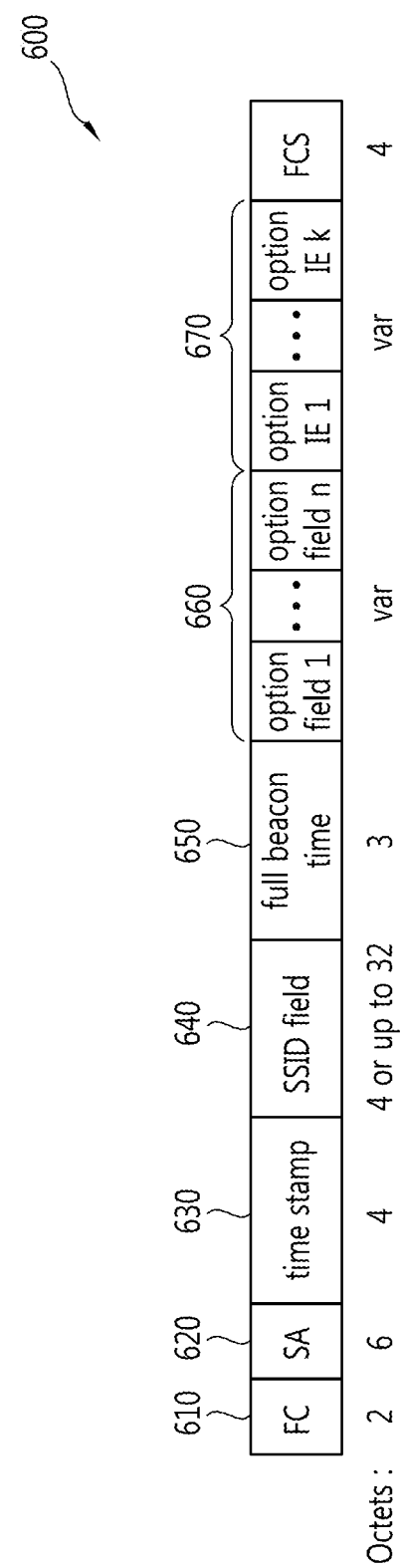
FIG. 6 is a block diagram illustrating a first example of a short probe response frame format according to an embodiment of the present invention.

FIG. 6 is a block diagram illustrating a first exemplary format of a short probe response frame according to an embodiment of the present invention.

Referring to FIG. 6, the short probe response frame 600 may include an FC field 610, an SA field 620, a time stamp field 630, an SSID field 640, and a full beacon time field 650.

The FC field 610 may include information on a frame characteristic. The FC field 610 may be configured to indicate whether the short probe response frame 600 includes specific information. For example, the FC field 610 may be configured to indicate whether the short probe response frame includes a full SSID or a compressed SSID, operating BW (bandwidth) of the current BSS, whether the security function is used in the BSS (e.g., whether RSNA is used by the AP), whether an access network option field associated with interworking is included, whether information associated with a full beacon time is included, and whether other option fields and/or option IEs are included. The FC field included in the short probe response frame according to an embodiment of the present invention will be described below in greater detail.

The SA field 620 may indicate, as identification information, the MAC address of an AP that generates and transmits the short probe response frame.

The time stamp field 630 may indicate the time of transmission of the short probe response frame. The receiving STA may perform timing synchronization with an AP through the time indicated by the time stamp field 630.

The SSID field 640 may be configured to indicate a full SSID or a compressed SSID of a BSS that is operated by an AP. Whether the SSID field 640 indicates the full SSID or the compressed SSID of the BSS may correspond to an indication made by a probe request frame that is transmitted by the STA. In case the STA requests a compressed SSID in the probe request frame, the SSID field 640 may be configured to indicate the compressed SSID. In case the STA requests the full SSID in the probe request frame, the SSID field 640 may be configured to indicate the full SSID. In case the STA does not include separate indication information in the probe request frame, the SSID field 640 may be configured to indicate an SSID or compressed SSID as default.

The full beacon time field 650 may include information associated with transmission time of a very next full beacon frame that is transmitted right after the short probe response frame 600. The full beacon time field 650 may indicate a time that the very next full beacon frame is transmitted. Or, the full beacon time field 650 may indicate a time duration that lasts from the time that the short probe response frame 600 is transmitted until the time that the very next full beacon frame is transmitted.

In case the information associated with the transmission time of the full beacon frame is implemented with the time duration from the transmission time of the short probe response frame 600 to the transmission time of the next full beacon frame, the AP should calculate the time duration whenever the AP transmits the short probe response frame, but this allows the time-related information to be implemented in short length, e.g., 1 or 2 octets. In contrast, when the time the next full beacon frame is transmitted is indicated, the AP may include the same information in the frame when transmitting the frame, without the need of calculating the time duration whenever the AP transmits the short probe response frame, within the same full beacon interval, however, this is disadvantageous in that the size of the information may be increased as compared with when the implementation is made based on the time duration. For example, three octets may be implemented using the most significant three bytes of the 4 LSBs of the transmission time of the next full beacon frame.

The short probe response frame 600 may further include one or more option fields 660 and one or more option information elements 670.

One or more option fields 660 may be implemented as fields associated with capability information. One or more option information elements 670 may be implemented as at least one of a country information element, a power constraint information element, an RSN information element, an interworking information element, a roaming consortium information element, a mesh information element, and an information element associated with the capability required for the next-generation wireless LAN communication. One or more option fields 660 and one or more option information elements 670 may be implemented to correspond to information requested by the probe request frame that is transmitted from the STA.

Figure 7:
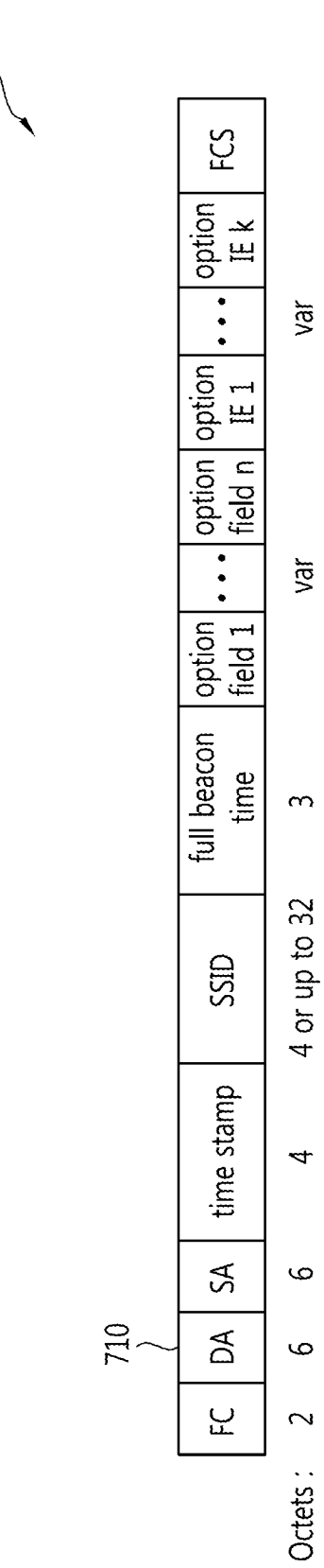
FIG. 7 is a block diagram illustrating a second example of a short probe response frame format according to an embodiment of the present invention.

FIG. 7 is a block diagram illustrating a second example of a short probe response frame format according to an embodiment of the present invention.

Referring to FIG. 7, the short probe response frame 700 further includes a DA (Destination Address) field 710 in comparison with the short probe response frame 600 shown in FIG. 6. The DA field 710 may include information for identifying a target STA that is to receive the short probe response frame 700. The DA field 710 may include the MAC address of the target STA. The DA field 710 may include a short identifier that is shorter than the MAC address of the target STA. For example, an identifier for the target STA, which is shorter than the MAC address, may be implemented by combining the FCC (Frame Check Sequence), scrambler seed or other information of a probe request frame that has triggered the short probe response frame to be transmitted.

Since the short probe response frame 600 shown in FIG. 6 does not include a DA field, the short probe response frame 600 may be transmitted in a broadcast manner. On the contrary, the short probe response frame 700 shown in FIG. 7 includes a DA field 710, and is thus transmitted to the target STA in a unicast manner.

Figure 8:
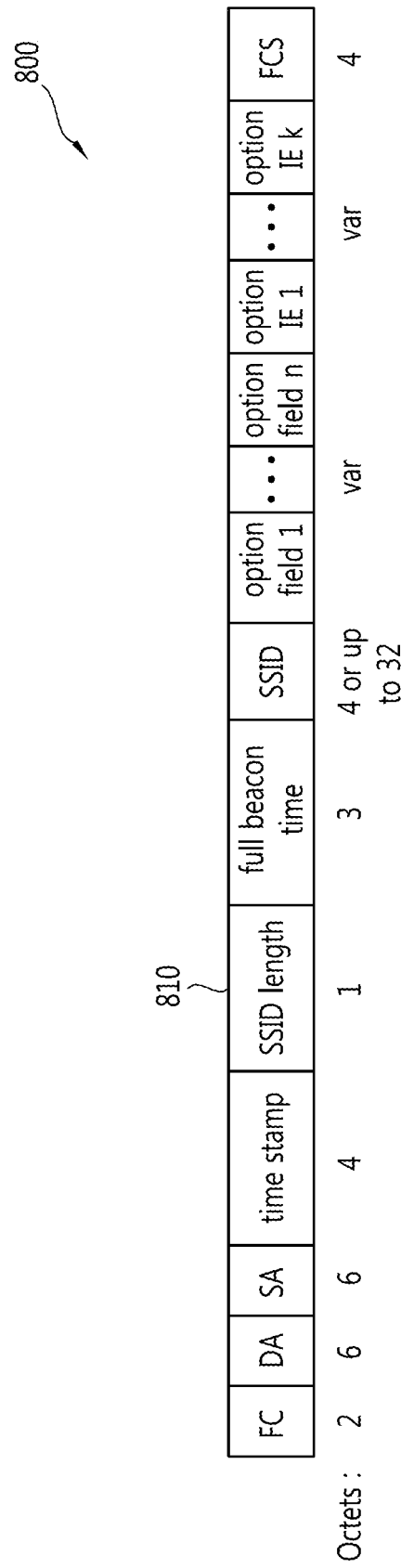
FIG. 8 is a block diagram illustrating a third example of a short probe response frame format according to an embodiment of the present invention.

FIG. 8 is a block diagram illustrating a third example of a short probe response frame according to an embodiment of the present invention.

Referring to FIG. 8, the short probe response frame 800 further includes an SSID length field 810 in comparison with the short probe response frame 700 shown in FIG. 7. Since the SSID with the maximum length of the SSID is rarely used, the actual SSID length included in the short probe response frame 800 may be indicated by the SSID length field 810. By doing so, the SSID field may occupy the actually used length of SSID, not the maximum length of SSID, so that the length of the short probe response frame 800 may be reduced, thereby decreasing traffic. Meanwhile, in case the SSID field includes the compressed SSID, the SSID length field 810 may be set as a reserved value.

In case the format of the short probe response frame 800 shown in FIG. 8 is introduced, the short probe response frame has a format similar to that of the short beacon frame, and the short probe response frame may be easily implemented.

Although the short probe response frame 800 is shown to include a DA field, the DA field may not be included in the short probe response frame 800, so that the short probe response frame 800 may be transmitted only in a broadcast manner.

Figure 9:
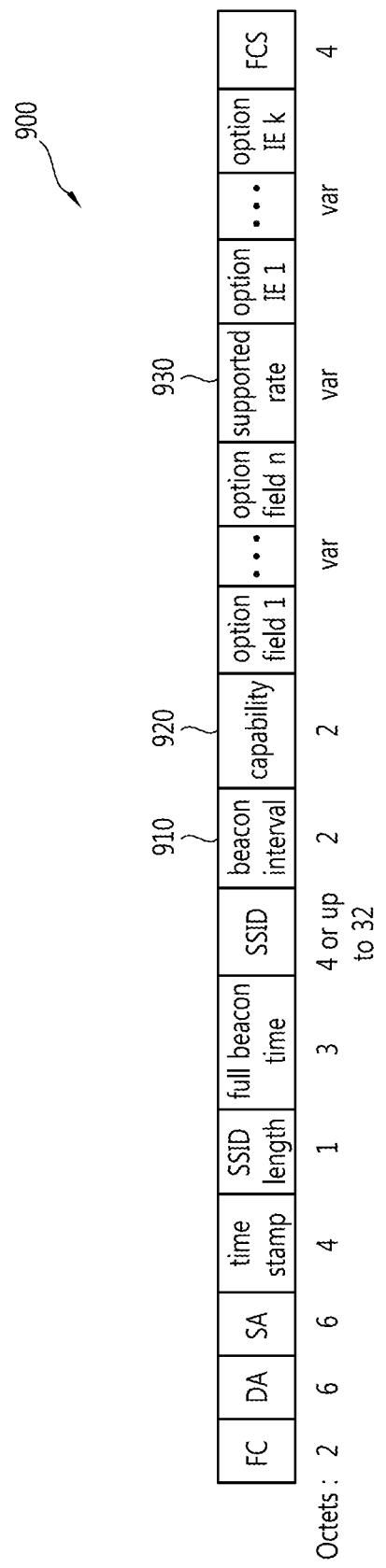
FIG. 9 is a block diagram illustrating a fourth example of a short probe response frame format according to an embodiment of the present invention.

FIG. 9 is a block diagram illustrating a fourth example of a short probe response frame according to an embodiment of the present invention.

Referring to FIG. 9, the short probe response frame 900 may further include a beacon interval field 910, a capability field 920, and a supported rate field 930 as compared with the short probe response frame 800 shown in FIG. 8.

The beacon interval field 910 may indicate the transmission period of a full beacon frame periodically broadcast to the BSS of the AP.

The capability field 920 may include information on capabilities of the AP and/or BSS.

The supported rate field 930 may include information on rates supported by the BSS of the AP.

In case the beacon interval field 910, the capability field 920, and the supported rate field 930 are always included in the short probe response frame 900, the FC field may not include information indicating whether these fields are included. Further, the STA may not include, in the probe request frame, indication information requesting that information associated with the corresponding fields be provided in the short probe response.

Or, part of the information associated with the fields may be optionally included in the short probe response frame 900, and a bit indicating whether it is included in the short probe response frame 900 may be included in the FC field. Further, a request for such information may be explicitly included in the probe request frame.

Although not shown in FIG. 9, the short probe response frame 900 may further include an access network option field, and in such case, the short probe response frame 900 may be implemented in the similar format with the short beacon frame. The FC field may include an interworking bit indicating whether the access network option field is included.

Although the short probe response frame 900 is shown to include a DA field, the DA field may be implemented to be omitted so that the short probe response frame 900 is transmitted in a broadcast manner.

Figure 10:
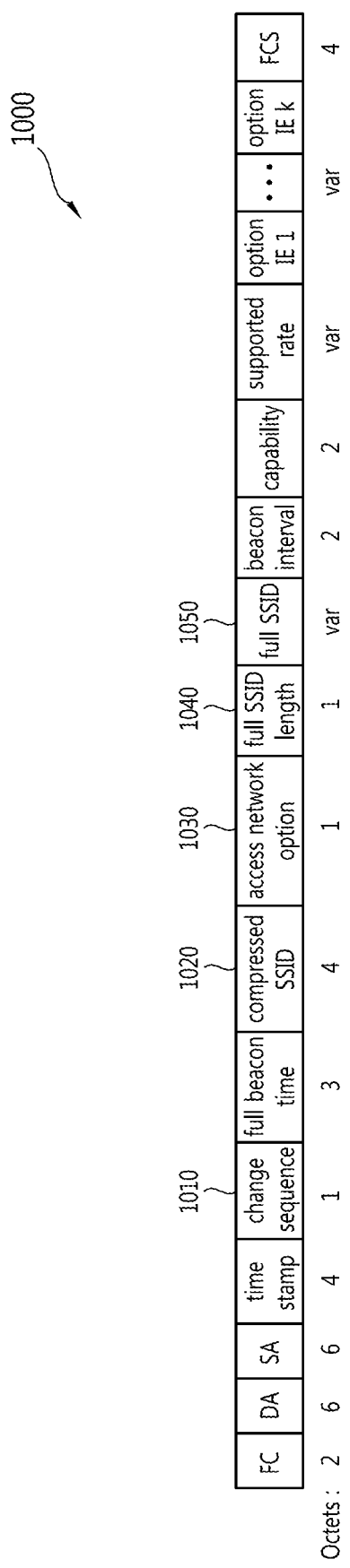
FIG. 10 is a block diagram illustrating a fifth example of a short probe response frame format according to an embodiment of the present invention.

FIG. 10 is a block diagram illustrating a fifth example of a short probe response frame according to an embodiment of the present invention.

Referring to FIG. 10, the short probe response frame 1000 includes a change sequence field 1010, a compressed SSID field 1020, an access network option field 1030, an SSID length field 1040, and an SSID field 1050. The functions of the remaining fields that are not referenced in the short probe response frame shown in FIG. 10 are the same as the functions of the corresponding fields included in the short probe response frame described above in connection with FIGS. 6 to 9, and the detailed description thereof is omitted.

The short probe response frame 1000 shown in FIG. 10 has a format similar to the format of the short beacon frame but further includes fields associated with an SSID and beacon interval, capability, and supported rates.

The change sequence field 1010 may indicate whether the information associated with the BSS of the AP has been changed. The change sequence field 1010 may be configured to, when the BSS-related information of the AP is changed, indicate another value, and as an example, may be implemented to increment a previous value.

The STA may determine, through a value indicated by the change sequence field 1010, whether previously obtained AP and/or BSS-related information has been changed. The STA, when the AP and/or BSS-related information has been previously obtained through the short beacon frame and/or full beacon frame, may compare a value of the change sequence field associated with the corresponding short beacon frame and/or full beacon frame with a value of the change sequence field 1010 of the received short probe response frame 1000. In case the value has been changed (e.g., when the value has been increased), this means that the AP and/or BSS-related information has been updated, and thus, the STA may transmit a probe request frame to the AP so as to obtain the updated information.

The compressed SSID field 1020 may include a compressed SSID.

The access network option field 1030 may include information associated with an interworking service capability. A STA for off-loading may require information of the access network option field for the purpose of roaming, and if necessary, the STA may send a probe request frame to the AP, with the probe request frame including information requesting the information associated with the access network option field 1030.

In case the frame is constituted as such, the configuration from the beginning of the frame up to the access network option field 1030 has the same format with short beacon frame, thus allowing for an easy implementation.

Meanwhile, as shown, the short probe response frame 1000, as compared with the short beacon frame, may further include a full SSID length field 1040 and a full SSID field 1050. In case the STA requests, by sending out a probe request frame, that the compressed SSID be provided, the full SSID length field 1040 and the full SSID field 1050 may not be included in the short probe response frame 1000. On the other hand, in case the STA requests through transmission of the probe request frame that the whole SSID, full SSID, be provided, the compressed SSID field 1020 may be excluded while the full SSID length field 1040 and the full SSID field 1050 are included in the short probe response frame 1000. The full SSID length field 1040 may indicate the length of the full SSID, and the full SSID field 1050 may be configured to indicate the full SSID of the corresponding BSS. In case the full SSID with the maximum full SSID length is not used thereof, the full SSID field 1050 may be configured to include the SSID with actually used length of SSID, and in such case, the full SSID length field 1040 may be configured to indicate the actually used length of SSID. When thusly implemented, the length of the short probe response frame may be reduced.

The beacon interval field, capability field, and supported rate field may be always included in the short probe response frame, so that a bit indicating whether these fields are included may be excluded from the FC field. In such case, the probe request frame may exclude information requesting that information on the fields be provided in the short probe response.

One or more of the beacon interval field, capability field, and supported rate field may be optionally included in the short probe response frame, and in such case, a bit indicating whether the selectively included fields are present may be included in the FC field. Under such circumstance, the probe request frame may include information requesting that information on the corresponding fields be provided.

Meanwhile, the information associated with the beacon interval, capability and supported rates may be implemented not as specific fields but as IEs associated with the capability of the next-generation wireless LAN system. Such IEs may be included as option IEs of the short probe response frame.

Further, the full SSID field and the full SSID length field may be implemented as a single full SSID IE.

In case the information associated with the beacon interval, capability, and supported rates is included in the short probe response frame as particular IEs and/or particular fields, a bit indicating whether the corresponding information is included in the short probe response frame as fields and/or IEs may not be included in the FC field. However, as long as information on at least one of the beacon interval, capability, and supported rates is optionally included in the short probe response frame but not as a field and/or IE, whether the corresponding field is present may be indicated by the option field present subfield of the FC field. In such case, the short probe response frame may be implemented in the format shown in FIG. 11.

Figure 11:
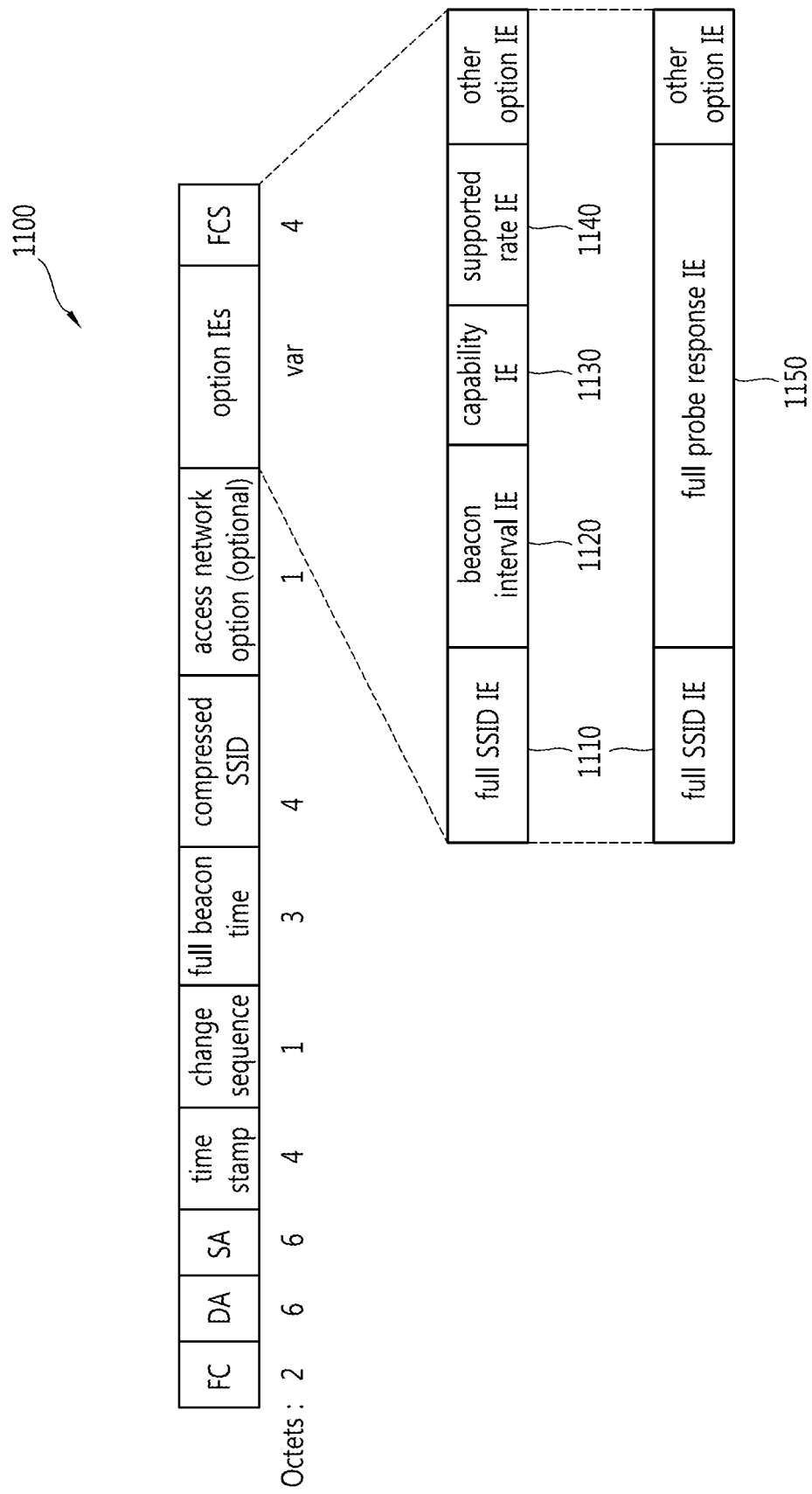
FIG. 11 is a block diagram illustrating a sixth example of a short probe response frame format according to an embodiment of the present invention.

FIG. 11 is a block diagram illustrating a sixth example of a short probe response frame format according to an embodiment of the present invention.

Referring to FIG. 11, as compared with the short probe response frame 1000 shown in FIG. 10, information associated with a full SSID, a beacon interval, a capability, and supported rates is included in the form of IEs. For example, the SSID IE 1110 adopts the SSID IE present in the existing 802.11 standard, and the beacon interval-related information may be defined and used as a beacon interval IE 1120, and the capability may be defined and used as a capability IE 1130. The supported rate 1140 may adopt the supported rate IE of the existing 802.11 standard. Above information may be included in the short probe response frame in the form of each separate IE. Or, among them, rather the capability or beacon interval being defined as separate IEs, they may be implemented to be included in the option IE part of the short probe response frame in the form of a full probe response completion IE that is a single IE including a time stamp complete field 1250 in addition to the beacon interval field 1240 and the capability field 1230. The detailed format of the full probe response completion IE may be shown in FIG. 12.

When implementing the short probe response frame in the format shown in FIG. 11, whether each IE that may be included as the option IE is included may be indicated by the FC field. The IE as shown is merely an example and is not necessarily included.

The full SSID IE may be included when the full SSID is requested to be included in the short probe response frame, and the full SSID IE may be configured to indicate the full SSID. In this connection, the full SSID present subfield included in the FC field may indicate whether the compressed SSID or full SSID is included in the short probe response frame. In case the full SSID IE is included of indicating the full SSID, the full SSID present subfield may be set as '1' to indicate that the full SSID is included in the short probe response frame. At this time, the compressed SSID field may be configured to indicate the compressed SSID field or to have any value that means 'null.' On the contrary, in case no full SSID IE is included, the full SSID present subfield is set as '0' to indicate that the compressed SSID is included in the short probe response frame. In such case, the compressed SSID field may be configured to indicate the compressed SSID.

In case the short probe response frame is implemented in the format as shown in FIG. 11, the short probe response frame happens to have the same format as the short beacon frame, and thus, it may be easily implemented. In other words, when the short beacon frame and the short probe response frame are transmitted, the same information may be provided, thus enabling an efficient implementation and processing. Further, as the full SSID, rather than a new field being defined, the existing SSID IE may be employed, thus resulting in a minimized change in the existing standards.

A short beacon interval IE may be further included in the option IE of the short probe response frame 1100 to implement short beacon interval indication information that refers to the transmission period of the short beacon frame. The short beacon interval IE may be configured to indicate the short beacon interval by expressing the full beacon interval with a TU (Time Unit).

Meanwhile, the time stamp field included in the short beacon frame and the short probe response frame may include only four LSBs (Least Significant Bits) of the TSF (Timing Synchronization Function) of the transmission STA. Upon active scanning, the STA may require a full time stamp, and thus, may include, in the option IE of the short probe response frame 1100, an IE that indicates the remaining four MSBs (Most Significant Bits) of the full time stamp. For this purpose, the option IE part of the short probe response frame 1100 may further include a time stamp IE to indicate it. When receiving the short probe response frame, the STA may learn the full time stamp through the time stamp field and the time stamp IE, and based on it, may synchronize itself with the AP with respect to timing.

The probe request frame may be used to learn channel information, regulatory domain-related information, or specific information on the BSS in addition to active scanning, and in such case, there is no need for information associated with full time stamp, short beacon interval, full beacon interval, or capability. Accordingly, a beacon interval IE, a short beacon interval IE, or a capability IE may be optionally requested when the probe request frame is transmitted. In case the AP transmits the short probe response frame not for active scanning but for obtaining channel information, regulatory domain-related information and/or BSS information, the AP may transmit the short probe response frame, with the information related to full time stamp, short beacon interval, full beacon interval, and capability excluded therefrom. In such case, since the capability-related information is included in the form of an IE, the FC field may exclude a bit that indicates whether the capability-related information is included in the short probe response frame.

Further, since the change sequence field is not the information that is directly required by the STA performing active scanning, the change sequence field may be excluded from the short probe response frame. However, in case the change sequence field is included, when a short probe response frame is transmitted in response to a probe request frame sent from another STA, the change sequence field information of the corresponding short probe response frame may be checked to identify whether the AP and/or BSS-related information have been changed. Further, in case the AP and/or BSS-related information has been changed, a request that the changed information be provided may be sent to the AP by transmitting the probe request frame.

Figure 12:
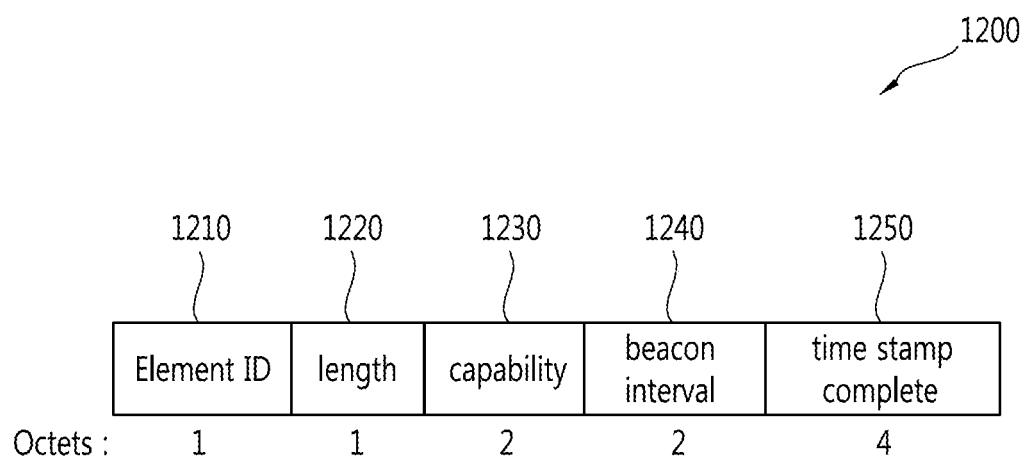
FIG. 12 is a block diagram illustrating the format of a full probe response completion IE according to an embodiment of the present invention.

Meanwhile, when implementing the option IE part of the short probe response frame 1100, a full probe response completion IE as shown in FIG. 12 may be implemented and included.

FIG. 12 is a block diagram illustrating the format of a full probe response completion IE according to an embodiment of the present invention.

Referring to FIG. 12, the full probe response completion IE 1200 may include an element ID field 1210, a length field 1220, a capability field 1230, a beacon interval field 1240, and a time stamp complete field 1240. The element ID field 1210 may include information to identify that a corresponding IE is the full probe response completion IE 1200. The length field 1220 may indicate the length of fields that are subsequently included. The capability field 1230 may include information on capabilities of the AP and/or BSS. The beacon interval field 1240 may include information associated with the interval of the full beacon frame and/or short beacon frame. The time stamp complete field 1250 may include information associated with the full time stamp. For example, the time stamp complete field 1250 may include 4 MSBs (Most Significant Bits) of the full time stamp (i.e., TSF) at a transmission time on the side of the AP.

The length of the short probe response frame may be reduced when the short probe response frame includes the full probe response completion IE 1200 as compared when the short probe response frame includes IEs for capability, beacon interval, and time stamp-related information. Under the circumstance where the STA primarily desires to receive the full probe response frame, the AP may transmit the short probe response frame with the full probe response completion IE 1200 included in the short probe response frame, so that a shorter length of frame may be transmitted while all the information of the full probe response frame may be provided to the STA.

Meanwhile, an IE format may be suggested for selectively sending out specific information among the capability-related information, beacon interval-related information, and time stamp-related information, and the corresponding IE may be implemented as one of the option IEs of the short probe response frame. This may be implemented in the format as shown in FIG. 13.

Figure 13:
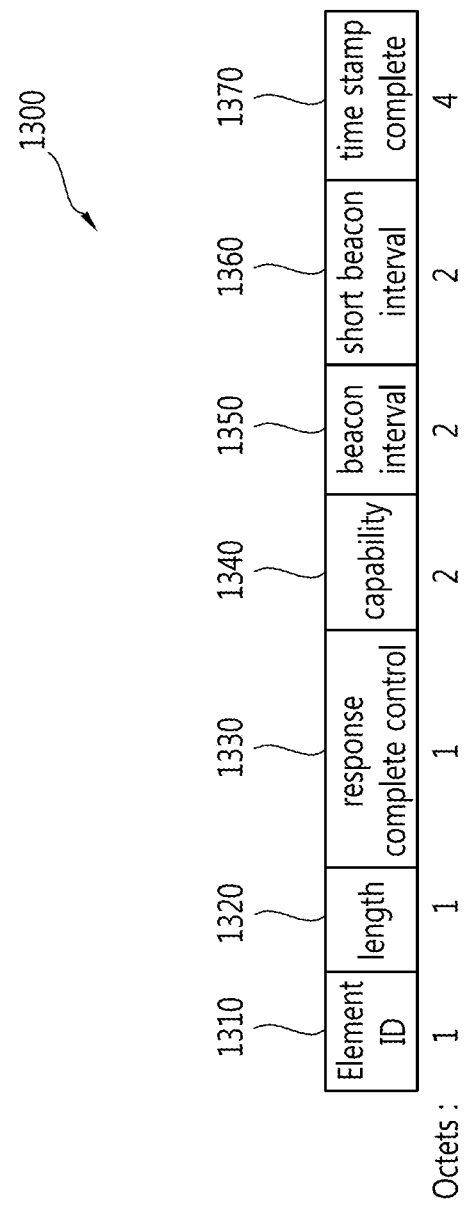
FIG. 13 is a block diagram illustrating a format of a selective probe response completion IE according to an embodiment of the present invention.

FIG. 13 is a block diagram illustrating a format of a selective probe response completion IE according to an embodiment of the present invention.

Referring to FIG. 13, the selective probe response completion IE 1300 includes an element ID field 1310, a length field 1320, and a response complete control field 1330. The selective probe response completion IE 1300 may include at least one of a capability field 1340, a beacon interval field 1350, a short beacon interval field 1360, and a time stamp complete field 1370.

The element ID field 1310 may include information to identify that a corresponding IE is the selective probe response completion IE 1300. The length field 1320 may indicate the length of fields that are subsequently included. The capability field 1340 may include information on capabilities of the AP and/or BSS. The beacon interval field 1350 may include information associated with the interval of the full beacon frame. The short beacon interval field 1360 may include information associated with the interval of the short beacon interval. The time stamp complete field 1370 may include information associated with the full time stamp-related information.

The response complete control field 1330 may indicate which field is included the selective probe response completion IE 1300. The response complete control field 1330 may be implemented in the type of a bitmap, and a specific bit of the bitmap may indicate which specific information field is included. For example, in case a bit sequence constituting the response complete control field 1330 is '00001111,' the selective probe response completion IE 1330 may be interpreted as including the capability field 1340, the beacon interval field 1350, the short beacon interval field 1360 and the time stamp complete field 1370.

Meanwhile, which information field is included in the selective probe response completion IE 1300 may be determined depending on what is requested by the STA through transmission of a probe request frame.

Figure 14:
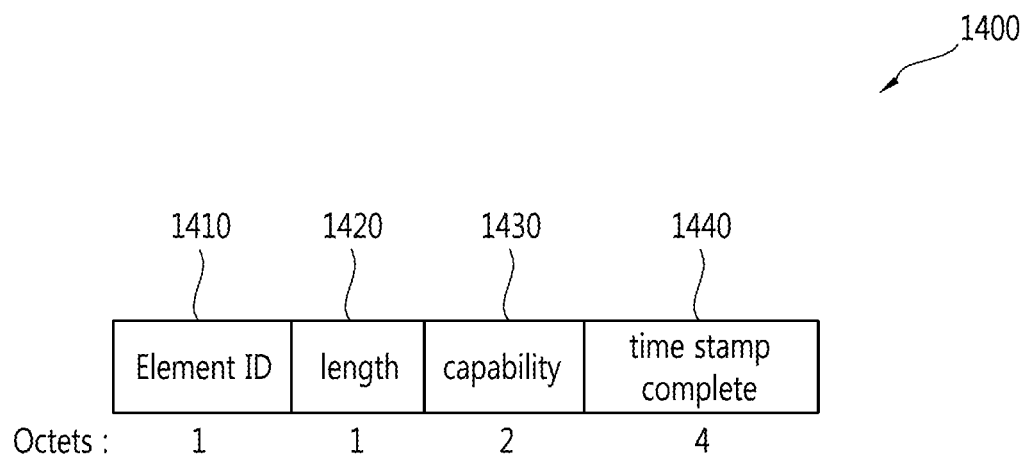
FIG. 14 is a block diagram illustrating a format of a reduced probe response completion IE according to an embodiment of the present invention.

FIG. 14 is a block diagram illustrating a format of a reduced probe response completion IE according to an embodiment of the present invention.

Referring to FIG. 14, the reduced probe response completion IE 1400 includes an element ID field 1410, a length field 1420, a capability field 1430, and a time stamp complete field 1440.

The element ID field 1410 may include information to identify that a corresponding IE is the reduced probe response completion IE 1400. The length field 1420 may indicate the length of fields that are subsequently included. The capability field 1430 may include information for capabilities of the AP and/or BSS. The time stamp complete field 1440 may include information associated with the full time stamp.

Since the interval of the beacon frame and the interval of the short beacon frame are not required for the STA that performs active scanning, a reduced probe response IE excluding the information may be provided to the STA.

A probe request may be used to obtain channel information, regulatory domain-related information or specific information for the BSS in addition to active scanning, and in such case, information such as the full time stamp, interval of the short beacon frame and interval of the full beacon frame, and capability may not be needed. Under such circumstance, in case the STA does not explicitly request the probe response complete IE upon transmission of the probe request frame, the AP may not include the corresponding IE to the probe response frame.

In case the short probe response frame described above in connection with FIGS. 6 to 14 is broadcast, there is no need for reception of an acknowledgement (ACK) from the receiving STA, and STAs other than the STA that has sent the probe request frame may also utilize the information included in the short probe response frame. By doing so, the transmission of probe request frames may be omitted, thus leading to a reduction in network traffic.

Meanwhile, since broadcasting suffers from a low transmission speed as compared with unicasting and lacks the reception of an ACK, broadcasting may have low transmission reliability. In contrast, if a short probe response frame includes a DA field as shown in FIGS. 7 to 11 and is transmitted in a unicast manner, only a particular target STA may receive information through the short probe response frame, thus resulting in accelerated transmission speed together with increased transmission reliability through the ACK.

The AP, under the network circumstance with high traffic and many STAs that perform scanning, may broadcast a short probe response frame. By doing so, a short probe response frame once transmitted may be received by several STAs, thus increasing scanning efficiency and reducing traffic. In such case, if each STA verifies that necessary information is missing from the broadcast short probe response frame, the STA may wait for reception of a full beacon frame using full beacon time information. The corresponding STA may obtain necessary information by receiving the full beacon frame. Further, if each verifies that the broadcast short probe response frame lacks its necessary information, the STA may transmit a probe request frame to the AP to request that the AP transmit the necessary information to the STA. In response, the AP may unicast a short probe response frame including the information requested by the corresponding STA.

Even when the short probe response frame is unicast, STAs other than the target STA may overhear the corresponding short probe response frame. At this time, the STA may use the obtained information for its own operation. In case the overheard short probe response frame includes all information for the operation (e.g., information necessary for association), the STA, rather than transmitting a separate probe request frame to the AP, may attempt to perform association/authentication using the corresponding information. In case the overheard short probe response frame lacks some pieces of information, the STA may send a probe request frame to the AP to request that the AP provide the necessary information. As such, when an STA may utilize the information of the short probe response frame that is not targeted for the STA by overhearing, traffic for probe request/response may be reduced.

Even though a STA has obtained information on the BSS by receiving short beacon, full beacon, previous short probe response, and full response, if a change sequence value of a short probe response that is requested by another STA and overheard by the corresponding STA is larger than the value that the corresponding STA knows, this means that the information of the corresponding BSS has been updated, and thus, a probe request may be additionally transmitted by the corresponding STA to obtain the changed information from the AP.

The FC field of a short probe response frame that may be implemented in the above-described various formats is now described in detail.

Figure 15:
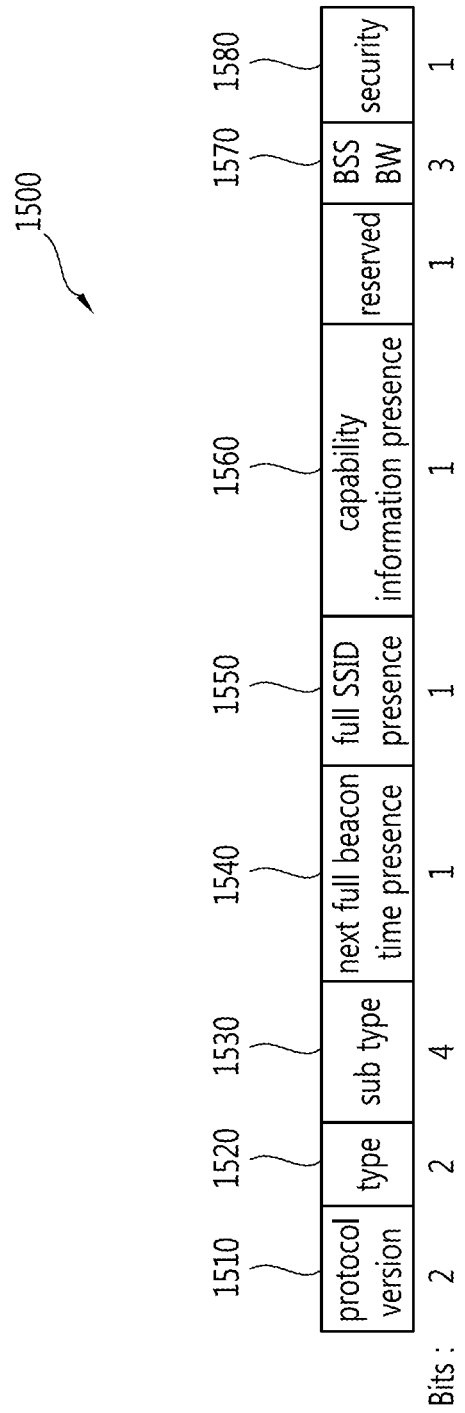
FIG. 15 is a block diagram illustrating an example of an FC field format according to an embodiment of the present invention.

FIG. 15 is a block diagram illustrating an example of an FC field according to an embodiment of the present invention.

Referring to FIG. 15, the FC field 1500 may include a protocol version subfield 1510, a type subfield 1520, a sub type subfield 1530, a next full beacon time presence subfield 1540, a full SSID presence subfield 1550, a capability information presence subfield 1560, a BSS BW subfield 1570, and a security field 1580.

The protocol version subfield 1510 may indicate the version of a protocol that is applied to the short probe response frame including the FC field 1500. The type subfield 1520 and the sub type subfield 1530 may be configured to indicate the type of the frame including the FC field 1500. The STA may determine whether the frame included in the FC field 1500 is a full probe response frame or a short probe response frame through what is indicated by the type subfield 1520 and the sub type subfield 1530. Since in the existing wireless LAN system, the type subfield/sub type subfield setting values for the management frame are mostly in use, to address this, the type subfield value for the short probe response frame may be set as '11' to be expressed as an extension frame.

The next full beacon time presence subfield 1540 may indicate whether the transmission time-related information of a next full beacon frame transmitted after the corresponding short probe response frame is included in the short probe response frame.

The full SSID presence subfield 1550 may indicate whether a full SSID or compressed SSID is included in the short probe response frame. If the full SSID presence subfield 1550 indicates that a full SSID is included in the short probe response frame, the short probe response frame may include a full SSID IE including information that indicates the full SSID. Otherwise, the short probe response frame does not include a full SSID IE, and the compressed SSID field may be configured to indicate a compressed SSID.

The capability information presence subfield 1560 may indicate whether the AP and/or BSS-related capability information is included in the short probe response frame.

The BSS BW subfield 1570 may indicate information associated with a operating bandwidth of a channel in the BSS.

The security subfield 1580 may indicate whether to apply security.

The next full beacon time presence subfield 1540, full SSID presence subfield 1550, capability information presence subfield 1560, BSS BW subfield 1570, and security subfield 1580 are implemented so that, when the STA receives the short probe response frame, each field in the corresponding frame may be easily decoded. In other words, based on the next full beacon time presence subfield 1540, capability information presence subfield 1560, and setting values, the STA may determine whether the related fields are included in the short probe response frame, and may accordingly interpret the frame. Further, based on a value indicated by the full SSID presence subfield 1550, the STA may determine whether the SSID-related information included in the short probe response frame is a full SSID or a compressed SSID. For example, if the full SSID presence subfield 1550 is set as '1,' the STA may determine that a full SSID is included in the short probe response frame. On the contrary, if the full SSID presence subfield 1550 is set as '0,' the STA may determine that a compressed SSID is included in the short probe response frame. Either the full SSID or compressed SSID may be implemented to be included in the short probe response frame.

A reserved bit of the FC field 1500 may be a bit reserved for implementing additional information. For example, the reserved bit may be implemented as a broadcast indication bit for the STA to be able to determine whether the short probe response frame including the FC field 1500 is transmitted in a unicast manner or broadcast manner. In such case, the STA may learn whether the short probe response frame is transmitted in a broadcast manner or unicast manner by identifying a setting value of the broadcast indication bit before identifying whether the short probe response frame includes a DA field or how the DA field is configured. By way of example, in case the broadcast indication bit is set as '1,' the STA may determine that the corresponding short probe response frame has been transmitted in a broadcast manner. In contrast, in case the broadcast indication bit is set as '0,' the STA may determine that the corresponding short probe response frame has been transmitted in a unicast manner.

As another example, the reserved bit may be implemented as a retry bit, and in case the corresponding short probe response frame is transmitted in a unicast manner, may indicate whether it is a duplicated frame.

As still another example, the reserved bit may be configured to indicate whether the corresponding short probe response frame is the one selectively including information depending on a user's request or the one including all the information of the full probe response frame.

Figure 16:
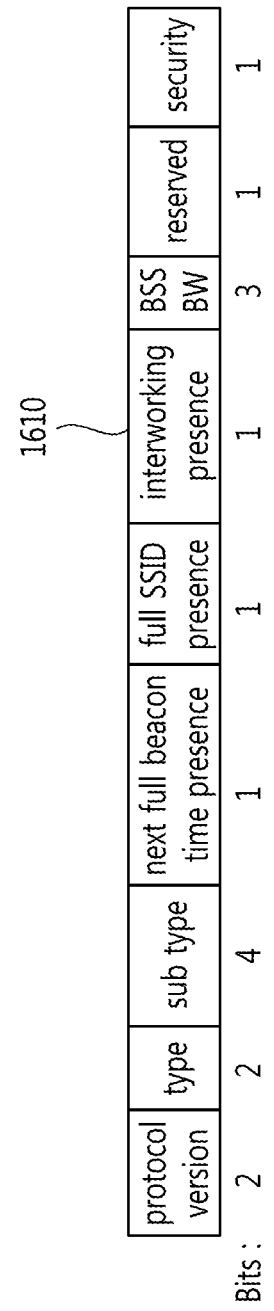
FIG. 16 is a block diagram illustrating another example of a FC field format according to an embodiment of the present invention.

FIG. 16 is a block diagram illustrating another example of a FC field format according to an embodiment of the present invention.

Referring to FIG. 16, unlike the FC field 1500 shown in FIG. 15, the FC field 1600 may include an interworking presence subfield 1610. The interworking presence subfield 1610 may indicate whether an access network option field is included in the short probe response frame including the FC field 1600.

The reserved bit of the FC field 1600 may be used to expand additional functions in the future. For example, the reserved bit may be used to indicate whether the short probe response frame including the FC field 1600 is the one selectively including information depending on a user's request or the one including all the information of the full probe response frame.

The interworking presence subfield 1610 may be implemented through the using reserved bit or a bit allocated to the capability information presence subfield in the FC field 1500 shown in FIG. 15.

Hereinafter, a method of a STA requesting information that is to be included in a short probe response frame is described in detail. The information included in the short probe response frame by the AP may be explicitly indicated by the STA. For such purpose, the STA may transmit a probe request frame to the AP with a probe response option indicator included in the probe request frame. The probe response option indicator is now described in greater detail.

The probe response option indicator may be included in the probe request frame as a probe response option field of the field type. At this time, the probe response option field may be implemented to be included in the fields that are originally included in the probe request frame.

The probe response option indicator may be implemented as a probe response option IE of the IE type instead of the field type and may be included in the probe request frame. This may be represented in the format as shown in FIG. 17.

Figure 17:
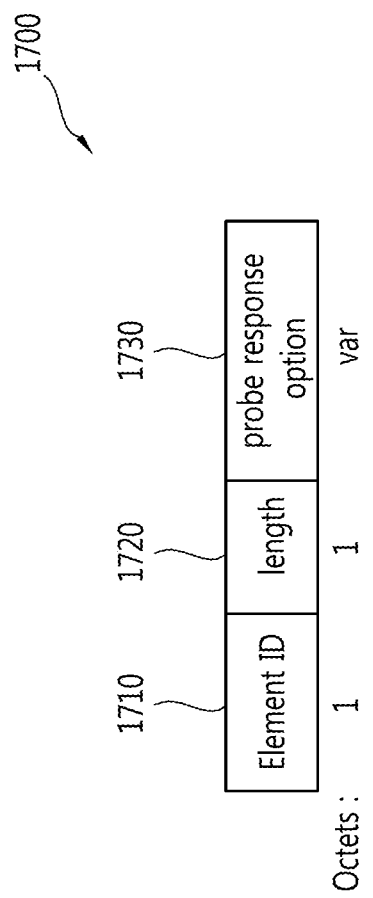
FIG. 17 is a block diagram illustrating an example of a probe response option IE according to an embodiment of the present invention.

FIG. 17 is a block diagram illustrating an example of a probe response option IE according to an embodiment of the present invention.

Referring to FIG. 17, the probe response option IE 1700 may include an element ID field 1710, a length field 1720, and a probe response option field 1730. The element ID field 1710 may include information to identify that the corresponding IE is the probe response option IE 1700. The length field may be configured to indicate the length of a field that is subsequently included, i.e., the probe response option field. The probe response option field 1730 may implement a probe response request indicator to indicate information desired to receive through transmission of the probe request frame. The detailed implementation of the probe response option field 1730 will be described below.

The STA may be configured to indicate required information using the probe response option field. The AP may identify information requested through the probe response option field of the probe request frame, and in response, may transmit, to the STA, a short probe response frame including the requested information.

The STA may be configured to indicate whether the probe response option field requests a full SSID or a compressed SSID, whether the probe response option field requests information on a beacon interval or supported rate-related information, whether the probe response option field requests information relating to the capability of the AP, whether the probe response option field requests power and regulation-related information, whether the probe response option field requests power constraint-related information, whether the probe response option field requests security-related information, whether the probe response option field requests information for roaming and interworking with an external network, whether the probe response option field requests mesh-related information, whether the probe response option field requests information relating to the capability of the next-generation wireless LAN system, and whether the probe response option field requests information relating to the BSS information (channel switch notification information, channel quiet information, extended supported rate information, EDCA parameter information, AP channel report information, etc.). Additionally, other fields and IEs that may be defined in the wireless LAN system, when requested through the probe response option field by the STA, may be provided to the STA by the AP through the short probe response frame.

In previous wireless LAN, to indicate option information to be included in the probe request frame, all element IDs of a corresponding IE are enumerated, and this may render the length of the probe request frame increased since each element ID is expressed as a field having one octet length. It is suggested herein to implement a probe response option indicator in the form of a bitmap in order to obtain necessary information through a short probe response frame. In case the probe response option indicator is implemented in the bitmap, the frame length may be shortened as compared with the existing scheme in which element IDs are included for each requested information.

Information indicating whether information associated with the time that a full beacon frame is transmitted is requested may also be additionally implemented in the probe response option indicator.

Hereinafter, a probe response option field implementing a probe response option indicator is described in more detail.

The probe response option field may be configured to indicate whether all information included in the full probe response frame is requested or minimum information included in the short probe response frame is requested.

1) the probe response option field may include a short probe response request bit and at least one option request field indicating which information is requested. If the short probe response request bit is set as '1,' the AP may transmit the short probe response frame to the STA, with information indicated to be included by at least one option request field (with the corresponding option request field set as '1') included in the short probe response frame. If the short probe response request bit is set as '1,' but all the option request fields are '0's,' the AP may transmit the short probe response frame to the STA, with the minimum amount of information, such as FC field, SA field, time stamp field, compressed SSID field, and full beacon time field, included in the short probe response frame.

If the short probe response request bit is set as '0,' the AP may transmit, to the STA, a full probe response frame or a short probe response frame including all the information included in the full probe response frame. For a particular frame to be requested to be transmitted more explicitly, the probe response option field may further include one indication bit to explicitly send a request for which type of frame of the two schemes is used to conduct transmission.

Or, unless the probe response option field is included in the probe request frame, the AP may transmit the full probe response frame to the STA, and if the probe response option field is included and the short probe response request bit is '0,' the AP may transmit the short probe response frame to the STA, with all the information of the full probe response frame included in the short probe response frame.

2) If the probe response option field is included in the probe request frame, the AP may respond with a short probe response frame, and if the probe response option field is not included, the AP may respond with a full probe response frame. In case the probe response option field is included in the probe request frame, and specific information is indicated to be included by at least one option request field (the corresponding option request field is set as '1'), the AP may transmit a short probe response frame including the corresponding option information to the STA. Or, in case the probe response option field is included, the AP may respond with a short probe response frame, and if the probe response option field is not included, the AP may respond with a short probe response frame including all the information of the full probe response frame instead of responding with the full probe response frame. Further, if the probe response option field is included in the probe request frame, but the option request fields are all set as '0's,' the AP may transmit a short probe response frame to the STA, with a minimum amount of information, such as FC field, SA field, time stamp field, compressed SSID field, and full beacon time field, included in the short probe response frame. In case the probe response option field is included in the probe request frame, and specific information is indicated to be included by at least one option request field (the corresponding option request field is set as '1'), the AP may transmit a short probe response frame including the corresponding option information to the STA. Meanwhile, in case the probe response option field is not included in the probe request frame, whether the AP is to respond with a short probe response frame or with a full probe response frame may be explicitly indicated by the STA, and for such purpose, one indication bit may be included in the probe request frame.

3) In another embodiment, if the short probe response request bit indicates a full probe response, the AP may be configured to transmit, to the STA, a short probe response frame including all the information that is included in the full probe response frame. In case the short probe response request bit is not included and no related option fields are present, the AP may transmit a full probe response frame to the STA.

Figure 18:
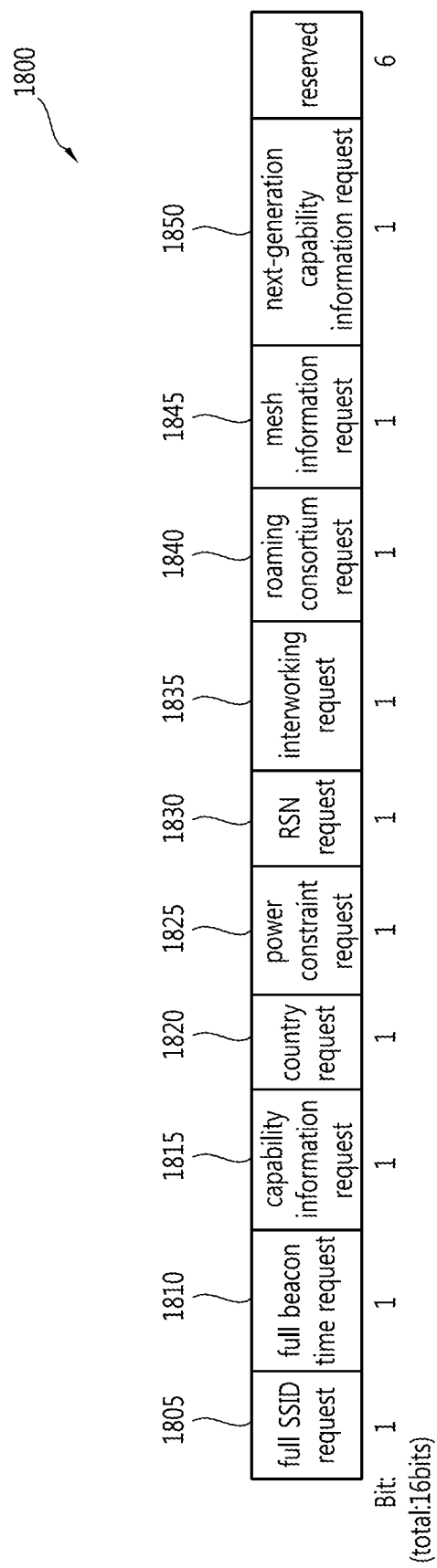
FIG. 18 is a block diagram illustrating an example of a probe response option field format according to an embodiment of the present invention.

FIG. 18 is a block diagram illustrating an example of a probe response option field format according to an embodiment of the present invention.

The probe response option field shown in FIG. 18 does not include a short probe response request bit and may be applied to the example described in 2) above where full probe response/short probe response are distinguished depending on whether a probe response option field is included.

Referring to FIG. 18, the probe response option field 1800 may include a full SSID request subfield 1805, a full beacon time request subfield 1810, a capability information request subfield 1815, a country request subfield 1820, a power constraint request subfield 1825, an RSN request subfield 1830, an interworking request subfield 1835, a roaming consortium subfield 1840, a mesh information request subfield 1845, and a next-generation capability information request subfield 1850.

The full SSID request subfield 1805 may be configured to indicate whether to include a full SSID or to request that a compressed SSID be provided. If the full SSID request subfield 1805 is set as '1,' it indicates that a request is made that a full SSID be provided, and if the full SSID request subfield 1805 is set as '0,' it may indicate that a request is made that a compressed SSID be provided.

The full beacon time request subfield 1810 may be configured to indicate whether information relating to a full beacon frame transmission time is requested. If the full beacon time request subfield 1810 is set as '1,' it indicates that a request is made for a full beacon frame transmission time-related information, and if set as '0,' it may indicate that no request is made for a full beacon frame transmission time-related information.

The capability information request subfield 1815 may be configured to indicate whether capability-related information of the AP and/or BSS is requested to be provided. If the capability information request subfield 1815 is set as '1,' it may indicate that a request is made that capability-related information be included in the short probe response frame, and if set as '0,' it may indicate that such request is not made. The capability-related information may be included in the short probe response frame as a capability information field and/or capability IE.

The country request subfield 1820 may indicate whether a country IE is requested. If the country request subfield 1820 is set as '1,' this indicates that the country IE is requested to be included in the short probe response frame, and if set as '0,' this indicates that such request is not made.

The power constraint request subfield 1825 may indicate whether a power constraint IE is requested. If the power constraint request subfield 1825 is set as '1,' this indicates that the power constraint IE is requested to be included in the short probe response frame, and if set as '0,' this indicates that such request is not made.

The RSN request subfield 1830 may indicate whether an RSN IE is requested. If the RSN request subfield 1830 is set as '1,' this indicates that the RSN IE is requested to be included in the short probe response frame, and if set as '0,' this indicates that such request is not made.

The interworking request subfield 1835 may indicate whether an interworking IE is requested. If the interworking request subfield 1835 is set as '1,' this may indicate that the interworking IE is requested to be included in the short probe response frame, and if set as '0,' this may indicate that such request is not made.

The roaming consortium request subfield 1840 may indicate whether a roaming consortium IE is requested. If the roaming consortium request subfield 1840 is set as '1,' this may indicate that the roaming consortium IE is requested to be included in the short probe response frame, and if set as '0,' this may indicate that such request is not made.

The mesh information request subfield 1845 may indicate whether a mesh IE is requested. If the mesh information request subfield 1845 is set as '1,' this may indicate that a mesh-related IE, such as mesh ID, mesh configuration, MCCAOP (MCF (Mesh Coordination Function) Controlled Access Opportunity) advertisement overview, and MCCAOP advertisement, is requested to be included in the short probe response frame, and if set as '0,' this may indicate that such request is not made.

The next-generation capability information request subfield 1850 may indicate whether a next-generation capability IE for capability-related information of the next-generation wireless LAN system is requested. If the next-generation capability information request subfield 1850 is set as '1,' this may indicate that the next-generation capability IE is included in the short probe response frame, and if set as '0,' this may indicate that such request is not made.

In additions to the subfields as shown, a beacon interval request subfield, a supported rate request subfield, and a BSS load element subfield may be included, and through such subfields, provision of corresponding information may be selectively requested. That is, the subfields for all the information included in the full probe response frame may be implemented in the probe response option field in the form of a bitmap, and by doing so, a selective request may be made.

Meanwhile, subfields corresponding to pieces of information relating to each other may be grouped to indicate whether a request is made.

Figure 19:
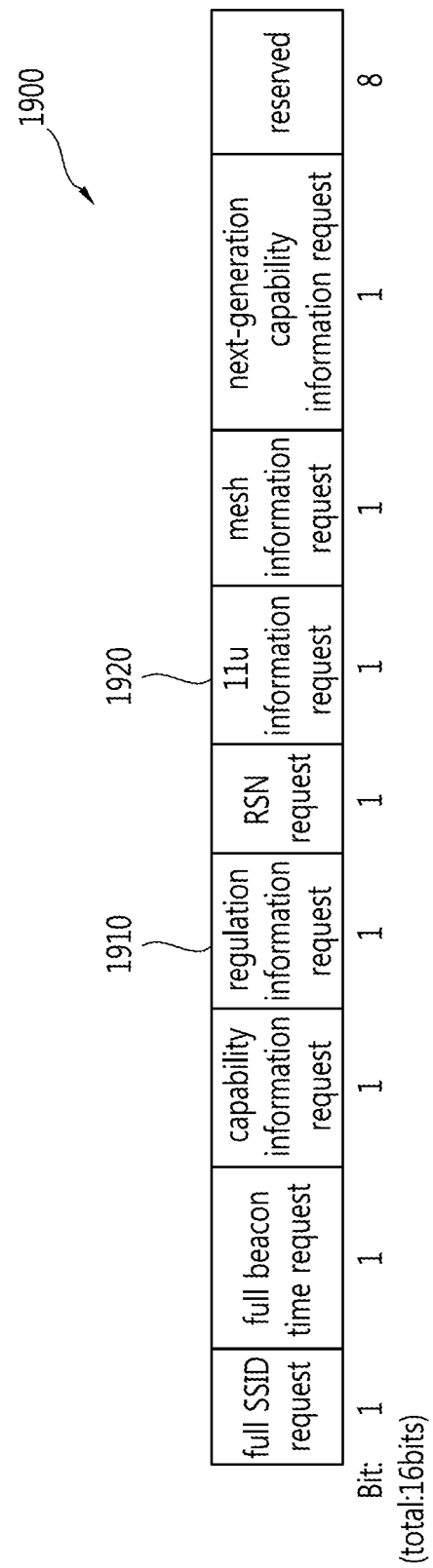
FIG. 19 is a block diagram illustrating a second example of a probe response option field format according to an embodiment of the present invention.

FIG. 19 is a block diagram illustrating a second example of a probe response option field format according to an embodiment of the present invention.

Referring to FIG. 19, the probe response option field 1900, unlike the probe response option field 1800 shown in FIG. 18, may include, instead of the country request subfield 1820, the power constraint request subfield 1825, the interworking request subfield 1835, and the roaming consortium request subfield 1840, a regulation information request subfield 1910 and a 11u information request subfield 1920.

The regulation information request subfield 1910 may indicate whether to request regulation-related IEs such as country IE, power constraint IE, and TPC (Transmit Power Control) report IE. In case the regulation information request subfield 1910 may be configured to request regulation-related IEs, specific regulation-related IEs that are included in the short probe response frame may be determined by the AP.

The 11u information request subfield 1920 may indicate whether to request IEs defined in the IEEE 802.11u standard such as interworking IE, advertisement protocol IE, or roaming consortium IE. In case the 11u information request subfield 1920 may be configured to request related IEs, specific IEs that are included in the short probe response frame may be determined by the AP.

In addition to the subfields as shown, a beacon interval request subfield, a supported rate request subfield, or a BSS load element subfield may be included, and through such subfields, the provision of corresponding information may be selectively requested. That is, the subfields for all the information included in the full probe response frame may be implemented in the probe response option field in the form of a bitmap, and by doing so, a selective request may be made.

The format shown in FIG. 19 has the advantage of being able to reduce the length of the probe response option field, and may fail to individually request the detailed option information that is bundled into groups.

In another method of implementing a probe response option field, information on the device type of the STA may be included in the probe response option field and may be requested.

The STA may include information, in the probe response option field, information indicating that its own device type or service type is a sensor type, an offloading type, a mixed mode type, a VoIP STA type, or a notebook. Besides the option information explicitly requested to be included in the probe response option field by the STA through the corresponding information, the AP may further include the information relating to the device type in the short probe response frame and may transmit the short probe response frame.

In case, in relation to the device type of the STA, the STA sends, through the probe response option field, a request only for basic information such as device type, full SSID request, or full beacon frame time request, the AP may transmit a short probe response frame with information necessary for the corresponding STA device type included in the short probe response frame. In such case, the length of the probe request frame may be reduced.

Figure 20:
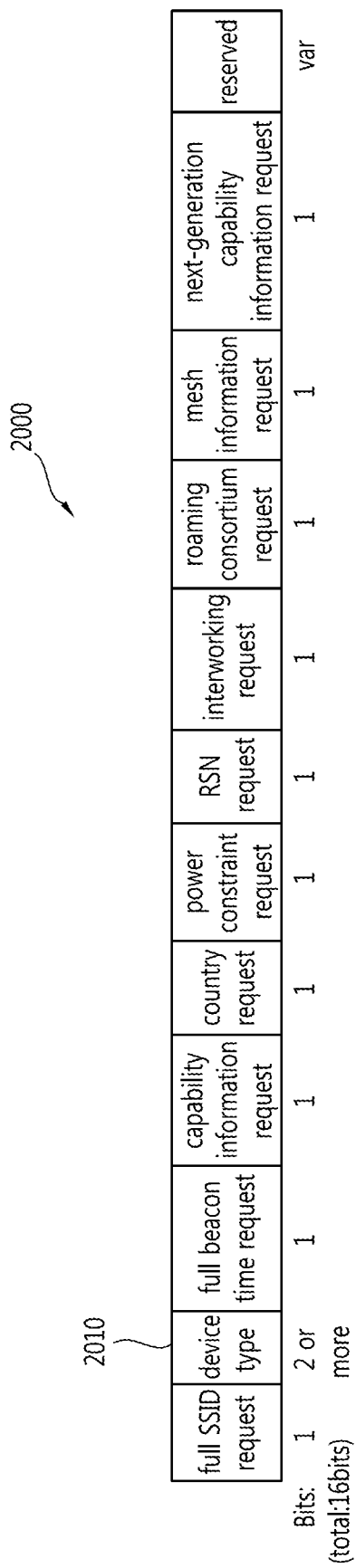
FIGS. 20 and 21 are block diagrams illustrating a third example and fourth example of a probe response option field format according to embodiments of the present invention.
Figure 21:
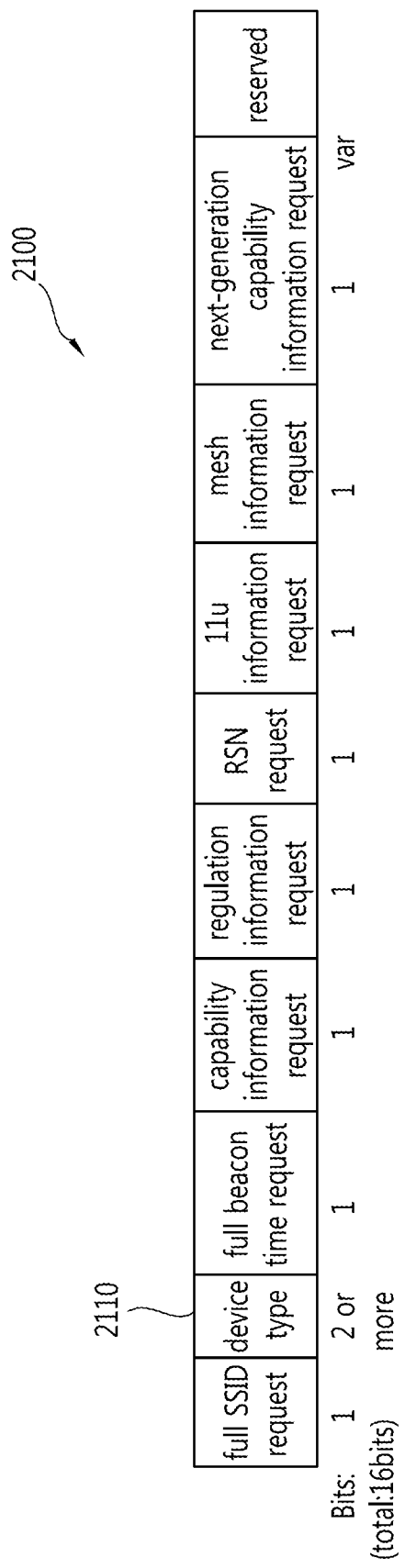

FIGS. 20 and 21 are block diagrams illustrating a third example and fourth example of a probe response option field format according to embodiments of the present invention.

Referring to FIG. 20, the probe response option field 2000 includes, in addition to the probe response option field 1800 format shown in FIG. 18, a device type subfield 2010.

Referring to FIG. 21, the probe response option field 2010 includes, in addition to the probe response option field 1800 format shown in FIG. 19, a device type subfield 2110.

In case the probe response option field shown in FIG. 20 or FIG. 21 is included in a probe request frame when the probe request frame is transmitted, additional information may be included in a short probe response frame through the device type subfield 2010 or 2110 in addition to the information explicitly requested by the STA and may be transmitted to the STA.

Figure 22:
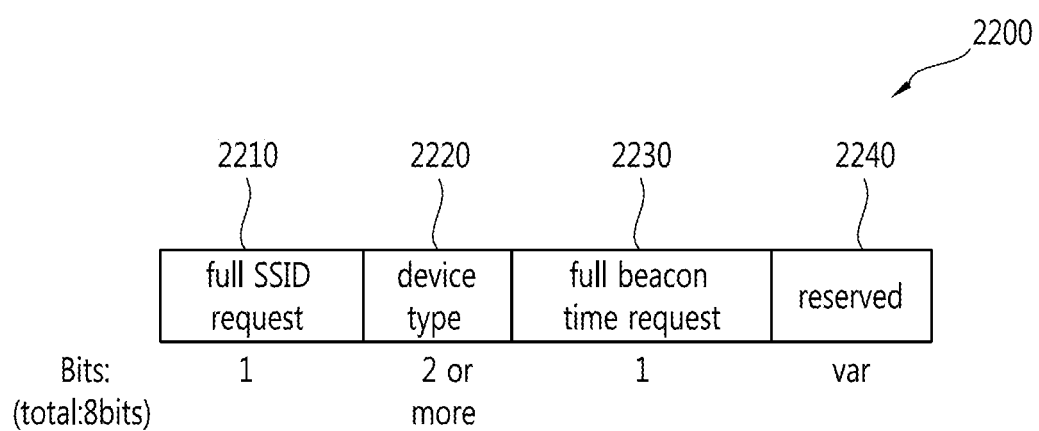
FIG. 22 is a block diagram illustrating a fifth example of a probe response option field format according to an embodiment of the present invention.

FIG. 22 is a block diagram illustrating a fifth example of a probe response option field format according to an embodiment of the present invention.

Referring to FIG. 22, the probe response option field 2200 includes a full SSID request subfield 2210 and a full beacon time request subfield 2230. The STA may request provision of information basically necessary for attempting to conduct association/authentication later.

The probe response option field 2200 further includes a device type subfield 2220. The AP may include, in a short probe response frame, related information through the device type subfield 2220 included in the probe response option field 2200 of the probe request frame and may transmit the short probe response frame to the STA.

According to the probe response option field as shown in FIG. 22, the STA, although not sending an explicit request for option information, may obtain option information relating to the corresponding device type from the AP through the device type subfield 2220. For example, if the device type is an offloading device, even when an explicit request for roaming-related information is not made, the AP may include, in a short probe response frame, IEs for implementing offloading-related information, such as a roaming consortium IE and an interworking IE, and may transmit the short probe response frame to the STA.

As another example of implementing the probe response option field, the probe response option field may be configured to request only the changed information of the corresponding AP and/or BSS information. That is, in case the AP and/or BSS information is changed in the short beacon frame, the fact that the change has been made may be reported by incrementing the value of the change sequence in the short beacon. The STA may transmit a probe request frame to the AP with the change sequence value recently received from the short beacon frame included in the probe request frame. The AP may grasp information included in the short beacon frame received most recently by the STA through the change sequence value included in the probe request frame, may determine whether there is information changed in the BSS subsequently after the STA has receive the previous information with the change sequence value, and transmits a short probe response with only the changed information included in the short probe response.

Figure 23:
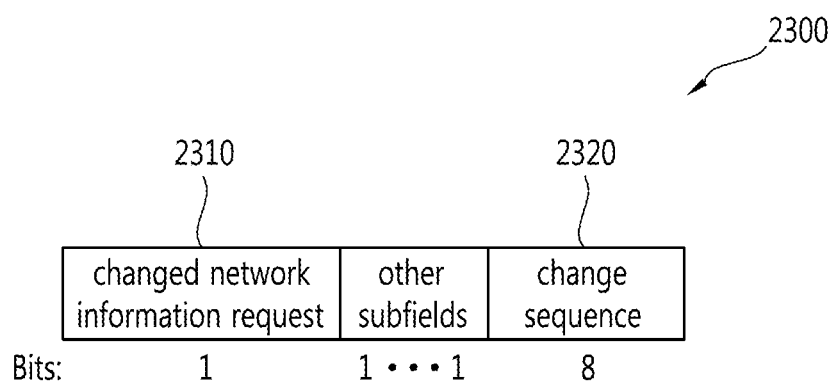
FIG. 23 is a block diagram illustrating a fifth example of a probe response option field format according to an embodiment of the present invention.

FIG. 23 is a block diagram illustrating a fifth example of a probe response option field format according to an embodiment of the present invention.

Referring to FIG. 23, the probe response option field 2300 may include a changed network information request subfield 2310, a change sequence subfield 2320, and other subfields.

The other subfields may be implemented as at least one of the subfields included in the probe response option field 2300 described above in connection with FIGS. 18 to 22 in order to request specific option information.

The changed network information request subfield 2310 may indicate whether to request changed information for the AP and/or BSS. If the changed network information request subfield 2310 is set as '1,' this indicates a request for the changed information, and if set as '0,' this may indicate otherwise.

The change sequence subfield 2320 may indicate a change sequence included in the short beacon frame received most recently by the STA. The change sequence subfield 2320 may be included in the probe response option field 2300 in case the change network information request subfield 2310 is configured to indicate a request for the changed information.

In case the STA does not desire to obtain information other than the changed information, the values of the other subfields may be all set as '0's.' By doing so, the STA may obtain the changed AP and/or BSS information only.

However, in case there is option information desired to be obtained other than the changed information, the subfield associated with the corresponding option information may be set as '1,' and the corresponding option information may be requested.

FIG. 24 is a block diagram illustrating a sixth example of a probe response option field format according to an embodiment of the present invention.

Referring to FIG. 24, the probe response option field includes subfields to receive various pieces of information. The probe response option field may be implemented to include at least one or more of the subfields as shown.

If a corresponding subfield of the probe response option field indicates a request of related information, the AP may transmit a short probe response frame to the STA, with a field and/or IE for the requested information included in the short probe response frame.

It has been described above that, when the STA requests information by transmitting a probe request frame, the corresponding information may be bundled into groups of related information. Hereinafter, a detailed example of grouping and a method of requesting information through a probe response option IE are described in detail.

Figure 25:
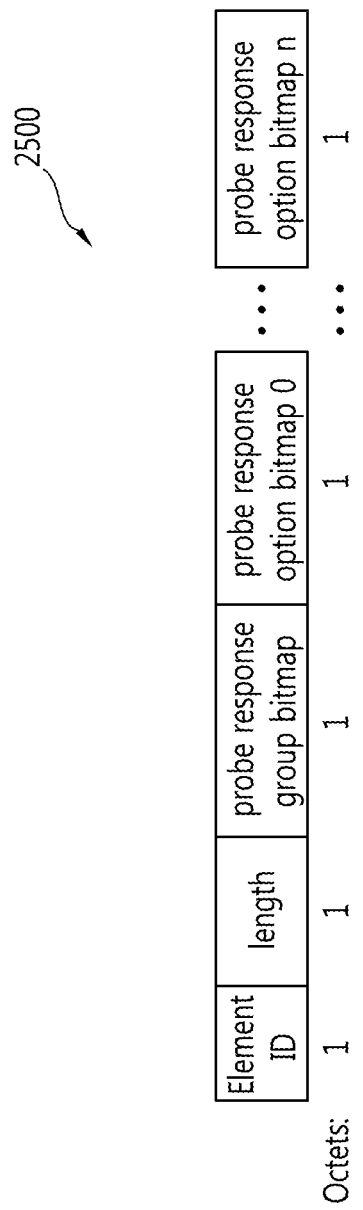
FIG. 25 is a block diagram illustrating a first example of a probe response option IE according to an embodiment of the present invention.

FIG. 25 is a block diagram illustrating a first example of a probe response option IE format according to an embodiment of the present invention.

Referring to FIG. 25, the probe response option IE 2500 includes an element ID field 2510, a length field 2520, a probe response group bitmap field 2530, and at least one probe response option bitmap field 2540.

The element ID field 2510 may be configured to indicate that a corresponding IE is the probe response option IE 2500.

The length field 2520 may indicate the whole length of at least one field that is subsequently included. For example, the length field 2520 may be configured to indicate the length of a bit sequence constituted by at least one field on a per-octet basis. Or, the length field 2520 may be configured to indicate the number of fields that are subsequently included. The length field 2520 may indicate the number of the probe response bitmap field and the probe response option bitmap fields included in the probe response option IE 2500.

The probe response group bitmap field 2530 may indicate which group of option bitmap is requested through the probe response option IE 2500. A probe response option bitmap field related to a group indicated by the probe response group bitmap field 2530 may be included. For example, in case only group 0 is requested, the probe response group bitmap field 2530 may be set as '100 . . . 00.' In such case, the probe response option IE 2500 may include a probe response option bitmap field related to group 0. Option information may be requested using multiple probe response option bitmap fields, and in such case, each probe response option bitmap field is sequentially included in the probe request frame and then transmitted. Further, only probe response option bitmap fields including option information to be requested may be included in the probe request frame, thus preventing the probe request frame from being unnecessarily increased.

Each of at least one probe response option bitmap field 2540 may be configured to indicate whether specific option information of a related group is requested. Each probe response option bitmap field may be implemented as a bitmap sequence. It may be interpreted that option information corresponding to a bit set as '1' of the bitmap sequence is requested while option information corresponding to a bit set as '0' may not be requested.

The AP, upon reception of a probe request frame including the probe response option IE, may grasp which group has been requested based on the probe response group bitmap field 2530 and may learn which option information of the corresponding group has been requested based on each of at least one probe response option bitmap field 2540.

Meanwhile, a bitmap group obtained as the option information is grouped may be implemented as shown in FIGS. 26 to 29.

FIGS. 26 and 27 are views illustrating an example of grouping according to an embodiment of the present invention.

FIGS. 28 and 29 are views illustrating another example of grouping according to an embodiment of the present invention.

In the grouping example as shown in FIGS. 28 and 29, most frequently used option is included in group 0, so that when only group 0 is used, the probe response group bitmap field is omitted. This enables the size of the probe request frame to be reduced. Option information newly defined and used in a short probe response frame, S1G capability that refers to information relating to the capability of a next-generation AP, an extended capability including non-TIM support information, and supported rate information that is inevitably required for association are information that may be frequently requested by the STA, and thus, such information may be included in group 0. For such purpose, group 0 may include a full SSID request bit, a next full beacon time request bit, an access network option request bit, a full probe response completion IE request bit, a supported rate request bit, an S1G capability request bit, and an extended capability request bit.

The full SSID request bit indicates whether a request has been made for including a full SSID or compressed SSID in a short probe response frame. The next full beacon time request bit indicates whether a request has been made for including transmission time information for a next beacon frame in a short probe response frame. The access network option request bit indicates whether a request has been made for including an access network option field in a short probe response frame. The full probe response completion IE request bit indicates whether a request has been made for including a full probe response completion IE in a short probe response frame. The supported rate request bit indicates whether a request has been made for including a supported rate in a short probe response frame. The S1G capability request bit indicates whether a request has been made for including capability-related information of a next-generation wireless LAN system based on a band of 1 GHz or less in a short probe response frame. The extended capability request bit indicates whether a request has been made for including extended capability-related information in a short probe response frame.

Further, options that are highly likely to be used together may be grouped to be included in the same group. Once even one of the information defined in a group is used, a probe response option bitmap field relating to the corresponding group should be included in the probe request frame. If options that have a high chance of being used together are included in different bitmap groups, several probe response option bitmap fields are included in the frame, thus causing overhead. Accordingly, information defined in the wireless LAN standards, such as 11k, 11u, or 11v, is rendered to be included in the same group.

Additional information, such as RPS, segment count, TSF timer accuracy, relay discovery, or Root AP BSSID, as defined in the next-generation wireless LAN system are highly likely to be used in a next-generation wireless LAN terminal, and thus, may be jointly included in group 1. For such purpose, group 1 may include an RPS request bit, a segment counter request bit, a TSF timer accuracy request bit, a relay discovery request bit, and a RootAP BSSID request bit.

The RPS request bit indicates whether a request has been made for including an RPS element including information for restricted medium access in a short probe response frame. The segment counter request bit indicates whether a request has been made for including a segment count element including STA grouping-related information for medium access or reception of a TIM (Traffic Indication Map) in a next-generation wireless LAN system in a short probe response frame. The TSF timer accuracy request bit indicates whether a request has been made for including a TSF timer accuracy element in a short probe response frame. The relay discovery request bit indicates whether a request has been made for including a relay discovery element in a short probe response frame. The RootAP BSSID request bit indicates whether a request has been made for including a RootAP BSSID element in a short probe response frame.

Besides, a field for requesting information relating to RSN, country, and EDCA parameter that may be frequently used among information for the existing wireless LAN system may be included in group 2. Group 2 may include a country request bit, a power constraint request bit, a TPC report request bit, an extended supported rate request bit, an RSN request bit, a BSS load request bit, an EDCA parameter request bit, and a supported operation class request bit.

The country request bit indicates whether a request has been made for including a country element in a short probe response frame. The power constraint request bit indicates whether a request has been made for including a power constraint element in a short probe response frame. The TPC report request bit indicates whether a request has been made for including a TPC report element in a short probe response frame. The extended supported rate request bit indicates whether a request has been made for including an extended supported rate element in a short probe response frame. The RSN request bit indicates whether a request has been made for including an RSN element in a short probe response frame. The BSS load request bit indicates whether a request has been made for including a BSS load element in a short probe response frame. The EDCA parameter set request bit indicates whether a request has been made for including an EDCA parameter set element in a short probe response frame. The supported operation class bit indicates whether a request has been made for including a supported operation class in a short probe response frame.

Group 3 includes an 11k-related option, group 4 includes 11r and 11v-related options, and group 5 includes an 11u-related option. The CF parameter set is not directly related to 11r or 11v, but is not used a lot, so that the CF parameter set is allocated to the remaining field in group 4.

Group 3 may include a measurement pilot transmission request bit, a multiple SSID request bit, an RM enabled capability request bit, an AP channel report request bit, a BSS average access delay request bit, an antenna request bit, a BSS available admission capability request bit, and a BSS AC access delay request bit. Each bit indicates whether a request has been made for including an element and/or field for related information in a short probe response frame.

Group 4 may include a mobility domain request bit, a DSE registered location request bit, a CF parameter set request bit, a QoS traffic capability request bit, a channel usage request bit, a time advertisement request bit, and a TimeZone request bit. Each bit indicates whether a request has been made for including an element and/or field for related information in a short probe response frame.

Group 5 may include an interworking request bit, an advertisement protocol request bit, a roaming consortium request bit, and an emergency alert identifier request bit. Each bit indicates whether a request has been made for including an element and/or field for related information in a short probe response frame.

Group 6 includes options related to information defined in current wireless LAN standards, such as 11ae, 11aa, and 11ai. Group 7 may be used for additional extension.

Group 6 may include a QMF policy request bit, a Qload report request bit, a GAS configuration sequence number request bit, a reduced neighbor report request bit, an AP configuration change count request bit, a FILS indication request bit, and a differentiated initial link setup request bit.

In the grouping example as shown in FIGS. 28 and 29, bits for the full SSID request, full beacon time request, access network option request, and full probe response completion IE request may be used to request option information that may be included in a newly defined short probe response frame according to the present invention. The remaining bits may be used to request option information defined in a probe response frame of an existing wireless LAN system or a next-generation wireless LAN system that is being currently defined. The full probe response completion IE request has been described above, and in case a short probe response frame is used for an association process, a full probe response completion IE should be configured to be requested with the full probe response completion IE request bit set as 1. In case a short probe response frame is used to obtain information of the AP and/or BSS, the full probe response completion IE request bit need not be set as 1.

A FH (Frequency Hopping)-related parameter, a DSSS (Direct Sequence Spread Spectrum)-related parameter, an ERP (Extended Rate PHY)-related parameter, an HT (High Throughput)-related parameter, a VHT (Very High Throughput)-related parameter, a 11ad-related parameter, a mesh-related parameter, and an IBSS-related parameter may be very rarely used by a STA that operates in a next-generation wireless LAN system, and may not be included in a particular bitmap group. If necessary, they may be acquired from the AP through a requested element scheme defined in the existing 802.11 communication standards.

Option information relating to channel switch notification, quieting, and extended channel switch may be included in a short probe response frame when they are needed by the AP. In such case, the STA need not explicitly request them by explicitly including the corresponding option in the probe response option IE. Accordingly, it need not be separately included in a bitmap group.

The STA, in order to request specific option information, may set a bit relating to the specific option information as '1' in a bitmap sequence related to a group including the specific option information. Further, the STA may include a probe response option bitmap field for the corresponding group in the probe response option IE. The STA may also configure the probe response group bitmap field to indicate that it contains the corresponding probe response option bitmap field. Further, the STA includes, in the probe response option IE, only a probe response option bitmap with one or more bits set as 1's among probe response option bitmaps.

Figure 30:
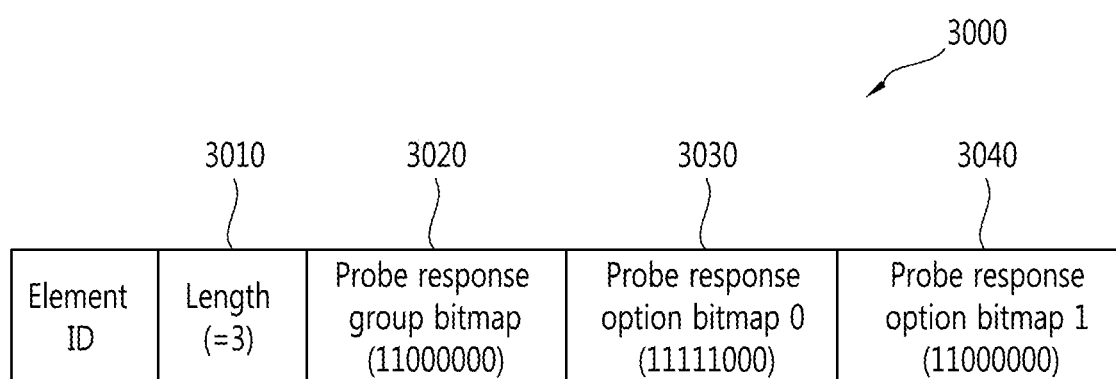
FIG. 30 is a view illustrating a probe response option IE configuration according to an embodiment of the present invention.

For example, in the grouping example as shown in FIGS. 26 and 27, the STA may set as the probe response option IE as shown in FIG. 30 in order to request full SSID-related information, full beacon time-related information, access network option-related information, capability-related information, and supported rate-related information as included in group 0 and interworking-related information and roaming consortium-related information as included in group 1.

FIG. 30 is a view illustrating a probe response option IE configuration according to an embodiment of the present invention.

Referring to FIG. 30, the probe response group bitmap field 3020 may be configured to indicate that a probe response option bitmap 0 field 3030 for group 0 and a probe response option bitmap 1 field 3040 for group 1 have been included by setting probe response group bitmap field to include '11000000'.

The probe response option bitmap 0 field 3030 may be set as '11111000' to indicate that full SSID-related information, full beacon time-related information, access network option-related information, capability-related information, and supported rate-related information are requested.

The probe response option bitmap 1 field 3040 may be set as '11000000' to indicate that interworking-related information and roaming consortium-related information are requested.

The length field 3010 may indicate the number of probe response group bitmap field and probe response option bitmap fields as included. In this example, since one probe response group bitmap field 3020 and two probe response option bitmap fields 3030 and 3040 are included after the length field, the length field 3010 may be set as 3. Meanwhile, the length field 3010 may be configured to represent the length of a bit sequence constituted of the included probe response group bitmap field 3020 and probe response option bitmap fields on a per-octet basis.

In case further option information is required to be included in option information grouping and the method of implementing a probe response option IE described above in connection with FIGS. 25 to 30, the length of the bitmap sequence for the group may be increased. Further, in case the number of the group is required to be increased, the length of the bitmap sequence for the probe response group bitmap may be increased.

Meanwhile, in case a most frequently included bitmap group (e.g., group 0) is set as a default group, and only the option information included in the default group is requested, a probe response option IE from which a probe response group bitmap field is omitted may be used. This may be implemented as shown in FIG. 31.

Figure 31:
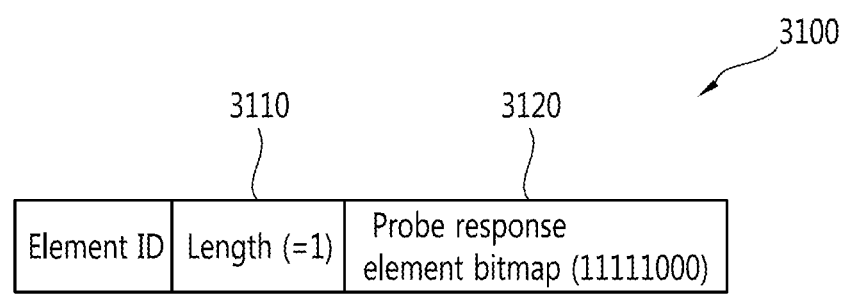
FIG. 31 is a block diagram illustrating a second example of a probe response option IE format configuration according to an embodiment of the present invention.

FIG. 31 is a block diagram illustrating a second example of a probe response option IE format configuration according to an embodiment of the present invention.

Referring to FIG. 31, under the circumstance where only the full SSID-related information, full beacon time-related information, access network option-related information, capability-related information, and supported rate-related information that belong to group 0 (default group) are requested in the grouping example described in connection with FIGS. 26 and 27, the probe response option IE 3100 may include a probe response option bitmap field 0 3120 but not a probe response group bitmap field. In such case, the probe response option bitmap 0 field may be set as '11111000.'

As one probe response option bitmap field is included without a probe response group bitmap field, the length field 3110 may be configured to indicate 1. Or, the length field 3110 may be configured to indicate one octet that is the length of the probe response option bitmap field 3120.

In implementing a probe response option IE for the default group as described above, the probe response group bitmap field may be omitted, thus reducing the size of the IE.

FIG. 32 is a block diagram illustrating a third example of a probe response option IE format according to an embodiment of the present invention.

Referring to FIG. 32, it may be seen that the suggested probe response option IE is an example of a format that allows for use of more probe response option bitmaps.

The probe response option IE shown in FIG. 25 uses one octet of probe response group bitmap field to indicate at least one bitmap group, and accordingly, may use maximum of eight groups. On the contrary, the probe response option IE shown in FIG. 32 may include one or more probe response group bitmap fields, and thus, may use more groups. This means that the STA may request more option information by configuring the probe response option IE.

The probe response option bitmap fields may be included in the probe response option IE in the order of probe response bitmap fields for a group indicated by a bit that is set as 1 in the probe response group bitmap 0, probe response bitmap fields for a group indicated by a bit that is set as 1 in the probe response group bitmap 1 field, . . . , and probe response bitmap fields for a group indicated by a bit that is set as 1 in the probe response group bitmap k field.

FIG. 33 is a block diagram illustrating a fourth example of a probe response option IE format according to an embodiment of the present invention.

Referring to FIG. 33, it may be seen that the suggested probe response option IE is an example of a format that allows for use of more probe response option bitmaps.

Although the IE shown in FIG. 32 is extended on a per-octet basis, the probe response group bitmap in the IE shown in FIG. 33 is extended on a per-bitmap basis. In other words, in the example shown, the probe response group bitmap field is by way of example set as 11 bits, and the next five bits of sequence is used to indicate frequently used option information (e.g., full SSID, full beacon time, access network option, capability information, supported rate). When implemented as shown in FIG. 33, the length of the probe response group bitmap and bitmap of the option information frequently used may be arranged on a per-octet basis.

If only the bitmap for frequently used option information (in the instant example, full SSID, full beacon time, access network option, capability information, supported rate, etc.) is requested, only the requested information up to the probe response group bitmap and bitmap for frequently used option information may be included in a probe response option IE when the probe request frame is transmitted, and in such case, many groups may be represented while the length of the short probe response frame may be reduced as described in the example.

FIG. 34 is a block diagram illustrating a fifth example of a probe response option IE format according to an embodiment of the present invention.

Referring to FIG. 34, it may be seen that the suggested probe response option IE is an example of a probe response option IE that enables use of more probe response option bitmaps. In this example, one or more bitmap groups are re-grouped into pages, with a page bitmap added.

In the instant example, a result obtained by re-grouping one or more groups is defined as a 'page.' For example, groups 0 to 7, groups 8 to 15, and group 16 to 23 may be set as page 0, page 1, and page 3, respectively.

Accordingly, the probe response page bitmap field indicates whether a request is made for a specific page obtained by grouping one or more groups, and the probe response group bitmap field indicates whether a request is made for one or more groups in the corresponding page. The probe response option bitmap field may indicate whether one or more option information in a corresponding group in a corresponding page are requested.

Figure 35:
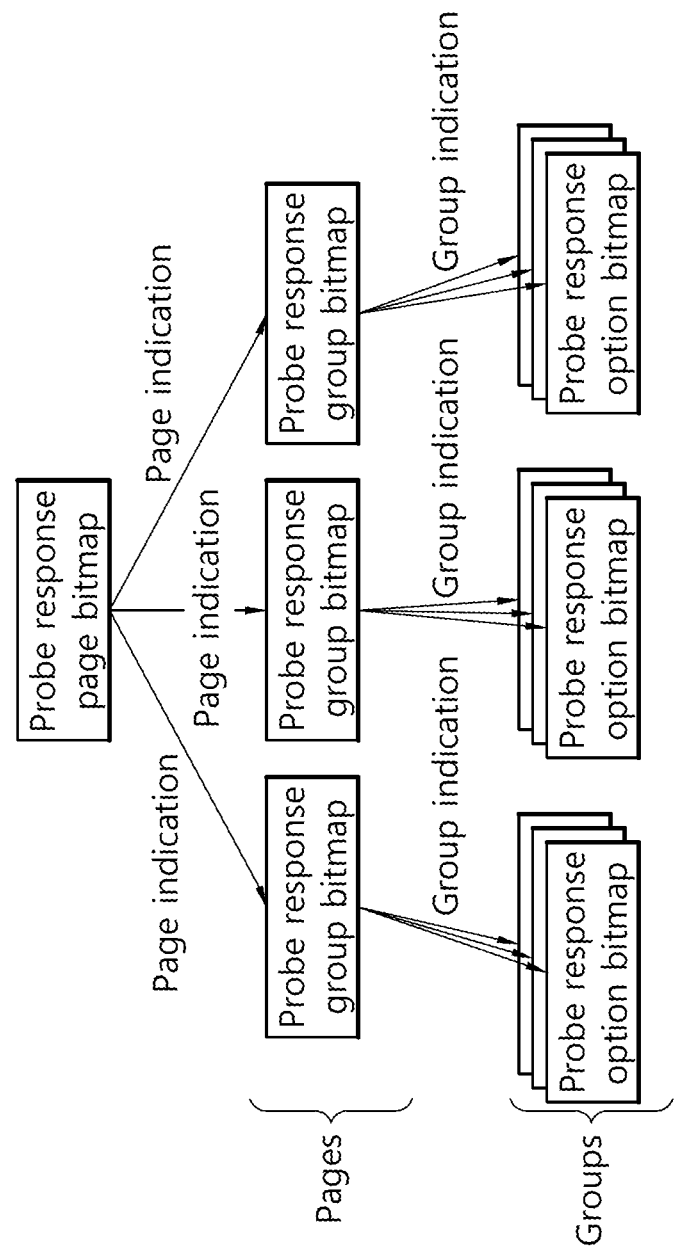
FIG. 35 shows the relationship among a probe response page bitmap, probe response group bitmaps, and probe response option bitmaps according to an embodiment of the present invention.

The relationship among the probe response page bitmap, probe response group bitmap, and probe response option bitmap may be shown in FIG. 35.

Assuming that the above-described examples are associated with a two-level tree structure of the probe response group bitmap and the probe response option bitmap, one level, page bitmap, is added thereabove in the instant embodiment, and is thus expanded to a three level structure.

If at least one of the probe response option bitmaps is set as 1 in the above-described examples, the corresponding probe response option bitmap is included in the probe response option IE. Further, a probe response group bitmap indicating whether there is the corresponding probe response option bitmap is included in the probe response option IE.

However, in the instant example, a number of probe response group bitmaps may be used, and only the probe response group bitmap including a bit set as 1 among the probe response group bitmaps may be included in the probe response option IE. That is, a bitmap with no bit set as 1 among the probe response group bitmaps is not included in the probe response option IE, thus resulting in the length of the short probe response frame being reduced.

In particular, in case there are many probe response group bitmaps, only the option information for probe response group bitmap(s) including a bit set as 1 are included in the short probe response frame, so that the length of the short probe response frame may be further decreased as compared with the above-described embodiments.

The probe response page bitmap indicates whether there is a probe response group bitmap for a corresponding page. In case a probe response group bitmap for a corresponding page is included in the probe response option IE, the corresponding bit may be set as 1. For example, if probe response group bitmaps 0 and 2 are included in the probe response option IE (i.e., if probe option bitmaps belonging to pages 0 and 2 are used), the page bitmap may be set as 101. The probe response group bitmap and probe response option bitmap corresponding to the remaining pages may not be included in the probe response option IE.

Eight pages may be configured by allocating one octet to a probe response page bitmap. Or, a smaller number of pages, e.g., three pages obtained by allocating three bits only, may be configured while the remaining five bits are used to indicate whether a request is made for frequently used option information (e.g., full SSID, full beacon time, access network option, capability, supported rate, etc.) as described in the above embodiments. In such case, the frequently used option information used therein may not be included in other probe response option bitmaps or may also be configured not to be included in a certain page.

FIG. 36 is a view illustrating an example of a probe response option IE format according to an embodiment of the present invention.

In this example, all the probe response option bitmaps belong to one of pages 0, 1, and 2.

In the instant example, the STA requests probe response option bitmaps 0 and 1 that belong to page 0 and probe response option bitmap 7 that belongs to page 2 by configuring the probe response option IE.

Option information that always needs to be indicated (e.g., full SSID, full beacon time, access network option, capability, supported rate, etc.) is implemented as a bitmap, and three bits may be used to indicate that at least one of groups belonging to pages 0 and 2 is included in the probe response option IE. That is, the probe response page bitmap field may be set as 101 to request option information associated with pages 0 and 2 while not requesting option information associated with page 1.

The probe response group bitmaps for the probe response option bitmap included in the corresponding page are sequentially included. In the present example, groups 0 and 1 for page 0 and group 7 for page 2 are included, and these may be included in the probe response group bitmap field.

Probe response option bitmap fields corresponding to bits set as 1's in the corresponding probe response group bitmap field may be sequentially included in the probe response option IE.

In the instant example, since the value of the probe response group bitmap 0 field associated with page 0 is '11000000,' the first and second probe response option bitmaps of page 0 are used. Further, since the value of the probe response group bitmap 2 field associated with page 2 is '00000001,' the seventh probe response option bitmap of page 2 is used. Accordingly, three probe response option bitmap fields are included in the probe response option IE.

As described above with reference to the embodiments, in an example of the FIG. 36, only the option information (full SSID, full beacon time, access network option, capability, supported rate, etc.) that always requires a request through an indication option field may be requested to be included in a short probe response frame. In such case, the probe response page bitmap field may be set as '000.'

Frequently used option information may be not included in other probe response option bitmaps and may be rendered not to be included in a specific page so that in case only the frequently used option information is requested, the probe response page bitmap field may be set as '000,' and the probe response group bitmap fields and probe response option bitmap fields are not included in the probe response option IE. In such case, since the probe response option IE may include only the element ID field, length field, always indication option bitmap field and probe response page bitmap field, the size of the probe response option IE may be sharply reduced.

Option information to be included in the probe request frame, rather than being configured to be explicitly indicated in the probe request frame, may be rendered to be implicitly indicated through capability information of the STA that is included in the probe request frame. The probe request frame may include IEs such as HT capability and extended capability, and in case such IEs are included, this means that a corresponding STA supports the HT. Accordingly, even when the HT-related information is not configured to be explicitly requested in the probe request frame, the AP may grasp, through the corresponding IE, that the STA supports the HT and may include HT-related information in the probe response frame.

Likewise, in case a VHT capability-related IE and/or parameter is included in the probe request frame, even when the probe request frame does not explicitly indicate to request the corresponding information, the AP may include the VHT-related information in the probe response frame.

Further, in case the probe request frame includes inter-working-related information, this means that the STA supports interworking. Accordingly, even when the probe request frame does not explicitly indicate to request interworking-related information, the AP may include the interworking-related information in the probe response frame.

In case the STA includes mesh IE-related information in the probe request frame, this means that the STA is a mesh STA. Accordingly, even when the probe request frame does not explicitly indicate to request mesh-related information, the AP may include mesh-related information (mesh configuration information, MCCAOP (MCF (Mesh Coordination Function) Controlled Access Opportunity) advertisement, etc.) in the probe response frame.

Besides, if, among other information, information that enables the STA's capability to be inferred is included in the probe request frame, even when information relating to the corresponding capability is not explicitly requested, the AP may include information related to the corresponding capability in the probe response frame.

Also in the instant embodiment, whether to use a short probe response frame or a full probe response frame may be notified by a method similar to what has been described above.

One bit of a bitmap that is most frequently used (e.g., basic bitmap or default bitmap) among the probe response option bitmaps in the probe response option IE may be used to indicate whether to use a short probe response. The corresponding bit may be set as 0 or 1 to indicate whether to use a full probe response or a short probe response. In such case, if the bit to indicate whether to use a short probe response is set as 1 and a short probe response is requested while bitmaps to indicate whether to request other option information are all set as 0's, the AP may transmit a short probe response frame that includes only minimum information such as FC, SA, time stamp, compressed SSID, full beacon time, etc. If the bit to indicate whether to use a short probe response is set as 1, and a specific bit of the bitmap requesting other option information is set as 1, the AP may transmit a short probe response frame, with the corresponding option information included in the short probe response frame.

In case the bit to indicate whether to use a short probe response is set as 0, the AP may transmit a full probe response frame or a short probe response frame including all of the same information as is included in the full probe response frame. In addition to the bit indicating use of a short probe response, one more bit may be assigned to explicitly distinguish two types of full probe response (a response through a full probe response frame and a response through a short probe response frame including all of the information included in the full probe response). Or, unless the probe response option IE is included in the probe request frame, the AP may be implemented to transmit an existing full probe response frame, and if the probe response option IE is included and the bit to indicate whether to use a short probe response is set as 0, the AP may be implemented to transmit a short probe response frame including all of the information included in the full probe response frame.

As such, without introducing a bit to indicate whether to use a short probe response, whether to use a short probe response or a full probe response may be indicated by whether the probe response option IE is included in the probe request frame. If the probe response option IE is included in the probe request frame, it means that the short probe response is requested, and otherwise, it means that the existing full probe response is requested. Further, even when the probe response option IE is included in the probe request frame, if the corresponding AP does not support the short probe response, the AP transmits the full probe response.

By another method, if the probe response option IE is included but the bitmaps indicating option information are all set as 0's or the bitmaps indicating option information are not included, the AP may transmit a short probe response frame that includes only minimum information such as FC, SA, time stamp, compressed SSID, full beacon time, etc. If the probe response option IE is included and a certain bit of bitmaps indicating option information is set as 1, the AP may include the corresponding option information in the short probe response frame.

By still another method, if the probe response option IE is not included in the probe request frame, this may mean that a full probe response is requested. Accordingly, the AP may transmit a full probe response frame or a short probe response frame including all of the information included in the full probe response frame. One bit may be allocated to the probe response option bitmap field in order to explicitly distinguish two types of the full probe response from each other, so that it may be used for such purpose (in such case, even when a full probe response is requested, the probe response option IE is included in the probe request frame). Or, in case no probe response option IE is included in the probe request frame, the AP may be configured to transmit a full probe response frame, if the probe response option IE is included and a bitmap to indicate option information is not included, the AP may be configured to transmit a short probe response frame including minimum information, and if the probe response option IE is included, and a bitmap is included that is set as 0's, the AP may be configured to transmit a short probe response frame including all of the information for a full probe response.

As another example, if the bit to indicate whether to use a short probe response indicates a full probe response, the AP may be configured to transmit a short probe response frame including information for the full probe response, and if the bit to indicate whether to use a short probe response is not included and a field to request related option information is not included, the AP may be configured to transmit a full probe response frame.

Such a short probe response frame may be supported only when both the STA and the AP support a short probe response. Further, a response through a short probe response frame including all of the information for a full probe response may also be available only when supported by both the STA and AP. Otherwise, upon performing a full probe response, the AP transmits a full probe response frame.

When receiving the probe request frame including the probe response option IE, with a request of option information indicated by the probe response option IE, the responding STA and/or AP includes all the requested information in the short probe response frame within a range in which the requested option information can be provided by the corresponding STA and/or AP. If a portion of the information cannot be provided by the corresponding STA and/or AP, the STA and/or AP may be configured to include only the information that may be provided among the requested information when transmitting the short probe response, or not to transmit a probe response frame, or to transmit a short probe response frame including minimum information.

In case there is option information that cannot be indicated to request with a probe response option field or IE, the STA may request corresponding option information by including the element ID of desired information in a probe request frame using a request element that is used in the existing wireless LAN system.

A short probe request frame is now described in detail.

In an active scanning scheme according to the present invention, the AP may reduce overhead that occurs due to a probe response by transmitting a short probe response frame. Further, a method may also be herein suggested of decreasing the length of the probe request frame transmitted by the STA. The probe request frame thusly implemented may be referred to as a short probe request frame. In such case, the existing probe request frame may be referred to as a full probe request frame.

The STA may use a compressed SSID instead of a full SSID to reduce the length of the probe request frame. That is, when the STA is already aware of a full SSID to be associated with, the STA may use a compressed SSID upon sending a probe request to the corresponding AP.

The AP receives a short probe request frame. Then, if the compressed SSID included in the short probe request frame is the same as the compressed SSID possessed by the AP, the AP transmits a probe response frame. In case two or more APs having the same compressed SSID transmit probe response frames, since the STA previously has information (full SSID, BSSID or MAC address) on an AP that the STA intends to access, and thus, the STA may select the corresponding AP by comparing the information (full SSID, BSSID or MAC address) included in the received probe response frame with the information (e.g., full SSID, BSSID or MAC address) on the AP that the STA intends to access.

The STA, upon attempting association, may use a full SSID already known thereto. Upon scanning, compressed SSIDs may be designated in a list so that scanning may be performed simultaneously for several APs.

In order to reduce the size of the probe request frame, the above-described compressed SSID may be used. In addition, a short probe request frame may include only necessary fields required for association.

When not obtaining sufficient information from the short beacon frame and thus cannot associate itself with the AP, the STA may request only additionally necessary information for association with the AP through a probe request and may obtain the information through a short probe response frame. Further, even after association, in case the information in the BSS is changed, the short beacon frame may indicate that the information of the AP and/or BSS is changed, and a probe request may be made to request only the actually changed information required by the STA. Among the changed information, only the information required by the STA may be obtained from the AP by a short probe response. This enables BSS-related information to be obtained by minimum traffic through a short probe response frame in an environment where a full beacon frame is rarely transmitted. In such embodiment, when the STA has already received a short beacon frame or after the STA has been associated with the AP, the STA is already aware of the full SSID, and thus, may make use of a short probe request frame using a compressed SSID.

An NDP (Null Data Packet)-type short probe request frame may be suggested for a short probe request. The NDP is the frame type of a physical layer including a signal field and training fields that excludes a data field including an MAC frame generated in an MAC (Medium Access Control) layer in the format of a PPDU (PLCP (Physical Layer Convergence Procedure) Protocol Data Unit) used in a wireless LAN system. The NDP type of short probe request frame may mean a probe request frame that is based on the format of NDP and whose probe request is implemented by configuring a signal field. Accordingly, while acquiring and interpreting an existing probe request frame are conducted in the MAC layer of the STA and/or AP, the NDP-type probe request may be carried out in the PHY layer of the STA and/or AP.

Figure 37:
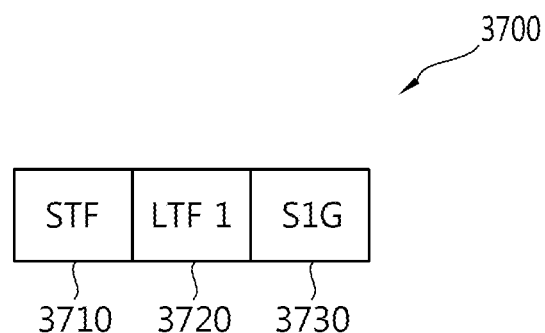
FIG. 37 is a block diagram illustrating an NDP-type short probe response frame format according to an embodiment of the present invention.

FIG. 37 is a block diagram illustrating an NDP-type short probe response frame format according to an embodiment of the present invention.

Referring to FIG. 37, the NDP-type short probe request frame includes only an STF (Short Training Field; 3710), an LTF (Long Training Field) 1 3720, and an SIG (signal) field 3730. Actual control information or indication information may be included in the SIG field 3730. Accordingly, in case an NDP-type short probe request frame 3700 is used, probe request-related information may be implemented in the SIG field 3730. For example, an indicator indicating the above-described request information may be implemented in the SIG field 3730, and only the information requested to the AP may be obtained through a short probe response frame. In case an NDP-type short probe request frame is transmitted with a probe response option field included therein, a requesting/responding scheme is similar to those described above, except that the short probe request frame is implemented as an NDP-type frame so that the overhead of the probe request itself may be reduced.

The NDP-type probe request frame does not include an existing MAC frame, and thus, is not separately assigned with an address field for transmitting STA and receiving STA. Accordingly, since all the information should be implemented in a limited length of SIG field, the number of bits is insufficient so that the MAC address information of the requesting STA may not be included. The AP, upon transmitting a full probe response frame and/or short probe response frame, cannot learn the MAC address of the requesting STA, and thus, may broadcast the corresponding frame. In such case, since the number of bits is insufficient and thus probe response option information to request optional information cannot be sufficiently indicated, the AP may broadcast a short probe response frame or full probe response frame including generally required option information.

In case necessary information is not enough in the received short probe response, the STA receiving the short probe response frame may identify a time that a next full beacon frame included in the short probe response frame, may receive a full beacon frame to obtain necessary information, and based on this, may attempt association. Or, the STA, without waiting for the full beacon frame, may send an additional request for necessary option information through the above-described probe request frame transmission, and in response thereto, may obtain necessary information through a short probe response.

In case network traffic is small, the AP may respond to the NDP-type short probe request frame with a full probe response frame. In case network traffic is heavy, the AP may transmit a short probe response frame including basic information such as FC, SA, time stamp, next full beacon time, or compressed SSID. Unless necessary information is sufficiently included in the short probe response frame, the STA may wait for receiving a full beacon frame or may request necessary information through a probe request frame.

Since a probe response to the NDP-type short probe request frame is performed in a broadcast manner, other STAs may also receive the short probe response frame or full probe response frame associated with the corresponding probe request, and by doing so, may attempt association/authentication or may use it for operation. Further, if necessary information is not sufficiently included in the broadcast short probe response frame, other STAs may also request the necessary information through the probe request frame transmission according to the option information requesting scheme suggested herein. Or, a full probe response may be explicitly requested.

FIG. 38 is a block diagram illustrating an example of an SIG field format of an NDP-type short probe response frame according to an embodiment of the present invention.

The format shown in a sub-figure (a) of FIG. 38 is the format of an SIG field included in an NDP-type short probe request frame that is transmitted/received through a 1 MHz transmission channel. The format shown in a sub-figure (b) of FIG. 38 is the format included in an NDP-type short probe request frame that is transmitted/received through a 2 MHz transmission channel.

Referring to sub-figures (a) and (b) of FIG. 38, the SIG field may include an NDP MAC frame type subfield, an SSID/interworking present subfield, and a compressed SSID/access network option subfield.

The NDP MAC frame type subfield may be configured to indicate that the information included in the SIG field implements information for an NDP-type short probe request frame.

The SSID/interworking present subfield may be configured to indicate whether SSID-related information or interworking-related information is included in the SIG field.

The compressed SSID/access network option subfield may include SSID-related information if the SSID/interworking present subfield indicates that SSID-related information, is included, and in such case, may include a compressed SSID. If the SSID/interworking present subfield indicates that interworking-related information is included, the compressed SSID/access network option subfield may include interworking-related information, and in such case, may include an access network option subfield.

Referring to sub-figures (a) and (b) of FIG. 38, in the case of 1 MHz transmission/reception, 16 bits are allocated to the compressed SSID/access network option subfield, and five bits may be allocated later for other bits. In the case of 2 MHz transmission/reception, 32 bits are allocated to the compressed SSID/access network option subfield, and one bit may be allocated later for other bits.

The STA, when transmitting an NDP-type short probe request frame, may indicate whether the STA requests a full probe response or a short probe response. For this purpose, in the signal field as shown, one bit of the reserved bits may be allocated to indicate whether to use a full probe response or short probe response.

Figure 39:
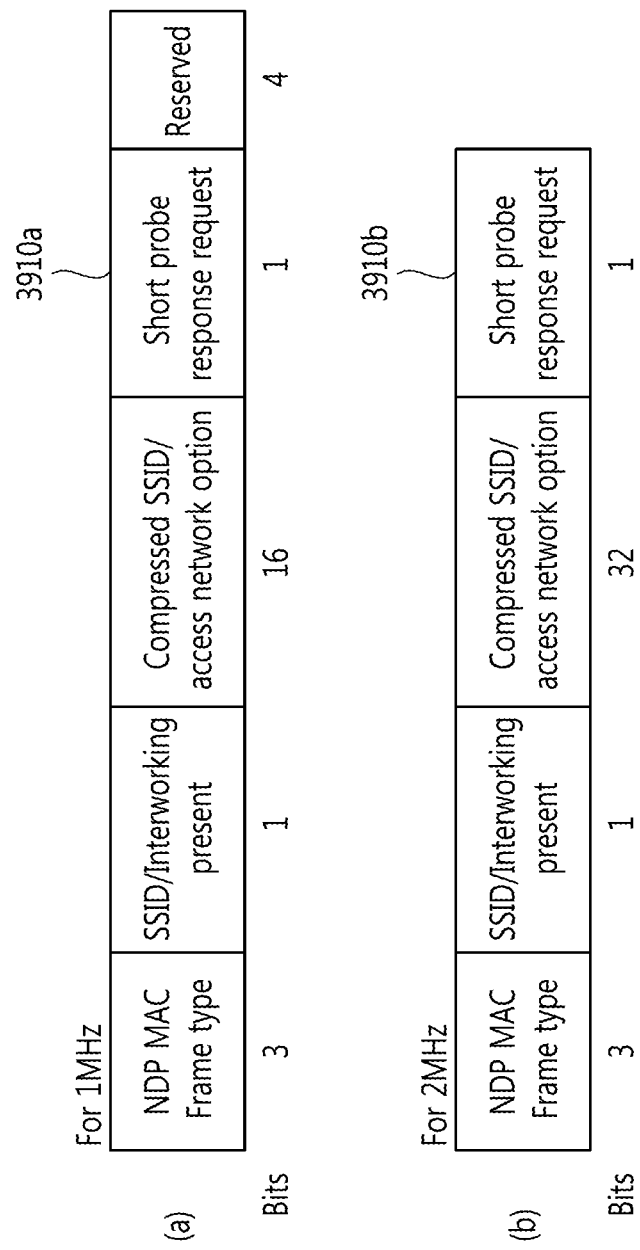
FIG. 39 is a block diagram illustrating another example of an SIG field format of an NDP-type short probe request frame according to an embodiment of the present invention.

FIG. 39 is a block diagram illustrating another example of an SIG field format of an NDP-type short probe request frame according to an embodiment of the present invention.

Referring to FIG. 39, as compared with FIG. 38, the SIG field may include short probe response request subfields 3910a and 3910b. The short probe response request subfield 3910a shown in FIG. 39(a) may be implemented to be assigned with one bit of five reserved bits, and the short probe response request subfield 3910b shown in FIG. 39(b) may be implemented to be assigned with one reserved bit.

The short probe response request subfields 3910a and 3910b may be configured to indicate whether to request a short probe response or full probe response. If the corresponding subfield is set as '1,' this may mean that a short probe response is requested, and if the corresponding subfield is set as '0,' this may mean that a full probe response is requested.

Since in the example shown in FIG. 39, whether a short probe response is requested is only designated, the STA may not properly inform the AP of a desired optional information. Accordingly, when receiving a short probe response frame, the STA, in case necessary information is not enough, may identify a time that a next full beacon frame included in the short probe response frame, may receive a full beacon frame to obtain necessary information, and based on this, may attempt association as described above. Or, the STA, without waiting for the full beacon frame, may request necessary option information through the above-described probe request frame additional transmission, and in response thereto, may obtain necessary information through a short probe response.

In case network traffic is not heavy under the circumstance where a short probe response is requested, the AP may transmit a short probe response frame with information according to a full probe response included in the short probe response frame. On the contrary, in case network traffic is heavy under the situation where a short probe response is requested, the AP may transmit a short probe response frame including basic information such as FC, SA, time stamp, full beacon time, or compressed SSID. If the necessary information is not sufficiently included in the short probe response frame, the STA waits for reception of a full beacon frame or may request necessary information through a probe request frame.

Figure 40:
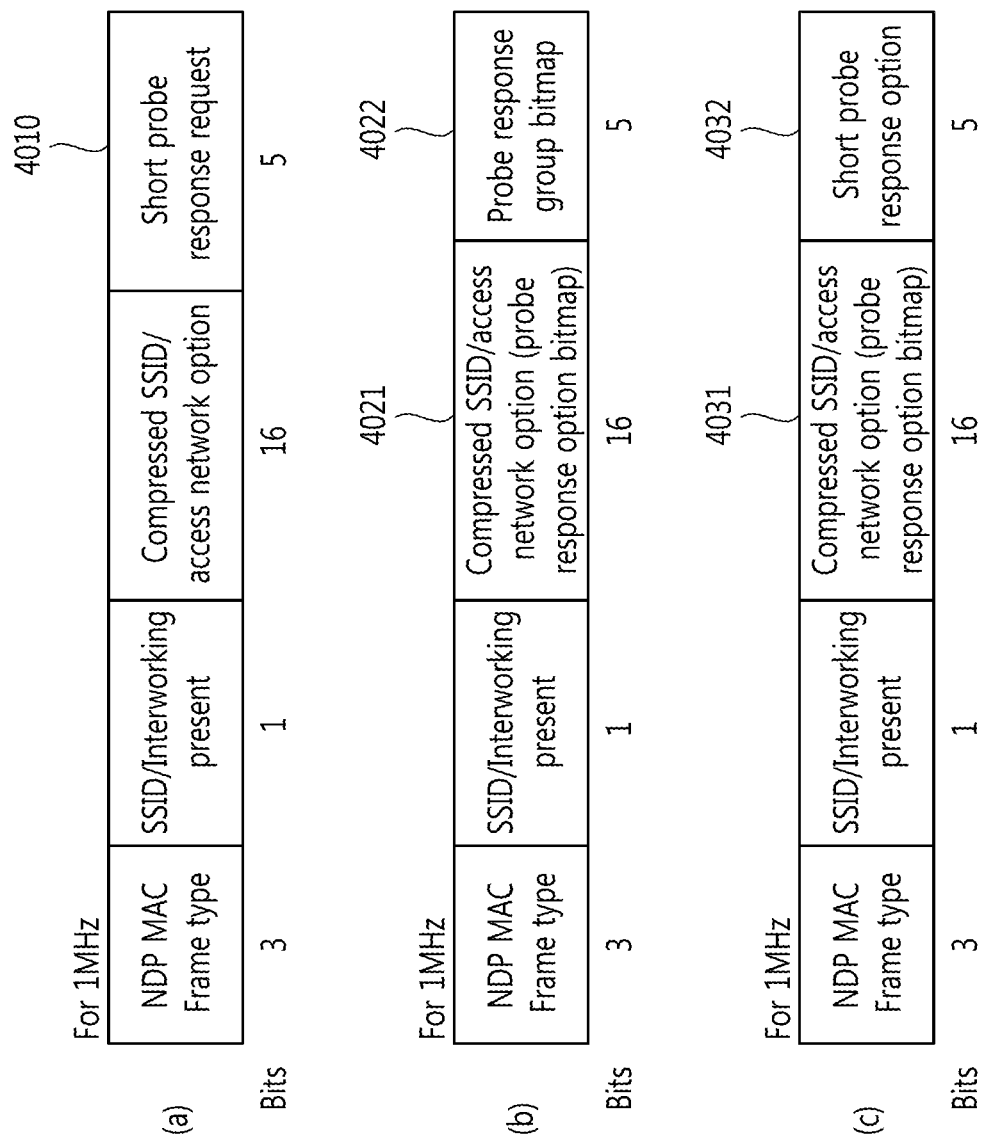
FIG. 40 is a block diagram illustrating examples of an SIG field format of a 1 MHz NDP-type short probe request frame according to an embodiment of the present invention.

FIG. 40 is a block diagram illustrating examples of an SIG field format of a 1 MHz NDP-type short probe request frame according to an embodiment of the present invention.

In a sub-figure (a) of FIG. 40, the five reserved bits in the SIG field as shown in FIG. 38 are configured in a short probe response option subfield 4010 that requests option information. For example, the short probe response option subfield 4010 may be configured to request option information associated with full SSID, short beacon capability, S1G capability, extended capability, or supported rate. The information request through an NDP-type short probe request frame has a limitation in option information indication itself, so that the STA has a high chance to receive a next full beacon frame so as to obtain sufficient information. Accordingly, even when information associated with the time that the full beacon frame is transmitted is not separately requested by the STA, if it comes to be included in the short probe response frame, the problem with insufficient bits, which are associated with request of option information, may be slightly mitigated.

If option information is explicitly requested as shown in the sub-figure (a) of FIG. 40, it enables the STA to reduce overhead caused by an additional probe request made when the required information is not included in the short probe response frame. In such case, if at least one of the five bits that may indicate option information is set as 1, the AP may respond in a short probe response scheme. On the contrary, if all of the five bits are set as 0's, the AP may respond in a full probe response scheme.

In a sub-figure (b) of FIG. 40, when the compressed SSID/access network option subfield 4021 is used for access network option information by configuring the SSID/interworking present subfield, eight bits of a total of 16 bits are assigned as reserved bits. Accordingly, in such case, the remaining eight bits may be used to implement a probe response option bitmap.

Further, in case the SSID/access network option subfield 4021 is used for network option information, the existing five reserved bits may be implemented in a probe response group bitmap field 4022 that designates one of five probe response group bitmaps. For example, such configuration may be done to indicate one of option bitmaps 0 to 4, or in such a way that five of the eight option bitmaps are selected so that one of them is indicated. The probe response option bitmap part of the SSID/access network option subfield 4021 may be configured to indicate requested option information that implements a bitmap indicated by the probe response group bitmap field 4022. The grouping of option information and implementing of the bitmaps may be done as described above in connection with FIGS. 26 to 29.

For example, if the probe response group bitmap subfield 4022 is set as '10000,' the last eight bits of the compressed SSID/access network option subfield 4021 may implement bitmap 0 as shown in FIG. 26 or 28.

On the other hand, unless the whole probe response group bitmap subfield 4022 is set as 0's, the AP may transmit a short probe response. In contrast, if the whole probe response group bitmap subfield 4022 is set as 0's, the AP may transmit a full probe response.

As shown in the sub-figure (b) of FIG. 40, one of five bitmaps may be designated, thus increasing a range of selecting a bitmap. However, only one bitmap may be included that directly indicates a request of option information.

In a sub-figure (c) of FIG. 40, unlike the sub-figure (b), instead of five reserved bits being implemented in a probe response group bitmap, the five reserved bits may be configured in a short probe response option subfield 4032 for requesting option information as shown in the sub-figure (a) of FIG. 40. For example, a short probe response option subfield 4032 may be configured to request option information associated with full SSID, short beacon capability, SIG capability, extended capability, or supported rate. Requesting information through an NDP-type short probe request frame has a limitation in indicating option information, and thus, the STA has a high chance to receive a next full beacon frame so as to obtain sufficient information. Accordingly, even when information associated with the time that the full beacon frame is transmitted is not separately requested by the STA, if it is rendered to be included in the short probe response frame, the problem with insufficient bits that are associated with requesting option information may be addressed a bit.

In case five reserved bits are configured as above, which bitmap is included in the compressed SSID/access network option subfield 4031 might be not separately informed, so that a bitmap that may be included should be previously determined as a specific bitmap. However, since more option information may be requested as compared with what is described above in connection with the sub-figure (b) of FIG. 40, the STA may transmit an additional probe request frame less frequently.

For example, the short probe response option subfield 4032 may be configured to indicate whether to request five of option information items that may be indicated by bitmap 0, and the compressed SSID/access network option field 4031 may be configured to implement a bitmap that may be used most frequently next to bitmap 0 (e.g., bitmap 1 relating to next-generation wireless LAN system information).

The compressed SSID/access network option field 4031, rather than using bitmap 1 described above in connection with FIGS. 28 and 29, may use a combined bitmap that is obtained by adding, to the reserved bits of bitmap 1, option information indicated by other bitmaps (e.g., RSN request, EDCA parameter, and country of bitmap 2 or roaming consortium of bitmap 5, etc.).

If the SSID/access network option subfield 4021 is used for SSID, the short probe response option subfield uses five bits to represent an option as shown in the sub-figure (a) of FIG. 40.

Figure 41:
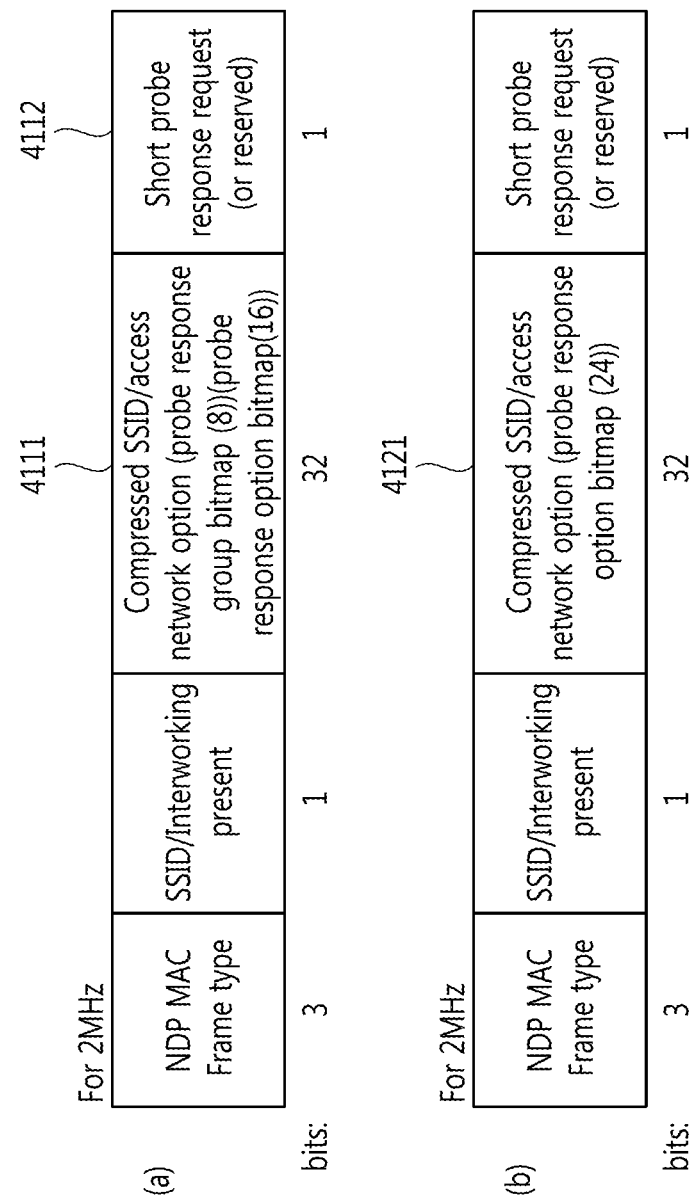
FIG. 41 is a block diagram illustrating examples of an SIG field format of a 2 MHz NDP-type short probe request frame according to an embodiment of the present invention.

FIG. 41 is a block diagram illustrating examples of an SIG field format of a 2 MHz NDP-type short probe request frame according to an embodiment of the present invention.

Referring to a sub-figure (a) of FIG. 41, in case a compressed SSID/access network option subfield 4111 is used in the 2 MHz NDP-type short probe request frame for access network option information by configuring an SSID/interworking present subfield, 24 bits of a total of 32 bits remain. Accordingly, 24 reserved bits may be used to implement a probe response group bitmap of 8 bits and two probe response option bitmaps each consisting of 8 bits. In such case, more option information may be indicated as compared with what is described above in connection with the sub-figures (b) and (c) of FIG. 40.

For example, if the probe response group bitmap is '11000000,' the last 16 bits of the compressed SSID/access network option subfield 4111 may implement bitmap 0 and bitmap 1.

The short probe response request subfield 4112 may be configured to indicate whether to request a short probe response or full probe response. If the corresponding subfield is set as 1, it may denote that a short probe response is requested, and if the corresponding subfield is set as 0, it may denote that a full probe response is requested.

Meanwhile, rather than the short probe response request subfield 4112 being implemented, the corresponding one bit may be configured to be left as a reserved bit. At this time, in case the compressed SSID/access network option subfield 4111 is used for access network option information, if the last 24 bits that may be used in a probe response group bitmap and probe response option bitmap are all set as 0's, this may denote that a full probe response is requested, and if at least one of the last 24 bits is set as 1, this may denote that a short probe response is requested.

In case the SIG field is configured as shown in a sub-figure (a) of FIG. 41, two of eight bitmaps are explicitly selected and implemented, and thus, a range in which various types of bitmaps are selected may be increased. However, the number of bitmaps directly indicating option information may be limited to two.

A sub-figure (b) of FIG. 41 shows an example where in case the compressed SSID/access network option subfield 4121 is used for access network option information, the remaining 24 bits are all used to implement a probe response option bitmap. In such case, three bitmaps may be included in an NDP-type short probe request frame. In contrast, since a probe response group bitmap is not included, what bitmaps are included cannot be explicitly indicated, and thus, the three included bitmaps may need to be previously determined as specific bitmaps. On the contrary, more option information may be requested as compared with what is described in connection with the sub-figure (a) of FIG. 41. This lowers the possibility in which insufficient information is obtained through a short probe response frame, thus preventing a probe request from being made again.

For example, among the bitmaps described above in connection with FIGS. 28 and 29, most frequently used bitmaps, bitmaps 0, 1, and 2, may be included in corresponding signal fields, and the three bitmap fields may mostly cover option information that is generally required.

Or, rather than bitmap 1 described above in connection with FIGS. 28 and 29 being used without change, a combined bitmap may be used that is implemented so that a reserved bit of bitmap 1 is used to indicate frequently used option information that is included in other bitmaps (e.g., roaming consortium of bitmap 5).

Scanning methods and formats of frames for probe request and response according to embodiments of the present invention have been thus far described in detail with reference to the accompanying drawings.

The STA may send a probe request for necessary information to the AP by configuring the probe response option field (or IE) in the probe request frame, and the AP transmits a short probe response frame including the information requested by the STA to the STA.

The STA, immediately after obtaining information necessary for attempting authentication/association from the short probe response frame, may attempt to conduct association.

On the contrary, in case sufficient necessary information is not obtained, additional necessary information only may be selectively requested. The selective request may be implemented by configuring the probe response option field (or IE) in the probe request frame. Further, based on the information associated with the time that the full beacon frame is transmitted, as included in the short probe response frame, transmission of the full beacon frame may be awaited, and after information is obtained through the full beacon frame, association may be attempted. This is an option that may be advantageously used when the time that the full beacon frame is transmitted is not away from the time that the short probe response frame is transmitted. The STA, after receiving the short probe response frame, may operate in a power saving mode until the full beacon frame is transmitted.

The AP, if the time that a next full beacon frame is transmitted is very close to the time that the probe request frame is received from the STA, may transmit a short probe response frame including only the fields associated with basic information such as FC, SA, time stamp, compressed SSID, and full beacon time, irrespective of the information request through the probe response option field (or IE) included in the probe request frame as transmitted by the STA. At this time, whether to transmit the short probe response frame in a unicast manner or broadcast manner may be selected by the AP. In case there are many STAs, if the short probe response frame is broadcast, probe response flooding may be prevented that may occur due to excessive transmission/reception of the probe request frame.

As such, the AP may intentionally transmit a short probe response frame including basic information because a full beacon frame including all of the necessary information is subsequently transmitted. Accordingly, overhead may be prevented that may occur when information is transmitted in duplicate through a short probe response frame and a full beacon frame. The STA may grasp the time that the full beacon frame is transmitted through the full beacon time-related information of the short probe response frame, and after a standby, may receive a full beacon frame.

The AP may broadcast both a short probe response frame and a full probe response frame. In such case, other STAs may also obtain the probe response frame and may utilize the corresponding information. That is, the probe response frame may be utilized together with a beacon frame and/or short beacon frame. By doing so, disadvantages of the next-generation wireless LAN system, which stem from the short beacon frame, may be addressed. This is why the STA, without the need of waiting until the full beacon frame is transmitted, may obtain additional information required by the STA through a short probe response frame that is transmitted on the way. In case the network is under the situation where there are many STAs attempting to scan and heavy traffic is shown, the AP may provide the STAs with the AP and/or BSS-related information by broadcasting the short probe response frame. By doing so, even in the heavy-traffic wireless LAN environment, a short probe response may be efficiently done.

When receiving the broadcast short probe response frame, the STA may obtain additional necessary information through a full beacon frame to be transmitted subsequently or may directly request the additional information by transmitting a probe request frame and then obtain it from the AP. The requested AP may unicast a short probe response frame including the corresponding information to the corresponding STA.

Even when the short probe response frame is unicast, STAs other than the targeted STA may overhear the corresponding short probe response frame. At this time, the STA may use the obtained information for its own operation. In case all of the information necessary for operation (e.g., information for performing association) is included in the overheard short probe response frame, the STA may attempt association/authentication by using the corresponding information rather than sending out a separate probe request frame to the AP. In case some information is missing from the overheard short probe response frame, the STA may request, by transmitting a probe request frame to the AP, so that the AP transmits the necessary information. As such, in case a STA may make use of information included in a short probe response frame that is not targeted for the STA by overhearing, traffic for probe request/response may be reduced.

Although the suggested short probe response frame may be used for active scanning, in case the STA has already received the short beacon frame or has been already associated with the AP, the suggested short probe response frame may also be used to obtain information on the AP and/or BSS when such information is additionally needed.

When transmitting a short probe response frame, the AP may include only the information explicitly requested by the STA or additional information in addition to the information explicitly requested by the STA in the short probe response frame. In case the AP and/or BSS information is changed a lot, the latter may be more useful. However, since the AP and/or BSS-related information is generally subject to a slight change, the former scheme in which only the explicitly requested information is included in the short probe response frame may be primarily adopted to reduce overhead that may occur due to probe request/response.

In a sensor BSS constituted of sensor nodes or other BSSs constituted of specified nodes, a full beacon frame may be rarely transmitted or may not be transmitted in order to reduce overhead that may occur due to transmission of the beacon frame. A short probe response frame, in such environment, may also be used to obtain additional AP and/or BSS-related information that may not be obtained by the short beacon frame. Further, even in such case, the AP, if there is heavy traffic, may transmit a short probe response frame in a broadcast manner, and in such circumstance, STAs may share the AP and/or BSS-related information even without separately transmitting a probe request.

In the instant embodiment, if the STA has already received a short beacon frame or has associated itself with the AP, this means that the STA is aware of the full SSID, and thus, the STA may use a short probe response frame using a compressed SSID.

Further, as described above, a probe request frame may be transmitted with a change sequence value of a previously received short beacon frame included in the probe request frame, so that the AP may transmit a short probe response frame, with only the AP and/or BSS-related information that is changed after the STA has received the previous version of information included in the short probe response frame.

A STA which previously received a short beacon frame, full beacon frame, a previous short probe response frame, and a full probe response frame and obtains AP and/or BSS information may also learn whether the BSS information has been changed by identifying the change sequence value of the short probe response frame transmitted in response to a request from another STA. In case the change sequence value has been increased and thus is larger than a value known to the STA, this means that the AP and/or BSS-related information has been updated, and thus, the STA may additionally transmit a probe request frame to obtain the changed information.

A method of implementing a probe response option of a probe request frame may be used to filter out unnecessary probe responses as well. In case the AP cannot provide information requested by the STA through a probe response option bitmap, the AP may be configured not to perform a probe response. That is, the AP failing to provide the information requested by the STA may mean that there is a high chance of the AP being not the AP desired by the STA (AP providing a function required by the STA). Accordingly, even when the AP conducts a probe response although it cannot provide the requested information, the STA is not likely to be associated with the AP at a high degree of probability. Accordingly, the AP does not conduct a probe response in this case, thus preventing overhead that may occur due to unnecessary probe response. For example, in case the STA sends a request for option information used in a specific wireless LAN environment (e.g., 11u, 11k, 11v-related information) to the AP, but the AP does not support the functions supported in the specific wireless LAN environment, no short probe response frame or full probe response frame is transmitted, thus preventing unnecessary probe response.

The short probe response frame suggested herein includes information selectively required by the STA, and thus, has a reduced length. However, information for attempting association/authentication be provided to the STA. By such short probe response frame, overhead that may occur due to probe response when active scanning is conducted may be reduced, and more efficient scanning may be provided.

According to embodiments of the present invention, the STA may request selectively necessary information upon a probe request, and may obtain the information by receiving a short probe response frame. Accordingly, the STA need not wait until a full beacon frame is transmitted to obtain necessary information and may operate more efficiently.

Figure 42:
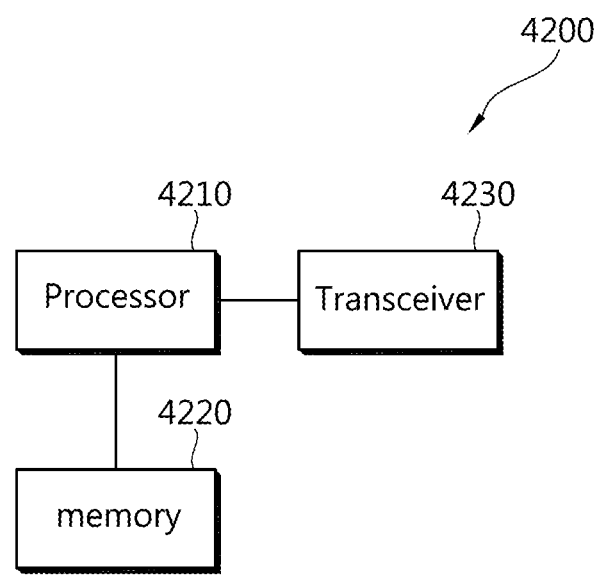
FIG. 42 is a block diagram illustrating a wireless device in which an embodiment of the present invention may be implemented.

FIG. 42 is a block diagram illustrating a wireless device in which an embodiment of the present invention may be implemented.

The wireless device 4200 shown in FIG. 42 may implement an STA and an AP according to an embodiment of the present invention.

Referring to FIG. 42, the wireless device 4200 includes a processor 4210, a memory 4220, and a transceiver 4230. The transceiver 4230 transmits and/or receives wireless signals and implements a physical layer based on IEEE 802.11. The processor 4210 may be configured to operate while operatively connected with the transceiver 4230. The processor 4210 may be configured to generate/transmit/receive/interpret frames having the formats suggested with reference to FIGS. 5 to 42. The processor 4210 may be configured to perform a scanning method according to an embodiment of the present invention as described above in connection with the drawings.

The processor 4210 and/or the transceiver 4230 may include an ASIC (Application-Specific Integrated Circuit), other chipsets, a logic circuit, and/or a data processing device. When the embodiment is implemented in software, the above-described scheme may be embodied in a module (procedure, function, etc.) that performs the above-described function. The module may be stored in the memory 4220 and may be executed by the processor 4210. The memory 4220 may be included in the processor 4210 or may be positioned outside the processor 4210 and may be operatively connected with the processor 4210 via various known means.

Although in the above-described exemplary system, the methods are described based on a series of steps or blocks, the present invention is not limited to the order of the steps. Rather, some steps may be performed simultaneously or in a different order with other steps. It may be understood by those skilled in the art that the steps in the flowchart do not exclude each other and other steps may be added or some of the steps may be omitted from the flowchart without affecting the scope of the present invention.

The invention claimed is:

1. A scanning method performed by a station (STA) in a wireless local area network system, the method comprising:
    transmitting, to an access point (AP) a first probe request frame; and
    receiving, from the AP, a first probe response frame or a second probe response frame in response to the first probe request frame, the first probe response frame having a shorter length than the second probe response frame,
    wherein the first probe request frame includes probe response option information,
    wherein the probe response option information includes at least one group of information that indicates which optional information is requested to be included or not included in the first probe response frame.

2. The method according to claim 1, wherein the at least one group of information includes at least one of:
    information indicating whether next beacon transmission time information is requested or not,
    information indicating whether full Service Set Identifier (SSID) information is requested or compressed SSID information is requested,
    information indicating whether Access Network Options is requested or not,
    information indicating whether S1G Beacon Compatibility is requested or not,
    information indicating whether S1G Capability is requested or not, or
    information indicating whether Request Supported Rates is requested or not.

3. The method according to claim 1, wherein the at least one group of information includes at least one of:
    information indicating whether RPS (RAW parameter set) is requested or not, or
    information indicating whether Short Beacon Interval is requested or not.

4. The method according to claim 1, wherein the at least one group of information includes at least one of:
    information indicating whether country information is requested or not, or
    information indicating whether power constraint information is requested or not.

5. The method according to claim 1, wherein the at least one group of information includes at least one of:
    information indicating whether interworking information is requested or not, or
    information indicating whether roaming consortium information is requested or not.

6. The method according to claim 1, wherein the at least one group of information includes at least one of:
    information indicating whether capability information is requested or not.

7. The method according to claim 1,
    wherein, when additional information is required by the STA after receiving the first probe response frame, the STA acquires the additional information by receiving a full beacon frame.

8. The method according to claim 1,
wherein, when additional information is required by the STA after receiving the first probe response frame, the STA transmits a second probe request frame to the AP.

9. The method according to claim 1,
wherein the AP broadcast the first probe response frame or the second probe response frame.

10. A STA (station) for scanning in a wireless LAN system, the STA comprising:
a receiver;
a transmitter;
a processor configured to control the receiver and the transmitter,
wherein the processor is further configured to:
control the transmitter to transmit, to an access point (AP) a first probe request frame; and
control the receiver to receive, from the AP, a first probe response frame or a second probe response frame in response to the first probe request frame, the first probe response frame having a shorter length than the second probe response frame,
wherein the first probe request frame includes probe response option information,
wherein the probe response option information includes at least one group of information that indicates which optional information is requested to be included or not included in the first probe response frame.

11. The STA of claim 10, wherein the at least one group of information includes at least one of:
information indicating whether next beacon transmission time information is requested or not,
information indicating whether full Service Set Identifier (SSID) information is requested or compressed SSID information is requested,
information indicating whether Access Network Options is requested or not,
information indicating whether S1G Beacon Compatibility is requested or not,
information indicating whether S1G Capability is requested or not, or
information indicating whether Request Supported Rates is requested or not.

12. The STA of claim 10, wherein the at least one group of information includes at least one of:
information indicating whether RPS (RAW parameter set) is requested or not, or
information indicating whether Short Beacon Interval is requested or not.

13. The STA of claim 10, wherein the at least one group of information includes at least one of:
information indicating whether country information is requested or not, or
information indicating whether power constraint information is requested or not.

14. The STA of claim 10, wherein the at least one group of information includes at least one of:
information indicating whether interworking information is requested or not, or
information indicating whether roaming consortium information is requested or not.

15. The STA of claim 10, wherein the at least one group of information includes at least one of:
information indicating whether capability information is requested or not.

16. The STA of claim 10,
wherein, when additional information is required by the STA after receiving the first probe response frame, the STA acquires the additional information by receiving a full beacon frame.

17. The STA of claim 10,
wherein, when additional information is required by the STA after receiving the first probe response frame, the STA transmits a second probe request frame to the AP.

18. The STA of claim 10,
wherein the AP broadcast the first probe response frame or the second probe response frame.

19. A scanning method performed by an access point (AP) in a wireless local area network system, the method comprising:
receiving, from a station (STA), a first probe request frame; and
transmitting, to the STA, a first probe response frame or a second probe response frame in response to the first probe request frame, the first probe response frame having a shorter length than the second probe response frame,
wherein the first probe request frame includes probe response option information,
wherein the probe response option information includes at least one group of information that indicates which optional information is requested to be included or not included in the first probe response frame.

20. An access point (AP) for scanning in a wireless LAN system, the STA comprising:
a receiver;
a transmitter;
a processor configured to control the receiver and the transmitter,
wherein the processor is further configured to:
control the receiver to receive, from a station (STA), a first probe request frame; and
control the transmitter to transmit, to the STA, a first probe response frame or a second probe response frame in response to the first probe request frame, the first probe response frame having a shorter length than the second probe response frame,
wherein the first probe request frame includes probe response option information,
wherein the probe response option information includes at least one group of information that indicates which optional information is requested to be included or not included in the first probe response frame.

* * * * *